US008773237B2

(12) United States Patent
Burris et al.

(10) Patent No.: US 8,773,237 B2
(45) Date of Patent: Jul. 8, 2014

(54) DOOR CLOSER WITH TEACH MODE

(75) Inventors: Charles E. Burris, Concord, NC (US);
Robert L. Tadlock, Jr., Charlotte, NC (US); John White, Huntsville, AL (US);
Jason Scott Gurley, Madison, AL (US);
Steven Michael Faes, Canisteo, NY (US); Joseph McGinty, Madison, AL (US); Wade Patterson, Huntsville, AL (US)

(73) Assignee: Yale Security Inc., Monroe, NC (US)

( * ) Notice: Subject to any disclaimer, the term of this patent is extended or adjusted under 35 U.S.C. 154(b) by 826 days.

(21) Appl. No.: 12/761,653

(22) Filed: Apr. 16, 2010

(65) Prior Publication Data

US 2011/0254657 A1 Oct. 20, 2011

(51) Int. Cl.
*G05B 23/02* (2006.01)
*E05F 3/00* (2006.01)
*E05F 1/00* (2006.01)
*E05F 5/02* (2006.01)
*G01R 1/02* (2006.01)
*G01B 7/30* (2006.01)

(52) U.S. Cl.
USPC ....... 340/3.32; 16/49; 16/71; 16/82; 324/130; 324/207.25

(58) Field of Classification Search
CPC ............. E05Y 2900/132; E05F 15/127; E05F 15/1607; E05F 3/22; G05B 2219/45242
USPC ........... 16/49–50, 71–86 C; 324/130, 207.25; 702/151
See application file for complete search history.

(56) References Cited

U.S. PATENT DOCUMENTS

| 618,053 | A | 1/1899 | Brown |
| 1,124,941 | A | 1/1915 | Norton |
| 1,152,339 | A | 8/1915 | Norton |
| 1,520,765 | A | 12/1924 | Norton |
| 1,543,935 | A | 6/1925 | McGee |

(Continued)

FOREIGN PATENT DOCUMENTS

| CA | 2420748 A1 | 9/2003 |
| CN | 1076243 A | 9/1993 |

(Continued)

OTHER PUBLICATIONS

Yale Security, Inc., International Patent Application No. PCT/US2008/061441, International Search Report and Written Opinion, Sep. 4, 2008.

(Continued)

*Primary Examiner* — Benjamin C Lee
*Assistant Examiner* — Adam Carlson
(74) *Attorney, Agent, or Firm* — Steven B. Phillips; Moore and Van Allen PLLC

(57) ABSTRACT

A door closer with a teach mode is disclosed. The door closer that can be self powered and includes a control unit to intelligently control a valve within the door closer to vary the operating characteristics of the door closer as needed. The control unit includes a teach mode that can be invoked at installation time, or any other time, so that appropriate information can be stored in memory regarding an installation configuration, relative jamb position, swing (right or left handed) and other parameters. These values can be accessed by control circuitry in the controller for use in controlling the door closer during operation.

18 Claims, 57 Drawing Sheets

(56) References Cited

U.S. PATENT DOCUMENTS

| | | |
|---|---|---|
| 1,595,722 A | 8/1926 | Norton |
| 1,595,723 A | 8/1926 | Norton |
| 1,941,454 A | 1/1934 | Ainsworth |
| 2,013,418 A | 9/1935 | Moore |
| 2,032,724 A | 3/1936 | Sharpe |
| 2,138,521 A | 11/1938 | Ellis |
| 2,170,014 A | 8/1939 | Ellis |
| 2,243,914 A | 6/1941 | Martin et al. |
| 2,758,835 A | 8/1956 | Wikkerink |
| 2,820,241 A | 1/1958 | Schlage |
| 2,843,376 A | 7/1958 | Osuch et al. |
| 2,874,960 A | 2/1959 | Durbin et al. |
| 2,877,639 A | 3/1959 | Gust |
| 2,899,701 A | 8/1959 | Schroeder |
| 2,924,449 A | 2/1960 | Leimer et al. |
| 2,964,779 A | 12/1960 | Gohr |
| 2,994,906 A | 8/1961 | Check |
| 3,000,043 A | 9/1961 | Check |
| 3,003,317 A | 10/1961 | Schroeder et al. |
| 3,040,372 A | 6/1962 | Ellis |
| 3,044,103 A | 7/1962 | Check |
| 3,087,720 A | 4/1963 | Catlett |
| 3,114,541 A | 12/1963 | Coffey |
| 3,135,991 A | 6/1964 | Ellis |
| 3,137,888 A | 6/1964 | Blom |
| 3,149,366 A | 9/1964 | Martin |
| 3,156,001 A | 11/1964 | Schmid |
| 3,156,002 A | 11/1964 | Schmid |
| 3,161,908 A | 12/1964 | Walach |
| 3,174,177 A | 3/1965 | Bugge |
| 3,222,709 A | 12/1965 | Ellis |
| 3,246,362 A | 4/1966 | Jackson |
| 3,255,482 A | 6/1966 | Flint |
| 3,259,936 A | 7/1966 | Sheridan |
| 3,260,545 A | 7/1966 | Check |
| 3,266,080 A | 8/1966 | Spencer |
| 3,284,950 A | 11/1966 | Gute |
| 3,425,161 A | 2/1969 | Catlett et al. |
| 3,546,734 A | 12/1970 | Pollack et al. |
| 3,593,367 A | 7/1971 | Waldo |
| 3,645,042 A | 2/1972 | Bolli |
| 3,665,549 A | 5/1972 | Quinn |
| 3,675,270 A | 7/1972 | Jentsch |
| 3,680,171 A | 8/1972 | MacDonald |
| 3,701,180 A | 10/1972 | Jentsch et al. |
| 3,708,826 A | 1/1973 | Larson |
| 3,724,023 A | 4/1973 | Tillmann |
| 3,760,455 A | 9/1973 | Berry et al. |
| 3,777,423 A | 12/1973 | Coulter et al. |
| 3,781,943 A | 1/1974 | Cain |
| 3,785,004 A | 1/1974 | Stoffregen |
| 3,838,477 A | 10/1974 | Evans et al. |
| 3,852,846 A | 12/1974 | Slaybaugh |
| 3,874,117 A | 4/1975 | Boehm |
| 3,886,425 A | 5/1975 | Weiss |
| 3,895,849 A | 7/1975 | Zehr |
| 3,934,306 A | 1/1976 | Farris |
| 3,935,614 A | 2/1976 | Pannone et al. |
| 3,996,698 A | 12/1976 | Rees et al. |
| 4,007,557 A | 2/1977 | Davis et al. |
| 4,045,914 A | 9/1977 | Catlett |
| 4,050,114 A | 9/1977 | Zunkel |
| 4,064,589 A | 12/1977 | Bejarano et al. |
| 4,067,084 A | 1/1978 | Tillmann |
| 4,069,545 A | 1/1978 | Holet et al. |
| 4,115,897 A | 9/1978 | Zunkel |
| 4,220,051 A | 9/1980 | Catlett |
| 4,222,147 A | 9/1980 | Burnett, Jr. |
| 4,267,619 A | 5/1981 | Suska |
| 4,285,094 A | 8/1981 | Levings, Jr. |
| 4,287,639 A | 9/1981 | Denton |
| 4,289,995 A | 9/1981 | Sorber et al. |
| 4,330,958 A | 5/1982 | Richmond |
| 4,333,270 A | 6/1982 | Catlett |
| 4,348,835 A | 9/1982 | Jones et al. |
| 4,349,939 A | 9/1982 | Tillmann |
| 4,358,870 A | 11/1982 | Hong |
| 4,372,005 A | 2/1983 | Inesso |
| 4,376,323 A | 3/1983 | Tillmann |
| 4,382,311 A | 5/1983 | Watts |
| 4,419,786 A | 12/1983 | Surko, Jr. |
| 4,429,490 A | 2/1984 | Zunkel |
| 4,483,043 A | 11/1984 | Tillmann |
| 4,486,917 A | 12/1984 | Johnston et al. |
| 4,498,033 A | 2/1985 | Aihara et al. |
| 4,501,090 A | 2/1985 | Yoshida et al. |
| 4,506,407 A | 3/1985 | Downey |
| 4,533,905 A | 8/1985 | Leivenzon et al. |
| 4,551,946 A | 11/1985 | Yoshida et al. |
| 4,553,656 A | 11/1985 | Lense |
| 4,573,238 A | 3/1986 | Phillips |
| 4,590,639 A | 5/1986 | Fritsche et al. |
| 4,638,433 A * | 1/1987 | Schindler .................. 700/90 |
| 4,658,468 A | 4/1987 | Tillmann et al. |
| 4,658,545 A | 4/1987 | Ingham et al. |
| 4,660,250 A | 4/1987 | Tillmann et al. |
| 4,663,800 A | 5/1987 | Mettenleiter et al. |
| 4,665,583 A | 5/1987 | Frolov et al. |
| 4,669,147 A | 6/1987 | Suchanek |
| 4,669,218 A | 6/1987 | Kombrekke et al. |
| 4,727,679 A | 3/1988 | Kombrekke et al. |
| 4,750,236 A | 6/1988 | Teague, Jr. |
| 4,783,882 A | 11/1988 | Frolov |
| 4,785,493 A | 11/1988 | Tillmann et al. |
| 4,793,023 A | 12/1988 | Simpson et al. |
| 4,815,163 A | 3/1989 | Simmons |
| 4,847,946 A | 7/1989 | Nam et al. |
| 4,848,031 A | 7/1989 | Yamagishi et al. |
| 4,878,265 A | 11/1989 | Nesbitt |
| 4,894,883 A | 1/1990 | Fleischhauer |
| 4,966,266 A | 10/1990 | Yamada et al. |
| 4,972,629 A | 11/1990 | Merendino et al. |
| 4,973,894 A | 11/1990 | Johansson |
| 4,995,194 A | 2/1991 | Schultze et al. |
| 4,999,551 A | 3/1991 | Yoshida et al. |
| 5,018,304 A | 5/1991 | Longoria |
| 5,024,124 A | 6/1991 | Popov et al. |
| 5,040,331 A | 8/1991 | Merendino et al. |
| 5,048,151 A | 9/1991 | Orii et al. |
| 5,050,268 A | 9/1991 | Toledo |
| 5,063,337 A | 11/1991 | Evin |
| 5,083,342 A | 1/1992 | Klinefelter |
| 5,090,089 A | 2/1992 | Schulte et al. |
| 5,117,646 A | 6/1992 | Nose et al. |
| 5,129,091 A | 7/1992 | Yorimoto et al. |
| 5,187,835 A | 2/1993 | Lee |
| 5,193,647 A | 3/1993 | O'Brien, II |
| 5,219,275 A | 6/1993 | Ribaudo |
| 5,221,239 A | 6/1993 | Catlett |
| 5,230,074 A | 7/1993 | Canova, Jr. et al. |
| 5,243,735 A | 9/1993 | O'Brien, II |
| 5,251,400 A | 10/1993 | Schultze |
| 5,259,090 A | 11/1993 | Fayngersh |
| 5,265,306 A | 11/1993 | Yu |
| 5,272,787 A | 12/1993 | Salena et al. |
| 5,278,480 A * | 1/1994 | Murray .................. 318/626 |
| 5,291,630 A | 3/1994 | Brown |
| 5,337,448 A | 8/1994 | Brown |
| 5,343,593 A | 9/1994 | Fayngersh |
| 5,375,374 A | 12/1994 | Rohroff, Sr. |
| D355,580 S | 2/1995 | Salena et al. |
| 5,386,614 A | 2/1995 | Fayngersh |
| 5,386,885 A | 2/1995 | Bunzl et al. |
| 5,392,562 A | 2/1995 | Carambula |
| 5,417,013 A | 5/1995 | Tillmann |
| 5,428,278 A | 6/1995 | Bollengier et al. |
| 5,468,042 A | 11/1995 | Heinrichs et al. |
| 5,497,641 A | 3/1996 | Linde et al. |
| 5,502,874 A | 4/1996 | Lucas |
| 5,507,120 A | 4/1996 | Current |
| 5,513,467 A | 5/1996 | Current et al. |
| 5,515,649 A | 5/1996 | Strab |
| 5,543,692 A | 8/1996 | Howie et al. |
| 5,589,747 A | 12/1996 | Utke |

(56) References Cited

U.S. PATENT DOCUMENTS

| | | |
|---|---|---|
| 5,594,316 A | 1/1997 | Hayashida |
| 5,630,248 A | 5/1997 | Luca |
| 5,634,296 A | 6/1997 | Hebda |
| 5,651,216 A | 7/1997 | Tillmann |
| 5,666,692 A | 9/1997 | Toledo |
| 5,687,507 A | 11/1997 | Beran |
| 5,706,551 A | 1/1998 | Jeynes et al. |
| 5,709,009 A | 1/1998 | Lasson et al. |
| 5,727,348 A | 3/1998 | Arnell et al. |
| 5,752,344 A | 5/1998 | Richmond |
| 5,770,934 A | 6/1998 | Theile |
| 5,802,670 A | 9/1998 | Bienek |
| 5,828,302 A | 10/1998 | Tsutsumi et al. |
| 5,829,097 A | 11/1998 | Toledo |
| 5,829,508 A | 11/1998 | DeBower et al. |
| 5,832,561 A | 11/1998 | Bienek |
| 5,832,562 A | 11/1998 | Luca |
| 5,838,129 A | 11/1998 | Luh |
| 5,850,671 A | 12/1998 | Kaser |
| 5,851,049 A | 12/1998 | Squire et al. |
| 5,851,050 A | 12/1998 | Squire et al. |
| 5,878,530 A | 3/1999 | Eccleston et al. |
| 5,881,497 A | 3/1999 | Borgardt |
| 5,901,412 A | 5/1999 | Jentsch |
| 5,910,075 A | 6/1999 | Arnell et al. |
| 5,913,763 A | 6/1999 | Beran et al. |
| 5,930,954 A | 8/1999 | Hebda |
| 5,956,249 A | 9/1999 | Beran et al. |
| 5,957,108 A | 9/1999 | Kato |
| 6,006,475 A | 12/1999 | Schwantes et al. |
| 6,038,895 A | 3/2000 | Menke et al. |
| 6,061,964 A | 5/2000 | Arnell et al. |
| 6,067,753 A | 5/2000 | Hebda |
| 6,115,965 A | 9/2000 | Jennings |
| 6,118,243 A | 9/2000 | Reed et al. |
| 6,135,514 A | 10/2000 | Kowalewski et al. |
| 6,167,589 B1 | 1/2001 | Luedtke |
| 6,177,771 B1 | 1/2001 | Kinzer et al. |
| 6,209,695 B1 | 4/2001 | Braford |
| 6,223,469 B1 | 5/2001 | Moll |
| 6,260,236 B1 | 7/2001 | Toledo |
| 6,282,750 B1 | 9/2001 | Bishop et al. |
| 6,318,196 B1 | 11/2001 | Chang |
| 6,336,294 B1 | 1/2002 | Kowalczyx et al. |
| 6,343,437 B1 | 2/2002 | Hoffmann et al. |
| 6,347,485 B1 | 2/2002 | Hebda |
| 6,357,805 B1 | 3/2002 | Hebda |
| 6,384,414 B1 | 5/2002 | Fisher et al. |
| 6,397,430 B1 | 6/2002 | Brown et al. |
| 6,397,431 B1 | 6/2002 | Alonso |
| 6,412,224 B1 | 7/2002 | Feucht et al. |
| 6,430,871 B1 | 8/2002 | Hebda |
| 6,434,788 B1 | 8/2002 | Schulte |
| 6,442,795 B1 | 9/2002 | Chen |
| 6,481,160 B1 | 11/2002 | Kowalczyk |
| 6,484,784 B1 | 11/2002 | Weik, III et al. |
| 6,493,904 B1 | 12/2002 | Chiang |
| 6,530,178 B1 | 3/2003 | Kowalczyk et al. |
| 6,553,717 B2 | 4/2003 | St. John et al. |
| 6,563,431 B1 | 5/2003 | Miller, Jr. |
| 6,588,153 B1 | 7/2003 | Kowalczyk |
| 6,618,899 B1 | 9/2003 | Ginzel et al. |
| 6,633,094 B1 | 10/2003 | Andou |
| 6,634,140 B1 | 10/2003 | Sellman |
| 6,640,494 B2 | 11/2003 | Hormann |
| 6,751,909 B2 | 6/2004 | Ranaudo |
| 6,754,990 B2 | 6/2004 | Pedemonte |
| 6,786,006 B2 | 9/2004 | Kowalczyk et al. |
| 6,786,671 B1 | 9/2004 | Eckendorff |
| 6,883,275 B2 | 4/2005 | Hellinga et al. |
| 6,886,217 B2 | 5/2005 | Foster |
| 6,938,372 B2 | 9/2005 | Kennedy et al. |
| 6,959,949 B2 | 11/2005 | Rockenbach |
| 7,016,263 B2 * | 3/2006 | Gueissaz et al. ............... 368/10 |
| 7,068,179 B2 | 6/2006 | Snell et al. |
| 7,124,469 B2 | 10/2006 | Tsekhanovsky et al. |
| 7,138,912 B2 | 11/2006 | Fitzgibbon et al. |
| 7,170,248 B2 | 1/2007 | Tsui et al. |
| 7,234,201 B2 | 6/2007 | Brown et al. |
| 7,270,029 B1 | 9/2007 | Papanikolaou et al. |
| 7,296,380 B2 | 11/2007 | Backman |
| 7,298,107 B2 | 11/2007 | McMohon |
| 7,310,911 B1 | 12/2007 | Sellman |
| 7,316,096 B2 | 1/2008 | Houser et al. |
| 7,339,336 B2 | 3/2008 | Gregori |
| 7,405,530 B2 | 7/2008 | Keller, Jr. |
| 7,421,761 B2 | 9/2008 | Johnson |
| 7,571,515 B2 | 8/2009 | Fischbach et al. |
| 7,971,316 B2 | 7/2011 | Copeland, II |
| 2001/0007163 A1 | 7/2001 | Alonso |
| 2001/0015033 A1 | 8/2001 | Minami |
| 2002/0092126 A1 | 7/2002 | Chen |
| 2002/0092237 A1 | 7/2002 | Hebda |
| 2002/0133904 A1 | 9/2002 | Donovan et al. |
| 2003/0005639 A1 | 1/2003 | Kowalczyk |
| 2003/0097793 A1 | 5/2003 | Kowalczyk et al. |
| 2003/0204935 A1 | 11/2003 | Kim |
| 2003/0205000 A1 | 11/2003 | Pagowski |
| 2004/0034964 A1 | 2/2004 | Loggen et al. |
| 2004/0068935 A1 | 4/2004 | Ichikawa et al. |
| 2004/0232908 A1 * | 11/2004 | Saito ..................... 324/207.12 |
| 2004/0251868 A1 | 12/2004 | Sato et al. |
| 2005/0000057 A1 | 1/2005 | Tsekhanovsky et al. |
| 2005/0154602 A1 | 7/2005 | Hertz |
| 2006/0021189 A1 | 2/2006 | Johnson |
| 2006/0086468 A1 | 4/2006 | Altimore |
| 2006/0191204 A1 | 8/2006 | Herwig et al. |
| 2006/0197481 A1 | 9/2006 | Hotto et al. |
| 2006/0244271 A1 | 11/2006 | Hass |
| 2009/0034208 A1 | 2/2009 | Suzuki |
| 2009/0093913 A1 * | 4/2009 | Copeland et al. ............. 700/282 |
| 2009/0265992 A1 * | 10/2009 | Hass et al. ..................... 49/340 |
| 2011/0252597 A1 | 10/2011 | Burris et al. |
| 2011/0252598 A1 | 10/2011 | Burris et al. |
| 2011/0257790 A1 | 10/2011 | Burris et al. |
| 2011/0257796 A1 | 10/2011 | Burris et al. |
| 2011/0257797 A1 | 10/2011 | Burris et al. |

FOREIGN PATENT DOCUMENTS

| | | |
|---|---|---|
| DE | 4231984 A1 | 3/1994 |
| DE | 4431789 C1 | 11/1995 |
| DE | 19500844 A1 | 11/1995 |
| DE | 19547683 A1 | 6/1997 |
| DE | 19726021 A1 | 12/1998 |
| DE | 10259925 A1 | 9/2003 |
| EP | 0292743 | 11/1988 |
| EP | 1818490 A2 | 8/2007 |
| GB | 2244092 | 11/1991 |
| GB | 2278882 | 12/1994 |
| JP | 6033994 | 2/1994 |
| JP | 2000213234 | 8/2000 |
| WO | WO 0046476 | 8/2000 |
| WO | WO 0111174 | 2/2001 |
| WO | WO 03042480 | 5/2003 |
| WO | WO 2008134442 | 11/2008 |

OTHER PUBLICATIONS

Yale Security, Inc., International Patent Application No. PCT/US2008/061441, International Preliminary Report on Patentability, Nov. 5, 2009.

Yale Security, Inc., International Patent Application No. PCT/US2005/023398, International Search Report and Written Opinion, Aug. 20, 2007.

Yale Security, Inc., International Patent Application No. PCT/US2005/023398, International Preliminary Report on Patentability, Sep. 20, 2007.

Yale Security, Inc., International Patent Application No. PCT/US2011/032705, International Search Report and Written Opinion, Aug. 22, 2011.

Yale Security Inc., Canadian Application No. 2,698,634, Office Action dated Jun. 10, 2011.

(56) References Cited

OTHER PUBLICATIONS

Yale Security, Inc., European Application No. 08746802.1, Extended European Search Report dated Sep. 13, 2011.

U.S. Appl. No. 12/109,184, Office Action dated Nov. 9, 2009, 8 pages.

U.S. Appl. No. 12/109,184, Office Action dated Feb. 2, 2010, 7 pages.

Yale Security Inc., International Patent Application No. PCT/US2011/032699, International Search Report and Written Opinion, Sep. 9, 2011.

Yale Security Inc., Chinese Application No. 200880021682.7, Office Action, Aug. 22, 2012.

Yale Security Inc., Israeli Application No. 201749, Office Action, Aug. 16, 2012.

Yale Security Inc., International Application No. PCT/US2011/032699, International Preliminary Report on Patentability, Oct. 16, 2012.

* cited by examiner

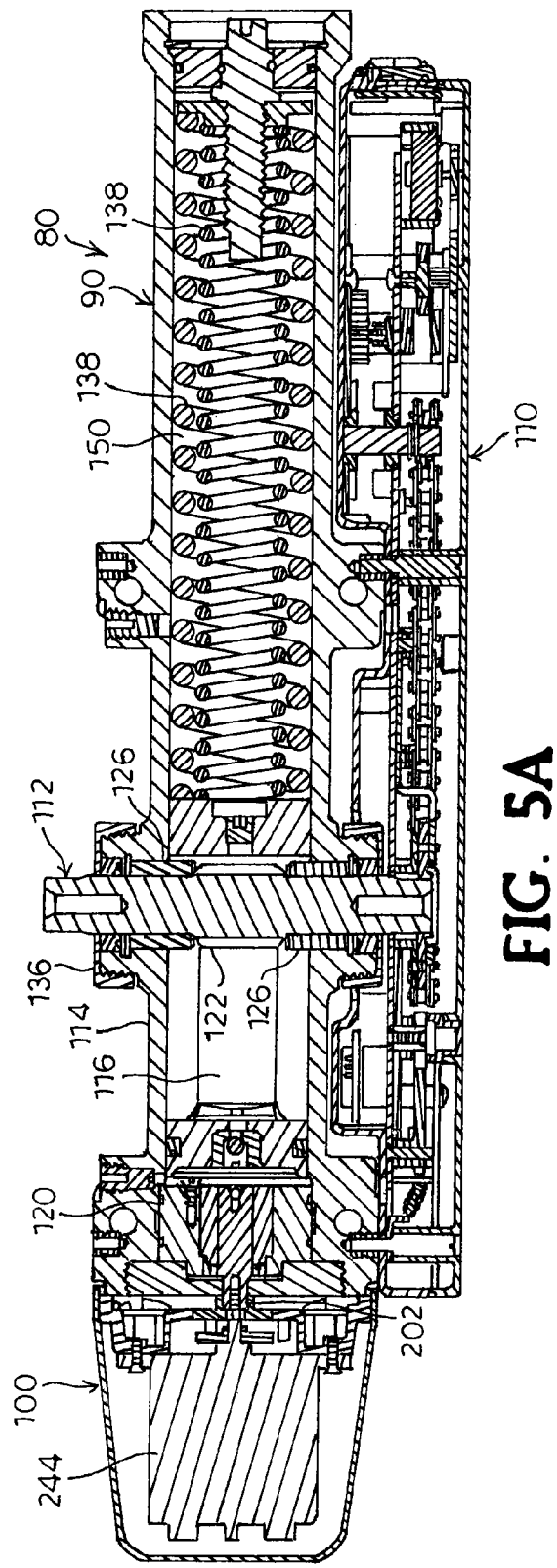

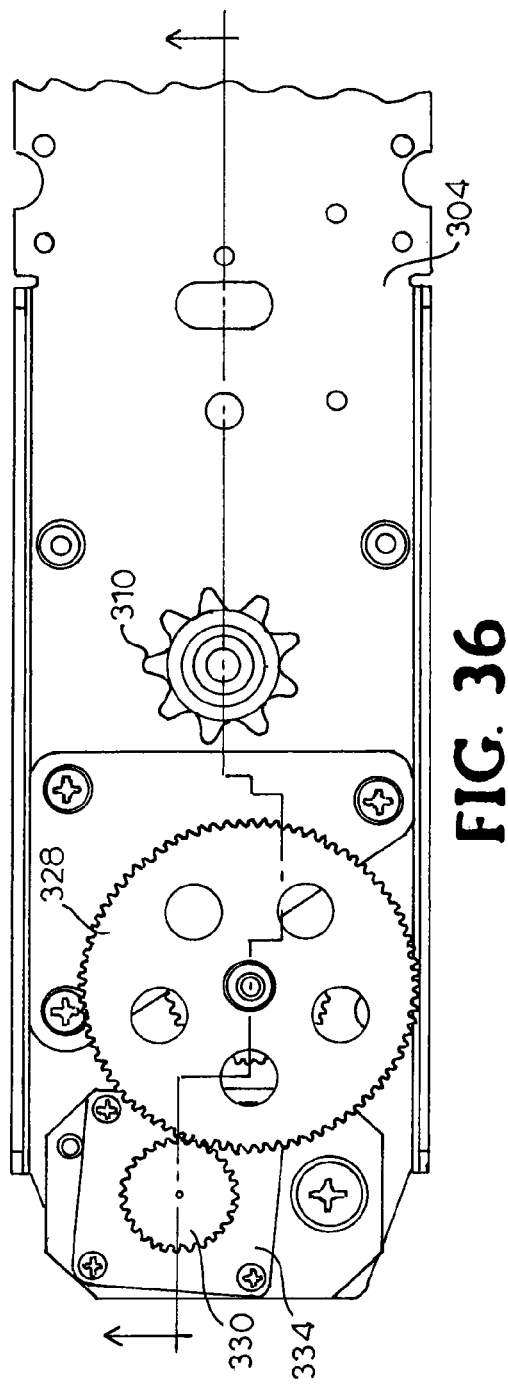
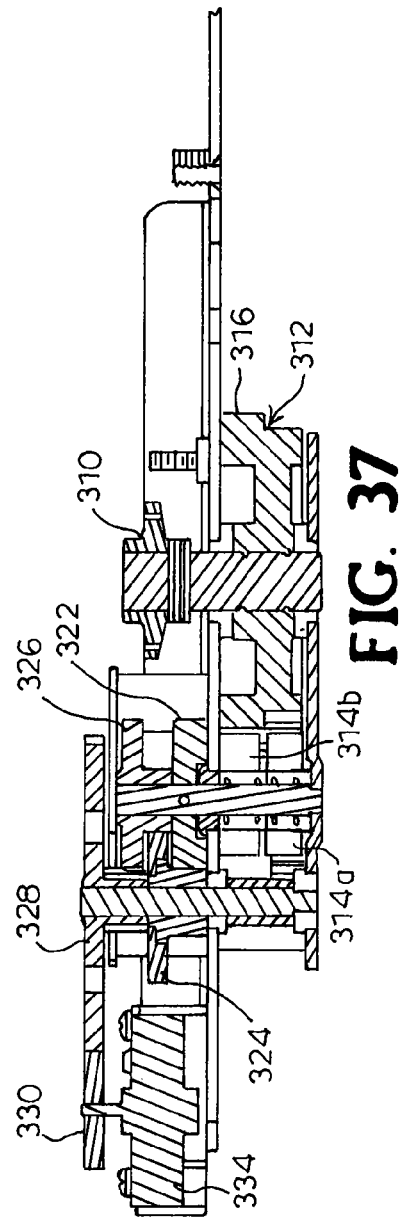
FIG. 36
FIG. 37

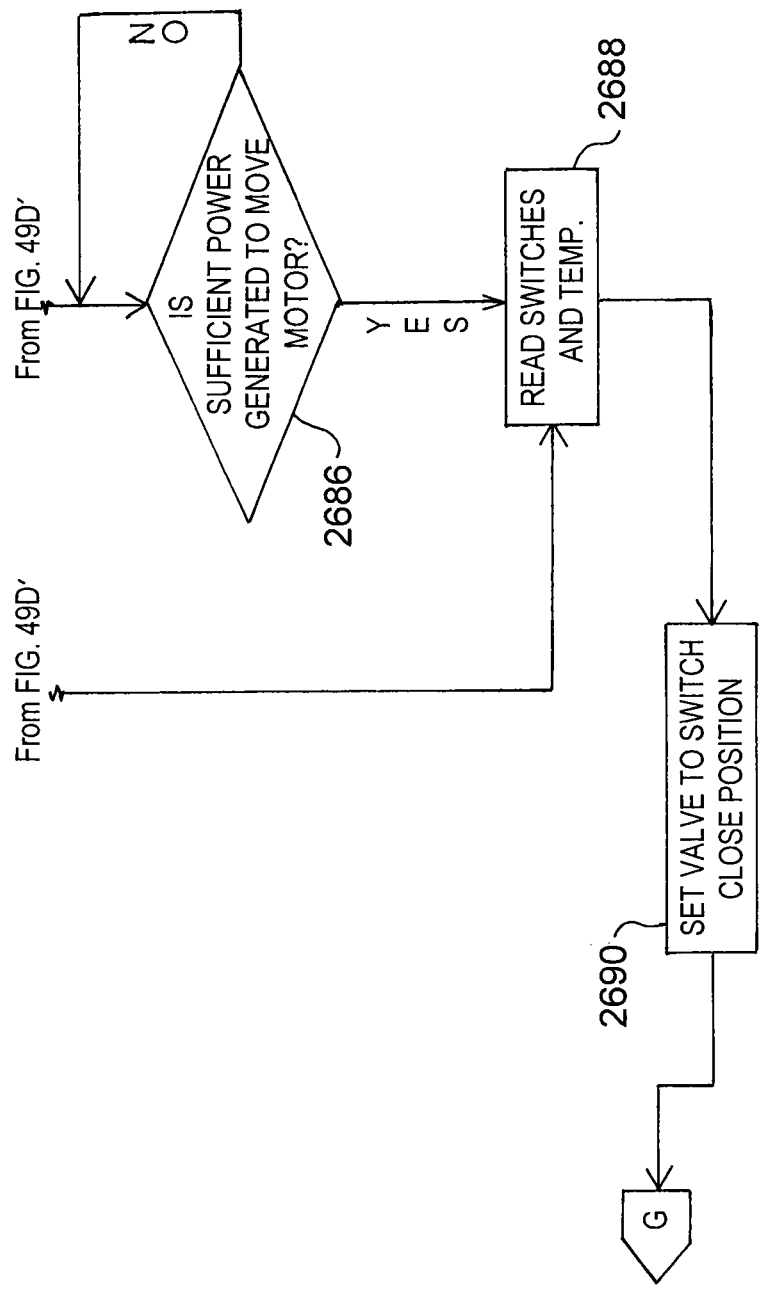
FIG. 49D"

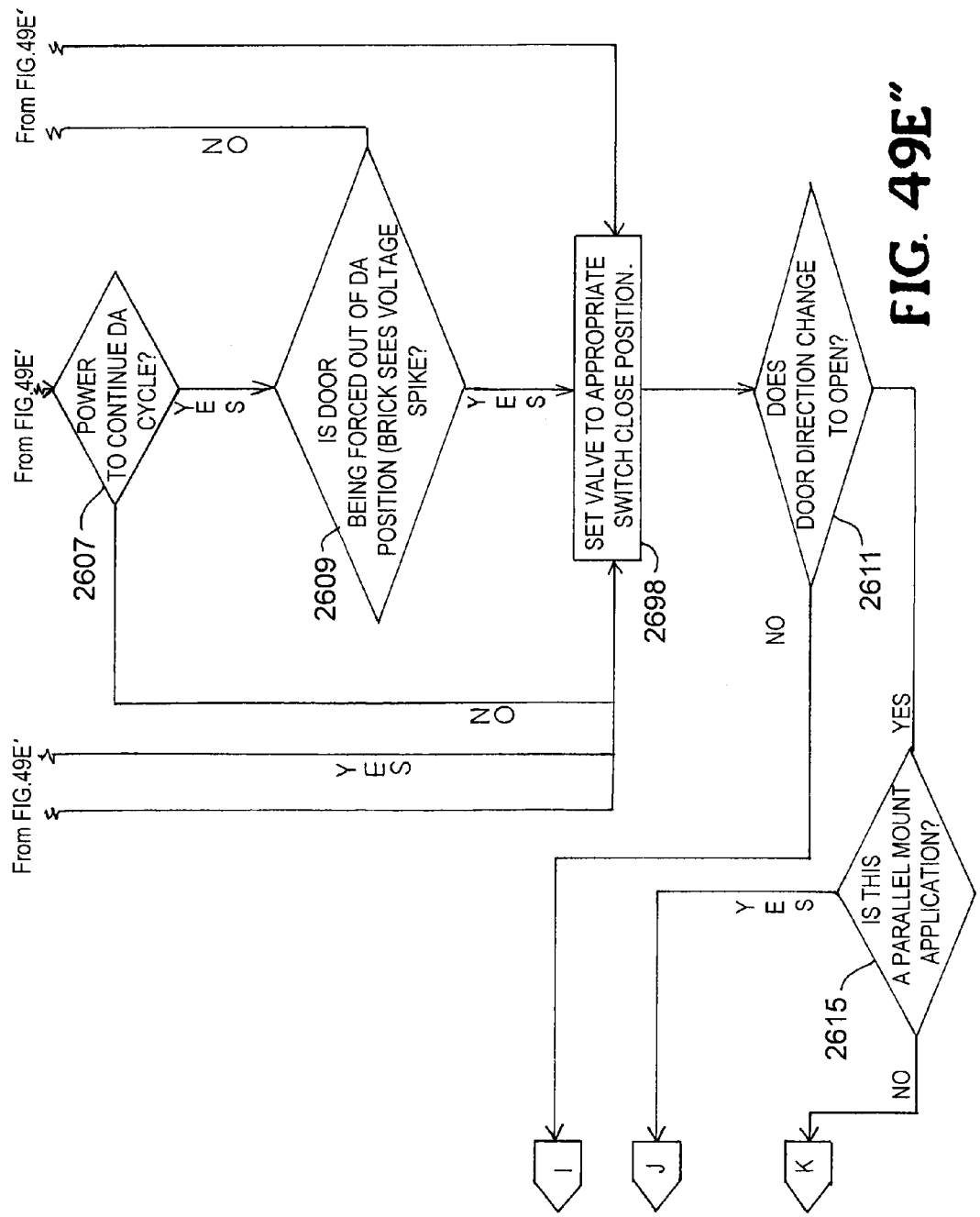
FIG. 49E"

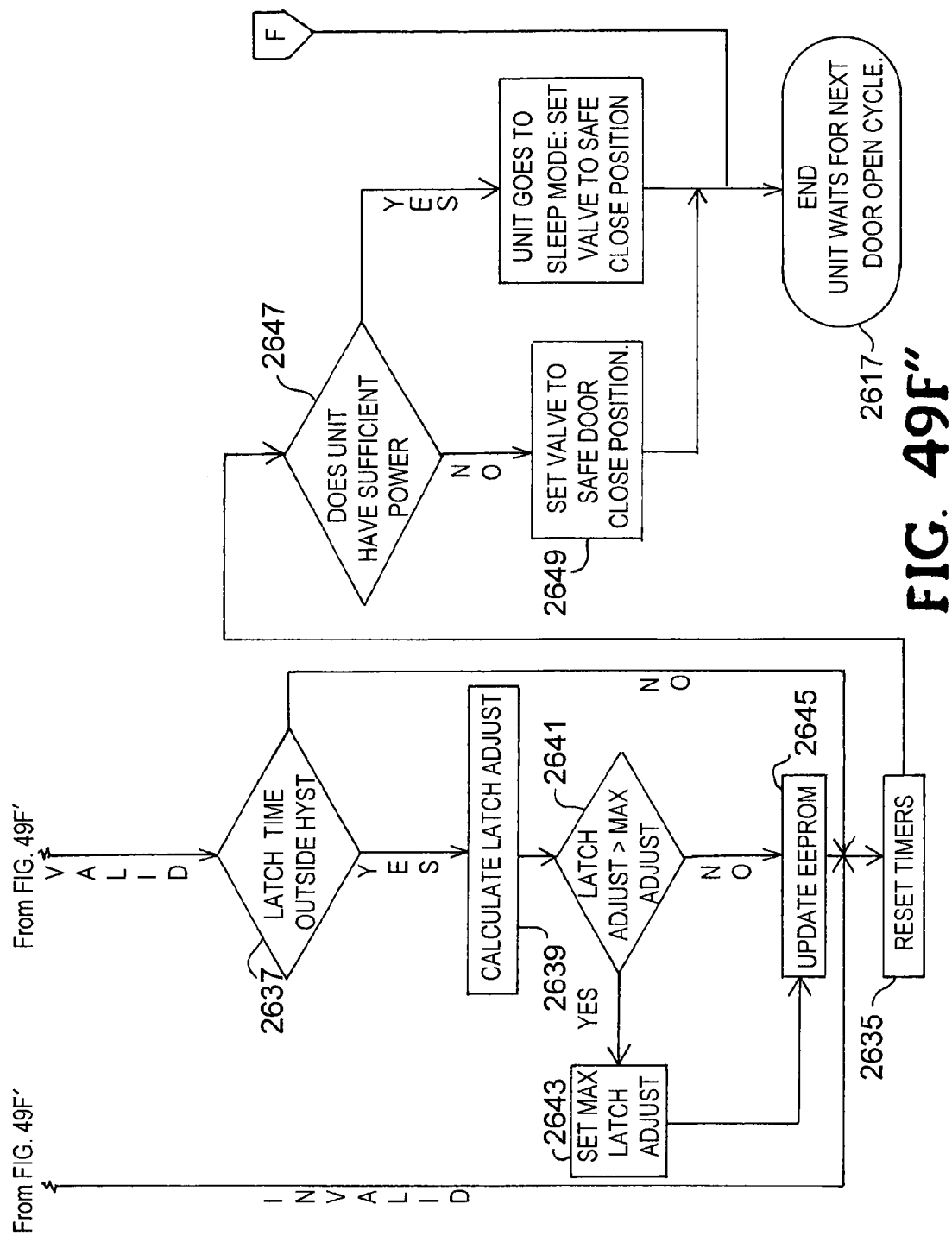
FIG. 49F"

DOOR CLOSER WITH TEACH MODE

BACKGROUND

Door closers are used to automatically close doors; hold doors open for short intervals, and control opening/closing speeds in order to facilitate passage through a doorway and to help ensure that doors are not inadvertently left open. A door closer is often attached to the top or bottom of a door, and when the door is opened and released, the door closer generates a mechanical force that causes the door to automatically close without any user input. Thus, a user may open a door and pass through its doorway without manually closing the door.

Many conventional door closers are designed to apply varying forces to a door as a function of the door angle (i.e., the angle at which the door is open). In this regard, when the door is first opened, the door closer is designed to generate a relatively small force, which tends to push the door closed, so that the door closer does not generate significant resistance to the user's efforts to open the door. However, as the door is further opened thereby increasing the door angle, greater force is applied to the door by the door closer at various predefined door angles.

Many conventional door closers are mechanically actuated and have a plurality of valves, a spring, and a movable element for controlling the varying amounts of force applied to the door as a function of door angle, as described above. A typical door closer may use a piston that moves through a reservoir filled with a hydraulic fluid, such as oil. The piston serves as the movable element to counter the force of the spring. Adjusting the valve settings in such a conventional door closer can be difficult and problematic since closing times and forces can vary depending on temperature, pressure, wear and installation configuration. Moreover, adjusting the valve settings in order to achieve a desired closing profile for a door can be burdensome for at least some users. Many door closers exhibit much less than ideal closing characteristics because users are either unwilling or unable to adjust and re-adjust the valve settings in a desired manner or are unaware that the settings can be changed in order to effectuate a desired closing profile in the face of temperature changes, wear over time and/or modifications to the physical installation.

SUMMARY

Embodiments of the present invention include a door closer that can be self powered and includes a control unit to intelligently control a valve within the door closer to vary the operating characteristics of the door closer as needed. The control unit includes a teach mode that can be invoked at installation time, or any other time, so that appropriate information can be stored in memory regarding an installation configuration, relative jamb position, swing (right or left handed) and other parameters. The control unit may also be referred to herein as a controller. In some embodiments, the door closer includes a spring and a movable element that loads the spring and is also configured to move in response to movement of the door. The valve is configured to control movement of hydraulic fluid around the movable element to very the operating characteristics of the door closer.

Embodiments of the present invention include a method of operating a controller for a door closer in a teach mode. In some embodiments, the method includes reading a user interface to determine an installation configuration for the door closer when the controller is in teach mode, or at any other time. The position of the door can be monitored as the door moves in order to determine a swing for the door. By "swing" what is meant is whether the door opens to the left or to the right. The position and/or movement of the door can also be monitored to determine when the door is at a jamb position, so that the relative jamb position of the mechanical parts of the closer can be determined. Values regarding at least the installation configuration, the swing and the jamb position, as well as any other necessary parameters can be stored in the controller to be accessed by control circuitry in the controller for use in controlling the door closer during normal operation.

In some embodiments, the controller determines that a teach mode has been entered by sensing a change in a magnetic field using a hall effect sensor. The change in magnetic field can be triggered by a user pushing a button. In some embodiments, the stored values are compared against a stored calibration curve, and can be skewed as a result of the comparison.

In some embodiments, the controller includes a position sensor to determine a position of the door, and control circuitry with a connection for a motor to control the valve in the door closer. The control circuitry is operable to set the valve in response to the position of the door and parameters stored in memory, including the installation configuration, relative jamb position, and swing. A generator, a battery holder, or a connection for external power can be included to provide electricity to power the controller. In the case of a battery holder, a battery would need to be installed for the door closer to operate.

BRIEF DESCRIPTION OF THE DRAWINGS

For a more complete understanding of the present invention, reference should now be had to the embodiments shown in the accompanying drawings and described below. In the drawings:

FIG. 5A is a longitudinal cross-section view of the assembled door closer assembly taken along line 5-5 of FIG. 4 with the door in a closed position.

FIG. 36 is partial top plan view of the power generator portion of the control unit as shown in FIG. 32.

FIG. 37 is a longitudinal cross-section view of the power generator taken along line 37-37 of FIG. 36.

DETAILED DESCRIPTION OF THE INVENTION

Figure 1:
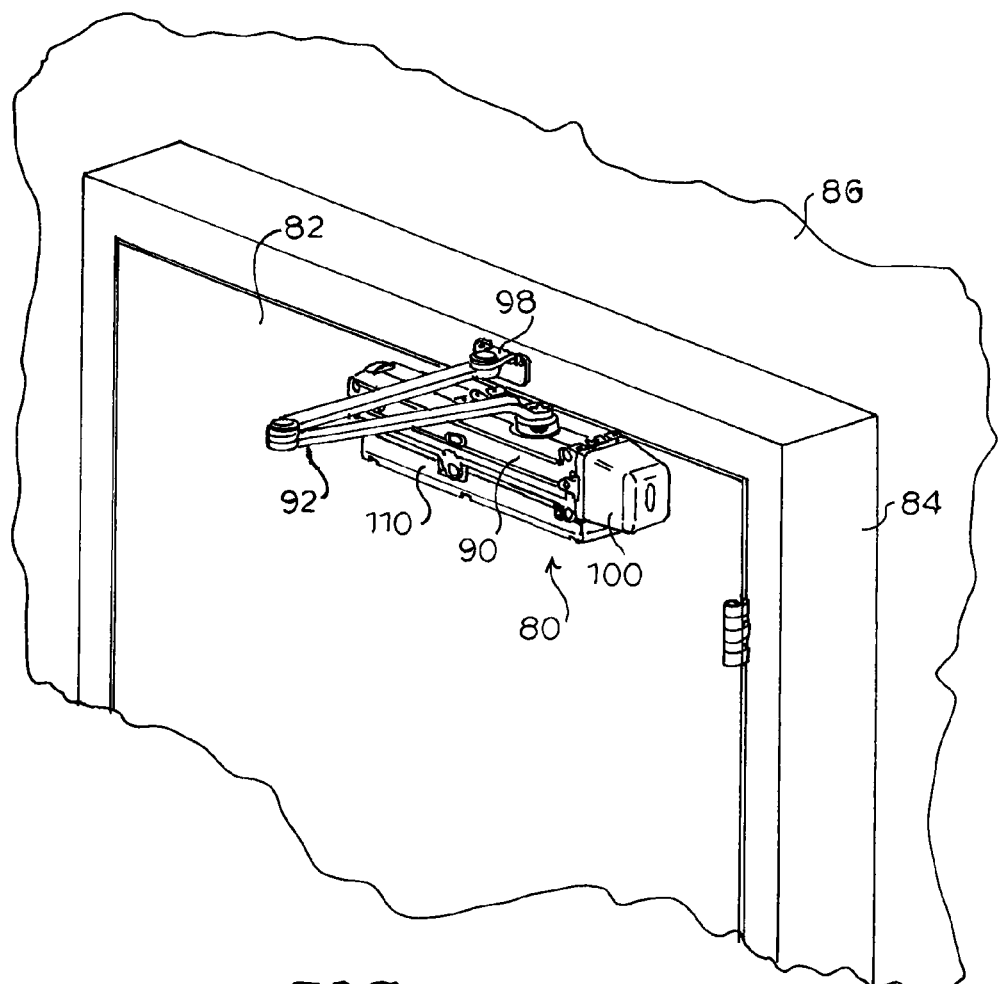
FIG. 1 is cut-away perspective view of an embodiment of a door closer assembly in position on a door.

Terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" or "comprising," when used in this specification, specify the presence of stated features, steps, operations, elements, or components, but do not preclude the presence or addition of one or more other features, steps, operations, elements, components, or groups thereof. Additionally, comparative, quantitative terms such as "above", "below", "less", "greater", are intended to encompass the concept of equality, thus, "less" can mean not only "less" in the strictest mathematical sense, but also, "less than or equal to."

It should also pointed out that references made in this disclosure to figures and descriptions using positional terms such as, but not limited to, "top", "bottom", "upper," "lower," "left", "right", "behind", "in front", "vertical", "horizontal", "upward," and "downward", etc., refer only to the relative position of features as shown from the perspective of the reader. Such terms are not meant to imply any absolute positions. An element can be functionally in the same place in an actual product, even though one might refer to the position of the element differently due to the instant orientation of the device. Indeed, the components of the door closer may be oriented in any direction and the terminology, therefore, should be understood as encompassing such variations unless specified otherwise.

As used herein, the term "open position" for a door means a door position other than a closed position, including any position between the closed position and a fully open position as limited only by structure around the door frame, which can be up to 180° from the closed position.

The present disclosure generally relates to systems and methods for controlling of door closers. For example, the door closer may be controlled so that when a first predefined door angle such as, for example, 50 degrees is reached, the door closer increases the force applied to the door. The force applied to the door as the door is opened wider may remain substantially constant until another predefined angle such as, for example, 70 degrees is reached, at which point an even greater force is applied to the door. The force may be similarly increased for other predefined door angles. As the door angle increases or, in other words, as the door is opened wider, it generally becomes more difficult to continue pushing the door open. Such a feature helps to prevent the door from hitting a door stop or other object, such as a wall, with a significant force thereby helping to prevent damage to the door or the object hit by the door.

When the door is released by the user, the force generated by the door closer begins to push the door closed. As the door reaches the predefined angles described above, the force applied to the door decreases. Thus, initially, when the door has been opened wide, there may be a relatively significant force applied to the door, thereby helping to start moving the door to the closed position. However, at each predefined angle, the force applied to the door by the door closer decreases. Thus, as the door angle decreases or, in other words, as the door is closing, the force applied to the door generally decreases as a function of door angle. Indeed, by the time the door is about to fully close, the force applied to the door is sufficiently small to prevent damage to the door when the door contacts the door frame. Further, having a relatively small amount of force applied to the door at small door angles helps to prevent injury to a user in the event that a finger, arm, foot, or other body part is struck by the door as the door closes.

In one embodiment, a door closer has a valve that is electrically actuated such that the position of the valve can be dynamically changed during operation. Thus, as a door opens and closes, the valve position can be changed in order to provide varying levels of hydraulic resistance as a function of door angle, so that only one valve is strictly necessary to provide such varying levels of resistance. Further, a desired closing profile can be reliably and precisely implemented without a user having to manually adjust the positions of a plurality of valves.

Referring now to the drawings, wherein like reference numerals designate corresponding or similar elements throughout the several views, a door closer assembly according to the present invention is shown and generally designated at 80. Referring to FIG. 1, the door closer assembly 80 is mounted to a door 82 in a door frame 84. The door 82 is movable relative to the frame 84 between a closed position and an open position. For the purpose of this description, only the upper portion of the door 82 and the door frame 84 are shown. The door 82 is of a conventional type and is pivotally mounted to the frame 84 for movement from the closed position, as shown in FIG. 1, to an open position for opening and closing an opening through a building wall 86 to allow a user to travel from one side of the wall to the other side of the wall.

Figure 2:
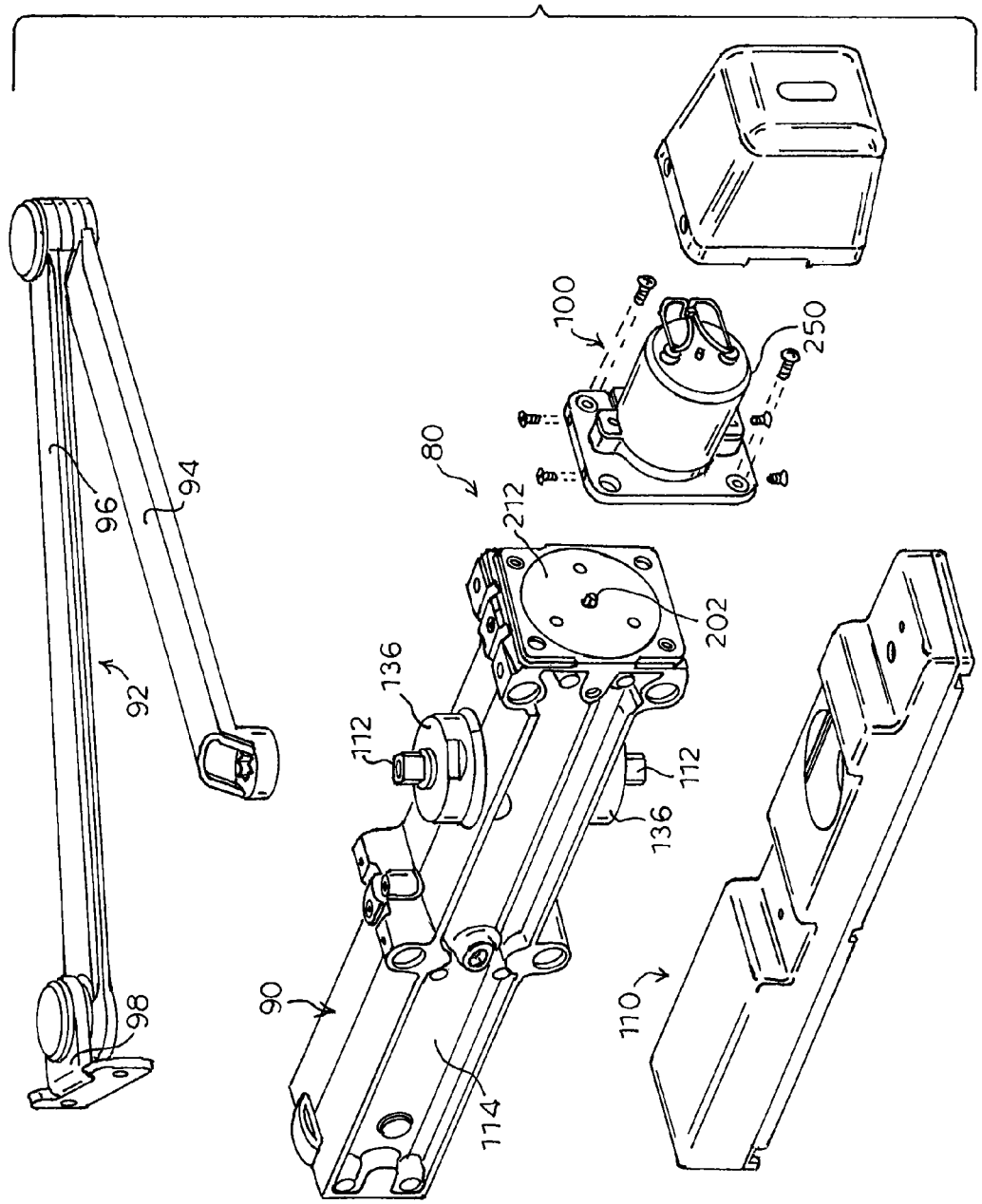
FIG. 2 is an exploded perspective view of the door closer assembly shown in FIG. 1.

As shown in FIGS. 1 and 2, an embodiment of a door closer assembly 80 comprises a door closer 90, including a linkage assembly 92 for operably coupling the door closer assembly 80 to the door frame 84, a drive unit 100, and a control unit 110. As seen in FIG. 2, ends of a rotating pinion 112 extend from the top and bottom of the door closer 90 for driving the linkage assembly 92 to control the position of the door 82. FIG. 1 shows a linkage assembly 92 for a push side mounting of the door closer assembly 80 to the door 82, comprising a first rigid connecting arm link 94 and a second rigid connecting arm link 96. The first connecting arm link 94 is fixed at one end for rotation with the upper end of the pinion 112 (FIG. 1) and at the other end is pivotally connected to an end of the second connecting arm link 96. The other end of the second connecting arm link 96 is pivotally joined to a mounting bracket 98 fixed to the door frame 84. A linkage assembly for a pull side mounting (not shown) of the door closer assembly 80 to the door 82 is also suitable. Both push side and pull side mounting of the linkage assemblies are well known in the art. Further, it should be understood that the linkage assembly 92 for use in the present invention may be any arrangement capable of linking the door closer 90 to the door 82 in such a manner that the door closer assembly 80 affects movement of the door 82. Thus, numerous alternative forms of the linkage assembly 92 may be employed.

The door closer assembly 80 is securely mounted to the upper edge of the door 82 using mounting bolts (not shown), or other fasteners. The door closer assembly 80 extends generally horizontally with respect to the door 82. The drive unit 100 and the control unit 110 are fixed to the door closer 90. A cover (not shown) attaches to the door closer assembly 80. The cover serves to surround and enclose the components of the door closer assembly 80 to reduce dirt and dust contamination, and to provide a more aesthetically pleasing appearance. It is understood that although the door closer assembly 80 is shown mounted directly to the door 82, the door closer assembly 80 could be mounted to the door frame 84 or to the wall adjacent the door frame 84 or concealed within the wall 86 or the door frame 84. Concealed door closer assemblies are well known in the art of automatic door closer assemblies.

The door closer 90 is provided for returning the door 82 to the closed position by providing a closing force on the door 82 when the door is in an open position. The door closer 90 includes an internal return spring mechanism such that, upon rotation of the pinion 112 during door 82 opening, the spring mechanism will be compressed for storing energy. As a result, the door closer 90 will apply on the linkage assembly 92 a moment force which is sufficient for moving the door 82 in a closing direction. The stored energy of the spring mechanism is thus released as the pinion 112 rotates for closing the door 82. The closing characteristics of the door 82 can be controlled by a combination of the loading of the return spring mechanism and the controlled passage of fluid through fluid passages between variable volume compartments in the door closer housing, as described more fully below.

FIGS. 3-7 depict an embodiment of the door closer 90. The door closer 90 comprises a housing 114 defining an internal chamber which is open at both ends. The chamber accommodates the pinion 112, a piston 116, a spring assembly 118, and a valve assembly 120. The housing 114.

The pinion 112 is an elongated shaft having a central gear tooth portion 122 bounded by intermediate cylindrical shaft portions 124. The pinion 112 is rotatably mounted in the door closer housing 114 such that the pinion 112 extends normal to the longitudinal axis of the housing 114. The intermediate cylindrical shaft portions 124 of the pinion 112 are rotatably supported in bearings 126 each held between an inner washer 128 and an outer retaining ring 130 disposed within opposed annular bosses 132 formed on the top surface and the bottom surface of the housing 114. The outer ends of the shaft of the pinion 112 extend through the openings in the bosses 132 and outwardly of the housing 114. The ends of the pinion 112 are sealed by rubber u-cup seals 134 which fit over the ends of the pinion 112 and prevent leakage of a hydraulic working fluid from the chamber of the housing 114. The periphery of the bosses 132 are externally threaded for receiving internally threaded pinion seal caps 136.

The spool-shaped piston 116 is slidably disposed within the chamber of the housing 114 for reciprocal movement relative to the housing 114. In this arrangement, as shown in the FIGS. 5-7, the piston 116 divides the chamber in the housing 114 into a first variable volume chamber 148 between one end of the piston 116 and the valve assembly 120 and a second variable volume chamber 150 between the other end of the piston 116 and the spring assembly 118. The central portion of the piston 116 is open and defines opposed rack teeth 117. The pinion 112 is received in the open central portion of the piston 116 such that the gear teeth 122 on the pinion 112 engage the rack teeth 117 in the piston 116. It is thus understood that rotation of the pinion 112 will cause linear movement of the piston 116 by interaction of the gear teeth 122 and the rack teeth 117 in a conventional manner known in the art.

Figure 5B:
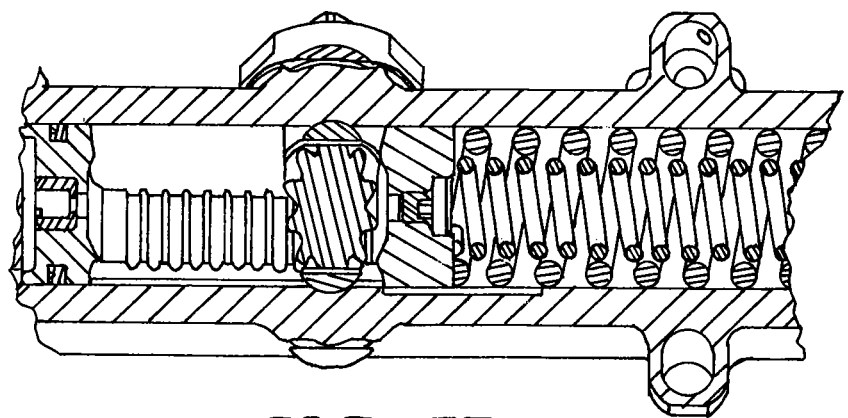
FIG. 5B is a close-up view of a portion of the assembled door closer assembly as shown in FIG. 5.
Figure 6:
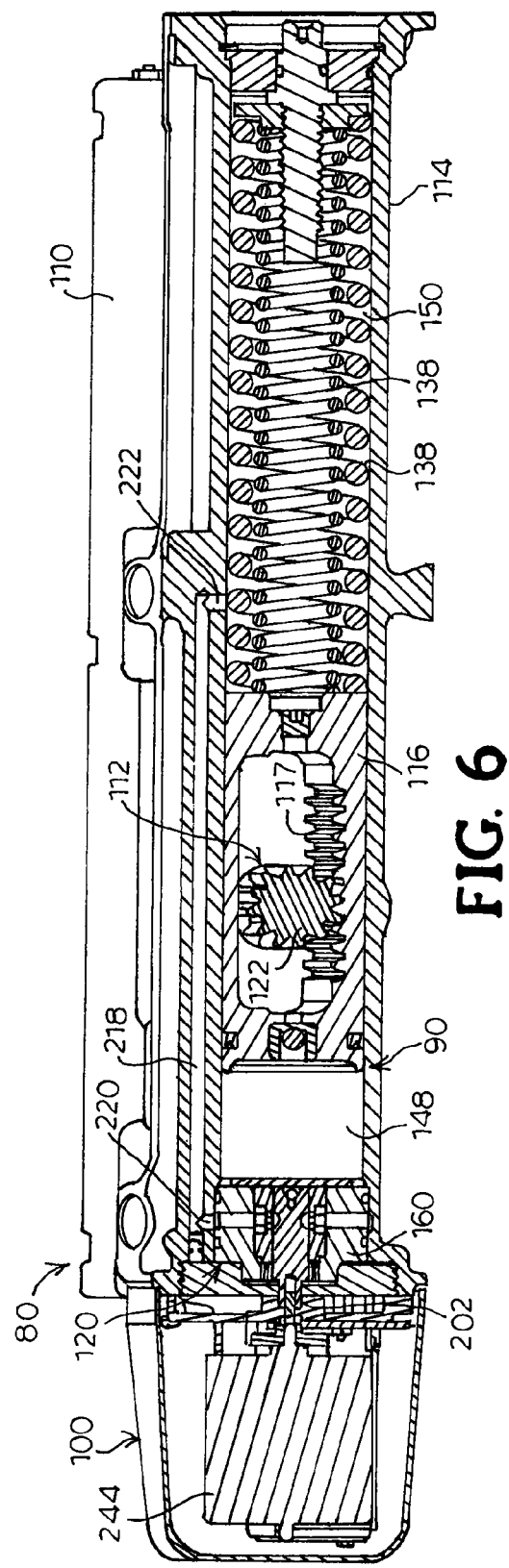
FIG. 6 is a longitudinal cross-section view of the assembled door closer assembly taken along line 6-6 of FIG. 4 with the door in a closed position.
Figure 7:
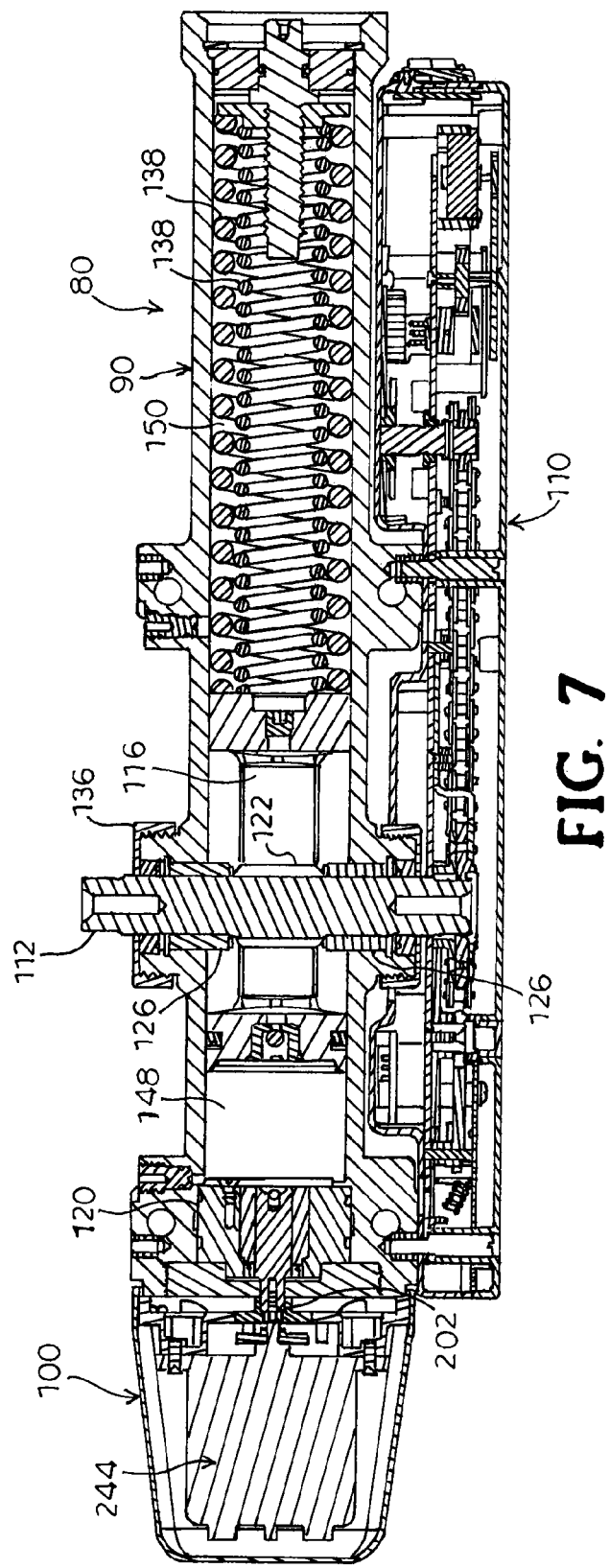
FIG. 7 is a longitudinal cross-section view of the assembled door closer assembly as shown in FIG. 5 with the door in an open position.

The spring assembly 118 comprises two compression springs 138, one nested inside the other and supported between the piston 116 and an end plug assembly 140. The end plug assembly 140 includes an end plug 142, an adjusting screw 144, and a retaining ring 146. The end plug 142 is an externally threaded disc sealingly secured in the threaded opening in the end of the housing 114. The end plug 142 is sealed to the wall of the housing 114 with the retaining ring 146 disposed in a circumferential groove on the periphery of the end plug 142. The end plug 142 thus effectively seals the end of the housing 114 against leakage of fluid. The adjusting nut 144 is held in the housing 114 between the springs 138 and the end plug 142. The springs 138 urge the piston 116 towards the left end of the housing 114, as seen in FIGS. 5-7. The adjusting nut 144 is accessible by tool from the end of the housing 114, and rotating the adjusting nut 144 sets the initial compressed length of the springs 138.

A fluid medium, such as hydraulic oil, is provided in the chamber in the housing 114 to cooperate with the piston 116. The end of the piston 116 adjacent the first variable volume chamber 148 includes a centrally located check ball assembly 152 and has a circumferential groove for accommodating a u-cup seal 154 which seats against the inside wall of the housing 114. The other end of the piston 116 adjacent the second variable volume chamber 150 is closed and sealed relative to the inside wall of the housing 114 to prevent passage of fluid, except in the area of a longitudinal groove 156 (FIG. 5A) of pre-determined length in the inside wall of the housing 114.

Figure 13A:
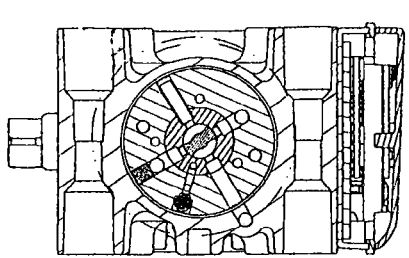
FIGS. 13A and 13B are transverse cross-section views of the valve assembly taken along line 13-13 of FIG. 10 with the valve in a closed position.
Figure 13B:
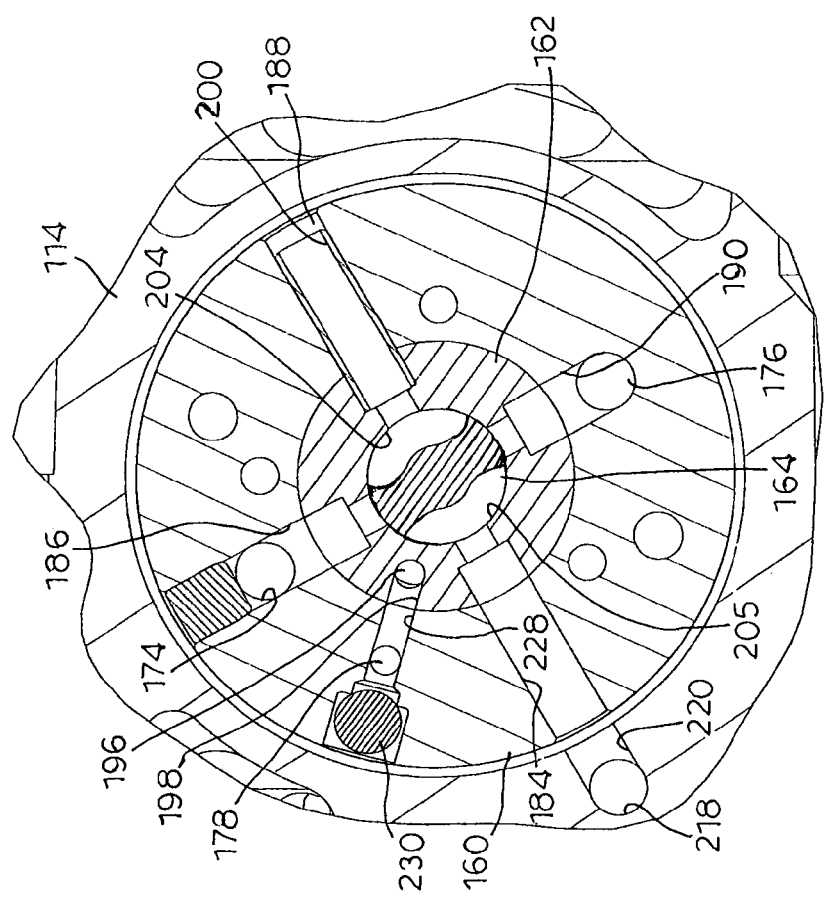
Figure 13C:
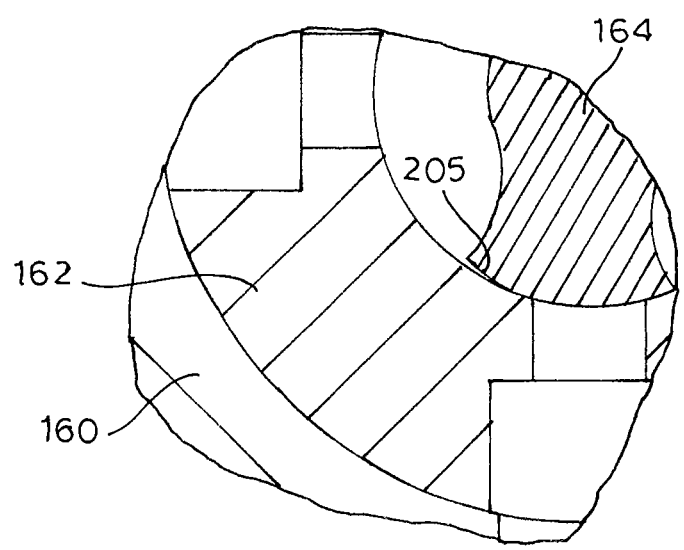
FIG. 13C is a close-up view of a portion of the valve shaft and valve sleeve in a position shown in FIGS. 13A and 13B.
Figure 14A:
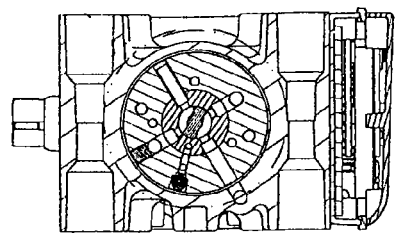
FIGS. 14A and 14B are transverse cross-section views of the valve assembly taken along line 14-14 of FIG. 10 with the valve in an open position.
Figure 14B:
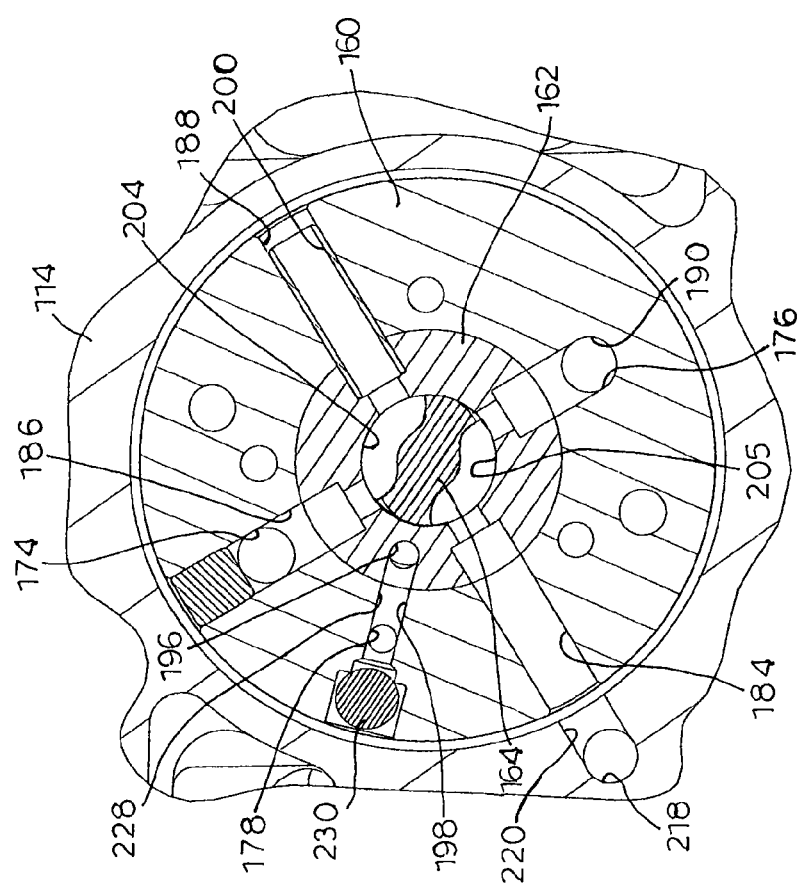

The valve assembly 120 is sealingly disposed in the opening in the end of the housing 114 adjacent the piston 116. Referring to FIGS. 8-15, the valve assembly 120 comprises a valve housing 160, a valve sleeve 162, a valve shaft 164 and a spool plate 166. The valve housing 160 is a cylindrical member including a relatively short cylindrical axial projection 168 at an outer end. The valve housing 160 defines a central axial opening 170 therethrough. The outer end of the valve housing 160 defines a portion of the opening 161 having a smaller diameter than the remainder of the opening thereby forming a shoulder 171 (FIGS. 11, 12 and 15) in the axial opening 170 adjacent the outer end of the valve housing 160. The inner end of the valve housing 160 has six spaced axial bores 172, 174, 176, 178 in the inner surface of the valve housing. Three equally spaced bores 172 are threaded screw holes for receiving screws 173 for securing the spool plate 166 to the valve housing 160. The remaining three bores 174, 176, 178 are fluid passages. Spaced circumferential grooves 180 are provided in the periphery of the valve housing 160 for receiving o-rings 182. The grooves 180 define an intermediate circumferential surface onto which radial passages 184, 186, 188, 190, 192 open (FIGS. 13 and 14). Four of the radial passages 184, 186, 188, 190 are drilled through to the central axial opening 170.

Figure 11:
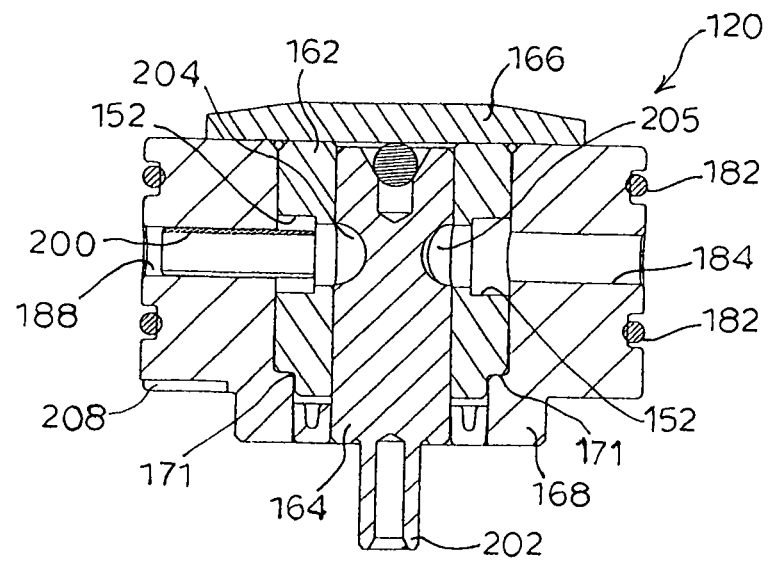
FIG. 11 is a longitudinal cross-section view of the valve assembly taken along line 11-11 of FIG. 9.
Figure 12:
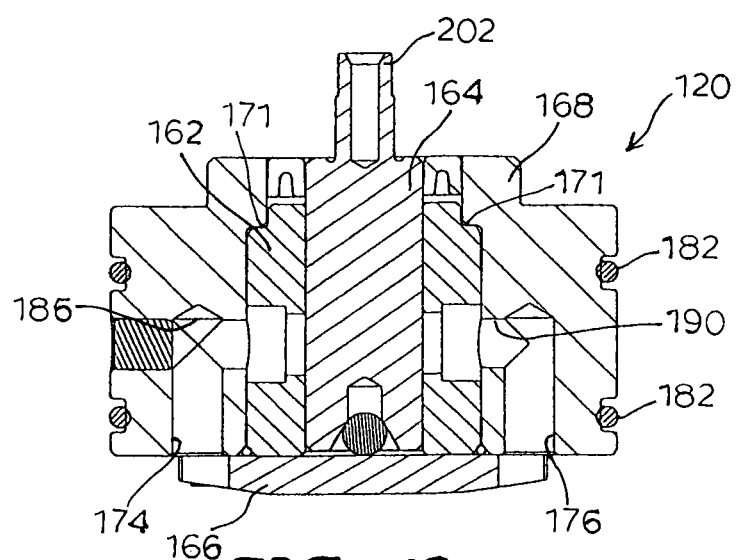
FIG. 12 is a longitudinal cross-section view of the valve assembly taken along line 12-12 of FIG. 9.
Figure 15:
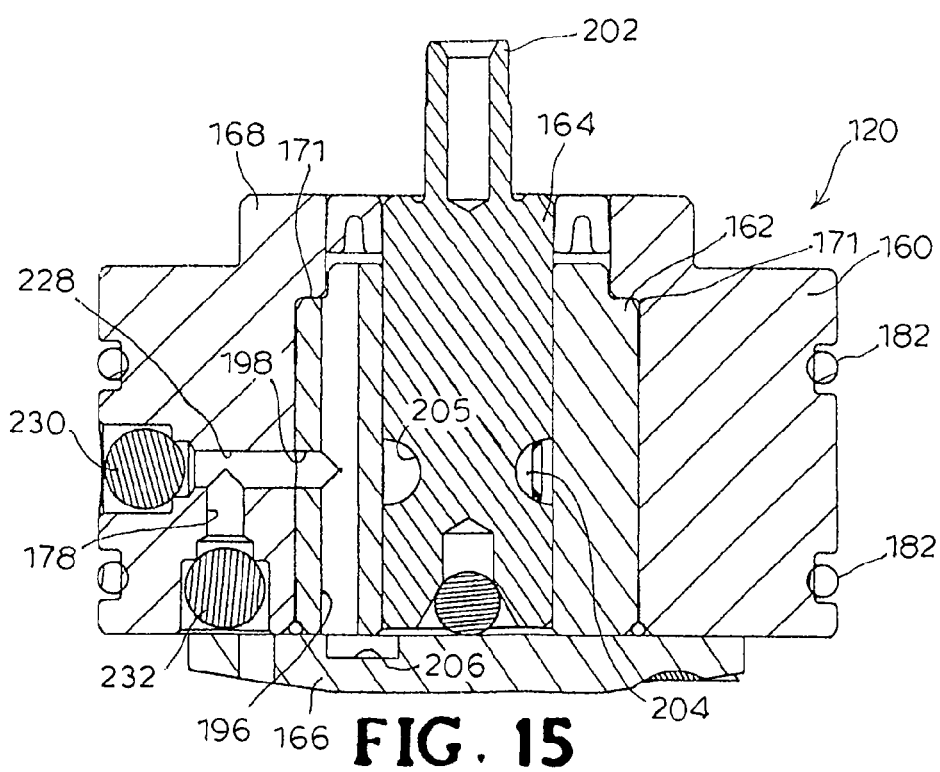
FIG. 15 is a longitudinal cross-section view of the valve assembly taken along line 15-15 of FIG. 10.

The cylindrical valve sleeve 162 fits into the axial opening 170 in the valve housing 160. The valve sleeve 162 defines a central axial opening 163 therethrough. The valve sleeve 162 has four equally, circumferentially spaced radial openings 194 opening into the central axial opening 163. The valve sleeve 162 has a second smaller axial passage 196 therethrough (FIG. 15). A small radial bore 198 in the periphery of the valve sleeve 162 connects to the second axial passage 196. The valve sleeve 162 fits into the valve housing 160 such that each of the radial openings 194 is aligned with one of the pass through radial openings 184, 186, 188, 190 in the valve housing 160. As best seen in FIG. 11, one corresponding set of the openings 188, 194 in the housing 160 and sleeve 162 is sized to receive a hollow pin 200 for locking the valve sleeve 162 to the valve housing 160.

The cylindrical valve shaft 164 is journaled inside the valve sleeve 162. The outer end of the valve shaft 164 carries a cut off screw 202 with a square end. Opposed partial circumferential grooves 204, 205 are provided intermediate the ends of the valve shaft 164. The valve shaft 164 is configured such that when the valve shaft 164 is disposed inside the valve sleeve 162, the grooves 204, 205 are at the same relative axial position as the radial openings 194 in the valve sleeve 162.

The spool plate 166 is attached to the inner surface of the valve housing 160 using screws 173 threaded into the three passages 172 in the valve housing 160 for holding the valve sleeve 162 in place. The inner surface of the spool plate 166 has a depression 206 (FIG. 15) which is aligned with the second axial passage 196 in the valve sleeve 162 when the spool plate 166 is secured to the valve housing 160 for fluid transfer during high pressure situations, as will be described below.

The valve assembly 120 fits into the end of the housing 114 (FIGS. 3, 5-7). Each of the outer surface of the valve housing 160 and the end of the housing 114 has a depression 208 for receiving an anti-rotation tab 210. An externally threaded disc 212 and o-ring 214 is secured in an internally threaded opening in the end of the housing 114. The cut-off screw 202 on the valve shaft 164 rotatably extends through a central hole in the disc 212 and is held in place by the disc. As seen in FIGS. 5-7, a circumferential groove 216 is provided in the housing 114. With the valve assembly 120 in place, the groove 216 is disposed between the o-rings 182 for forming a fluid path around the periphery of the valve housing 160 defined by the periphery of the valve housing between the o-rings 182 and the inner surface of the housing 114 defining the groove 216.

As seen in FIG. 6, the housing 114 is provided with a passage 218 through which fluid is transferred during reciprocal movement of the piston 116 in the chamber for regulating movement of the door 82. The fluid passage 218 runs longitudinally between a radial passage 220 in the housing 114 opening into the end of the housing 114 adjacent the valve assembly 120 to a radial passage 222 in the housing 114 opening into the chamber adjacent the spring assembly 118. The passage 218 thus serves as a conduit for fluid to pass between the first variable volume chamber 148 on one side of the piston 116 and the second variable volume chamber 150 on the other side of the piston 116.

When the door 82 is in the fully closed position, the components of the door closer 90 according to the present invention are as shown in FIG. 5. As the door 82 is opened, the door rotates the pinion 112 and thereby advances the piston 116 linearly to the right as seen in FIGS. 6 and 7. Movement of the piston 116, in turn, compresses the springs 138 between the piston 116 and the end plug 142. It is understood that the door closer assembly 80 can be used on a left hand door or a right hand door and, therefore, the door could be opened in a either a clockwise or a counterclockwise direction.

As the piston 116 moves toward the right end of the chamber in the housing 114, the fluid surrounding the springs 138 is forced through the radial passage 222 and into the longitudinal fluid passage 218. The fluid passes through the radial passage 220 at the end of the housing 114 adjacent the valve assembly 120 and into the groove 216 in the housing 114. Fluid thus surrounds the central portion of the valve housing 160 between the o-rings 182 such that the opposed radial bores 184, 188 in the valve housing 160 are in fluid communication with the main fluid passage 218 through the housing 114 (FIG. 6). The fluid flows into the radial passages 184, 188 in the valve housing 160 and the through the corresponding openings 194 in the valve sleeve 162 toward the valve shaft 164. If the valve shaft 164 is in a closed position (FIG. 13), the fluid cannot advance because the valve shaft 164 covers the openings to the other radial passages. If the valve shaft 164 is rotated to an open position, such that a flow path exists between the radial passages as shown in FIG. 14, the fluid can flow to the radial passages 186, 190 in the valve housing 160 and to the axial passages 174, 176 which open into the first variable volume chamber 148.

Figure 8:
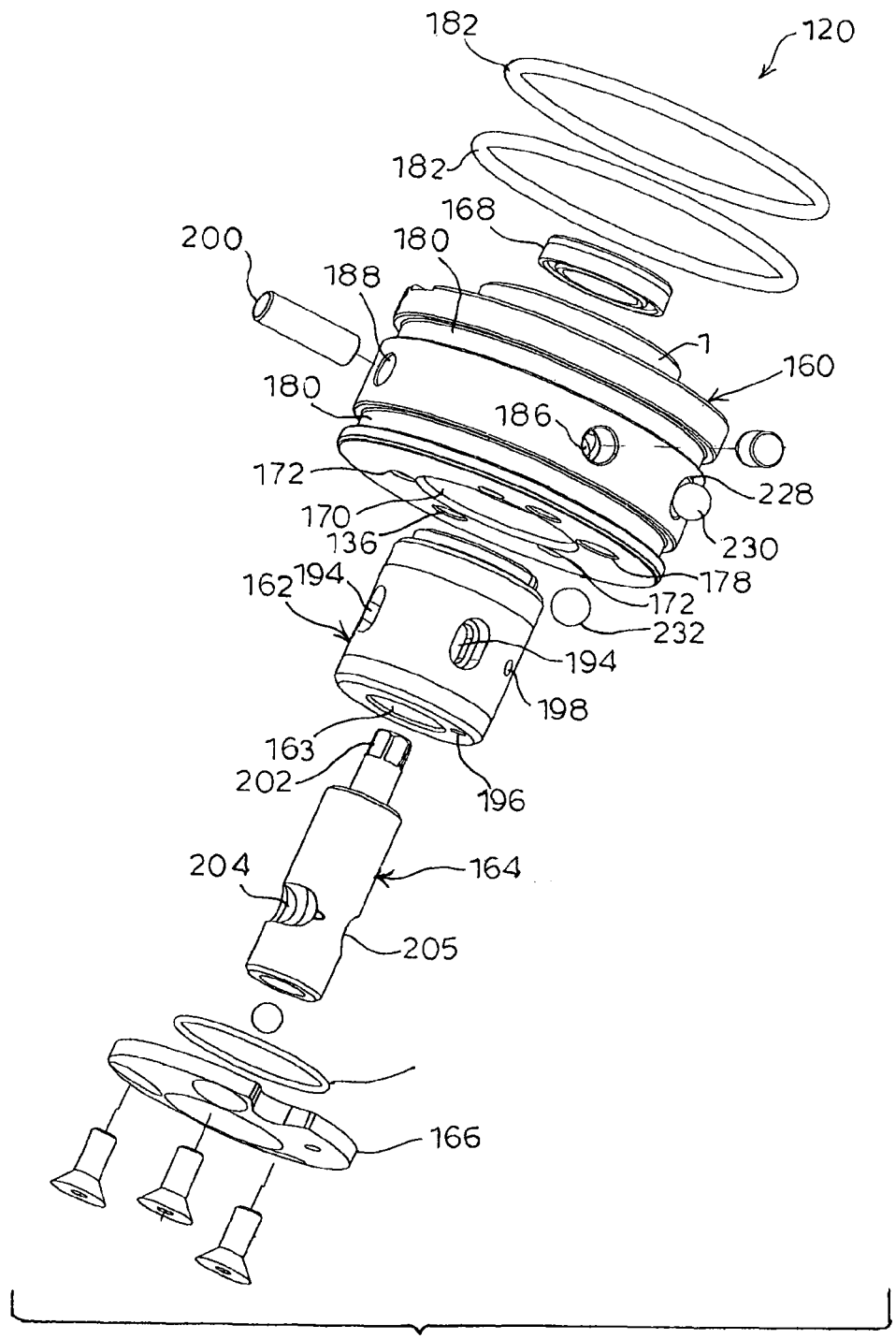
FIG. 8 is an exploded perspective view of an embodiment of a valve assembly for use with the door closer as shown in FIG. 3.
Figure 9:
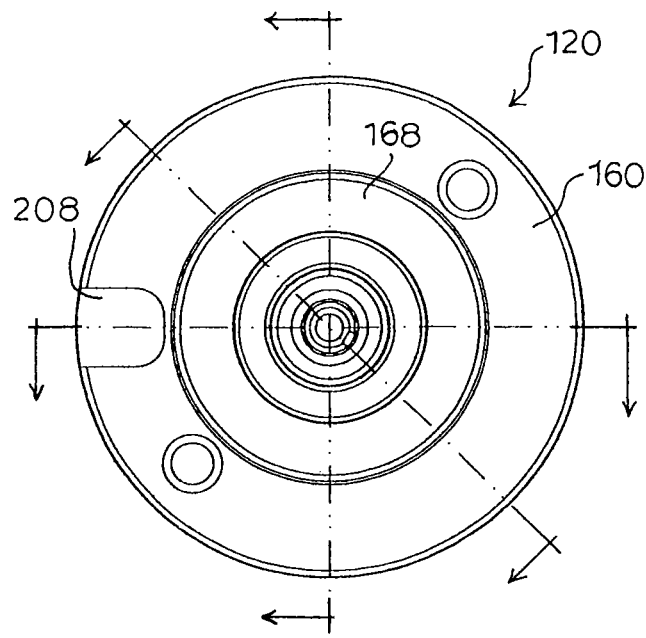
FIG. 9 is an inner end view of the assembled valve assembly as shown in FIG. 8.

The degree of rotation of the valve shaft 164 relative to the valve sleeve 162 regulates the rate of fluid flow past the valve shaft 164 and, thus, the speed of movement of the opening door 82. As shown in FIGS. 8 and 13C, a small portion of material is removed adjacent each groove 204, 205 on the valve shaft 164, forming partial circumferential slots 224, 226 of increasing depth. The slots 224, 226 are positioned such that the valve shaft 124 must rotate about seven degrees before the vertex of each slot 224, 226 intersects the corresponding radial exit passages 194 in the valve sleeve 162. However, there may be some leakage around the valve shaft 164 causes some fluid transfer before the valve shaft 164 rotates the full seven degrees and begins to uncover the passages 194. The full length of the slots 224, 226 from vertex to end may account for about fifteen degrees of rotation of the valve shaft 164 relative to the valve sleeve 162.

The slots 224, 226 function to provide more resolution in controlling door movement. Moreover, as fluid temperature increases, full movement of the door 82 may be accomplished while the valve shaft 164 rotates only within the range provided by the slots 224, 226. It is understood that, as the temperature of the fluid decreases, the valve shaft 164 may be required to open further for providing a larger area for fluid flow for equivalent fluid transfer.

Referring to FIGS. 5 and 5A, another path through the piston 116 is provided for moving fluid from the second variable volume chamber 150 to the first variable volume chamber 148 during door 82 opening. As the piston 116 moves to the right away from the valve assembly 120 and fluid enters the first variable volume chamber 148, the ball of the check ball assembly 152 in the end of the piston 116 unseats and fluid is forced around the closed end of the piston 116, through the opening defined by the check ball assembly 152 and into the first variable volume chamber 148. Fluid flows freely until the closed end of the piston 116 passes the end of the groove 156. Because the end of the piston 116 adjacent the second variable volume chamber 150 is closed and sealed relative to the inside wall of the housing 114, flow of fluid bypassing the piston 116 stops. This may occur, for example, where the door 82 reaches a back check region or position, as described herein. In general, providing for fluid flow past the piston 116 allows a smooth transition when the door initially begins to move to an open position from a stop, or when the door is moving in a closing direction and there is a sudden change to moving in the opening direction. Less power is required to change the position of the valve shaft 164 under these conditions.

When the door 82 reaches a fully open position, the piston 116 is in the position shown in FIG. 7 and the springs 89 are compressed.

Movement of the door 82 from an open position to the closed position is effected by expansion of the springs 138 acting to move the piston 116 to the left as seen in FIGS. 5-7. The advancing piston 116 causes the pinion 112 to rotate for moving the door 82 toward the closed position. Fluid pressure in the first variable volume chamber 148 created by the piston 116 moving toward the valve assembly 120 forces the ball in the ball check assembly 152 against its seat preventing fluid flow through the piston 116. Fluid is then forced out of the first variable volume chamber 148 in the housing 114, through the valve assembly 120, and the housing passages 218, 220, 222 and into the second variable volume chamber 150 around the springs 138. Specifically, the fluid initially flows into the axial passages 174, 176 and then to the corresponding radial passages 186, 190 to the valve shaft 164. If the valve shaft 164 is in the closed position (FIG. 13), the fluid cannot advance. If the valve shaft 164 is rotated to an open position, such as shown in FIG. 14, the fluid exits via the grooves 204, 205 and slots 224, 225 of the valve shaft 164, the radial openings 194 in the valve sleeve 162, and into the radial passages 184, 188 in the valve housing 160 toward the housing passages 218, 220, 222. Fluid again surrounds the central portion of the valve housing 160 between the o-rings 182 and exits through the housing passage 220. The degree of rotation of the valve shaft 164 relative to the valve sleeve 162 will affect the rate of fluid flow past the valve shaft 164 and, thus, the speed of movement of the closing door 82. When the door 82 reaches the closed position, the components of the door closer 90 are again as shown in FIG. 5.

In general, the fluid path in the arrangement described herein, provides for a balance of forces on the valve assembly 120. Specifically, fluid surrounds the central portion of the valve housing 160 between the o-rings 182 and passes into the valve assembly 120 via opposed radial bores 184, 188. The opposed grooves 204, 205 and slots 224, 226 provided on the valve shaft 164 also function to balance fluid flow through the valve and minimize side loading of the valve shaft 164, which would otherwise increase torque necessary to rotate the valve shaft 164.

Figure 10:
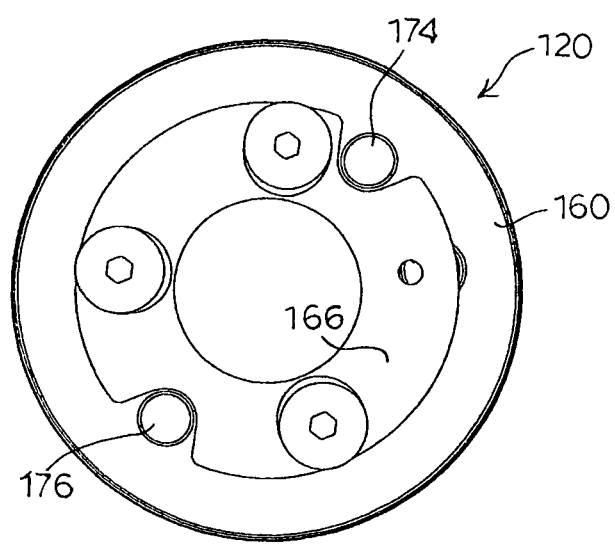
FIG. 10 is an outer end view of the assembled valve assembly as shown in FIG. 8.

As seen in FIG. 15, a radial vent passage 228 is provided in the valve housing 160 and is arranged in fluid communication with the radial bore 198 in the valve sleeve 162 which communicates with the axial vent passage 196. The openings to the vent passages 178, 228 in the valve housing 160 are counter-bored for receiving check balls 230, 232. The diameter of the balls 230, 232 are larger than a smaller outer diameter portion of the passages 178, 228 for allowing only one-way fluid flow. This arrangement of fluid passages serves as a vent relief in high pressure situations. Specifically, during door opening, if the pressure in the fluid flow path becomes excessive, the fluid pressure may force the ball 232 into the larger diameter portion of the axial passage 178 through the valve housing 160 so as to open the passage allowing fluid flow through the passage 178. It is understood that fluid pressure forces the other ball 230 onto the smaller outer diameter of the corresponding radial passage 228 in the valve housing 160. Fluid surrounding the valve shaft 164 can exit outwardly via the radial passage 198 in the valve sleeve 162 and the radial passage 228 in the valve housing 160 and out the axial vent passage 178 in the valve housing 160 and into the first variable volume chamber 148 via a hole 234 in the spool plate 166 (FIG. 10). During door closing, if the pressure in the fluid flow path becomes excessive, the fluid pressure may force the ball 230 into the larger diameter portion of the passage 228 so as to open the passage allowing fluid flow through the passage 228. It is understood that fluid pressure forces the other ball 232 onto the smaller outer diameter of the corresponding passage 178. Fluid surrounding the valve shaft 164 will thus exit outwardly via the radial passage 198 in the valve sleeve 162 and will continue outwardly through the radial vent passage 228 to the fluid flow path around the valve housing 160 in the groove 216 in the housing 114 and exits via the housing passages 218, 220, 222. The pressure venting prevents a U-cup seal in the valve assembly 120 from energizing and causing a dynamic braking effect on the valve shaft 164. Thus, it is understood that the valve assembly 120 is balanced during operation by surrounding the valve housing 160 with fluid which flows via passages on opposite sides of the valve housing 160.

According to an embodiment of the door closer assembly 80, the position of the valve shaft 164 may be dynamically changed during door movement for controlling the flow of fluid past the valve shaft 164 and through the passages. Thus, as the door opens and closes, the valve position can be changed in order to provide varying levels of hydraulic resistance as a function of door angle. Fluid flow is controlled by powered rotational movement of the valve shaft 164, referred to herein as the "cut-off shaft (COS 164)". In this regard, many conventional valves have a screw, referred to herein as the "cut-off screw," that is used to control the valve's "angular position." That is, as the cut-off screw is rotated, the valve's angular position is changed. The valve's "angular position" refers to the state of the valve setting that controls the fluid flow rate through the valve. For example, for valves that employ a cut-off screw to control flow rate, the valve's "angular position" refers to the position of the cut-off screw. In this regard, turning the cut-off screw in one direction increases the valve's angular position such that the valve allows a higher flow rate through the valve. Turning the cut-off screw in the opposite direction decreases the valve's angular position such that the fluid flow through the value is more restricted (i.e., the flow rate is less). In one embodiment, the valve assembly 120 is conventional having a cut-off screw 202 and the COS 164, or valve shaft, is coupled to or integral with the cut-off screw 202 for controlling fluid flow rate. Thus, rotation of the cut-off screw 202 changes the angular position of the valve shaft 164 and, therefore, affects the fluid flow rate.

Figure 16:
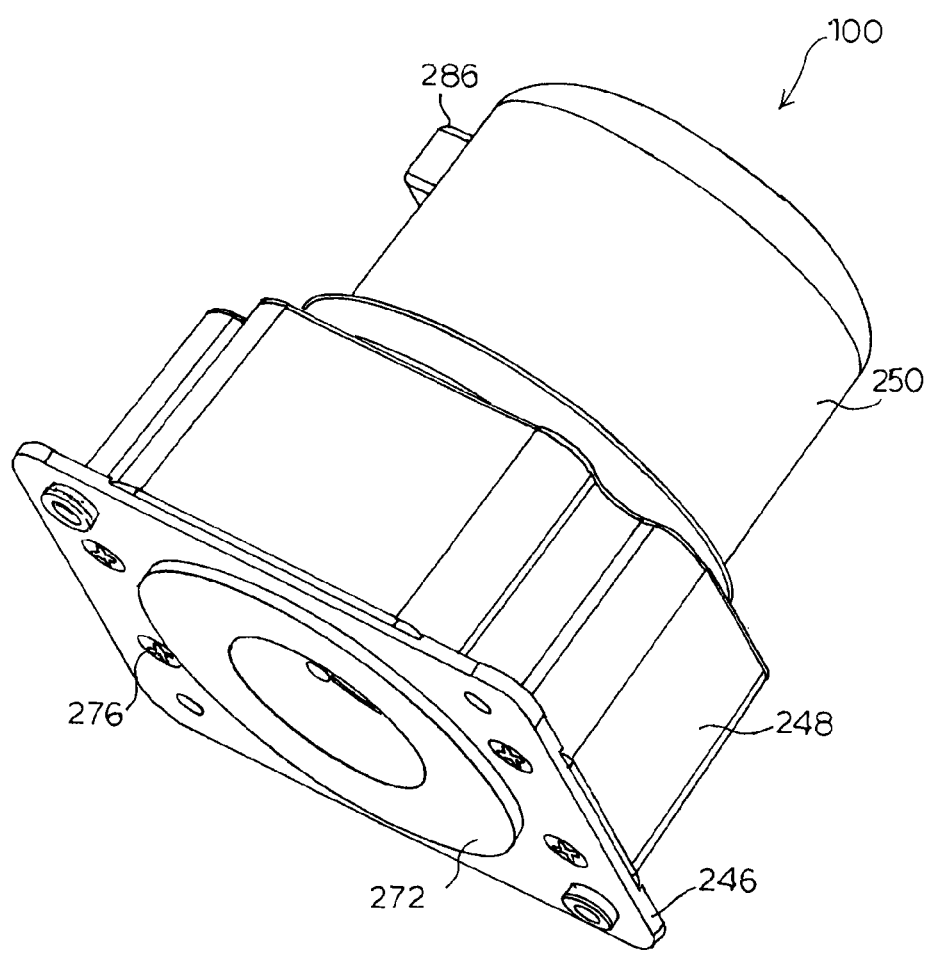
FIG. 16 is a perspective view of an embodiment of a drive unit for use with the door closer assembly as shown in FIG. 1.
Figure 17:
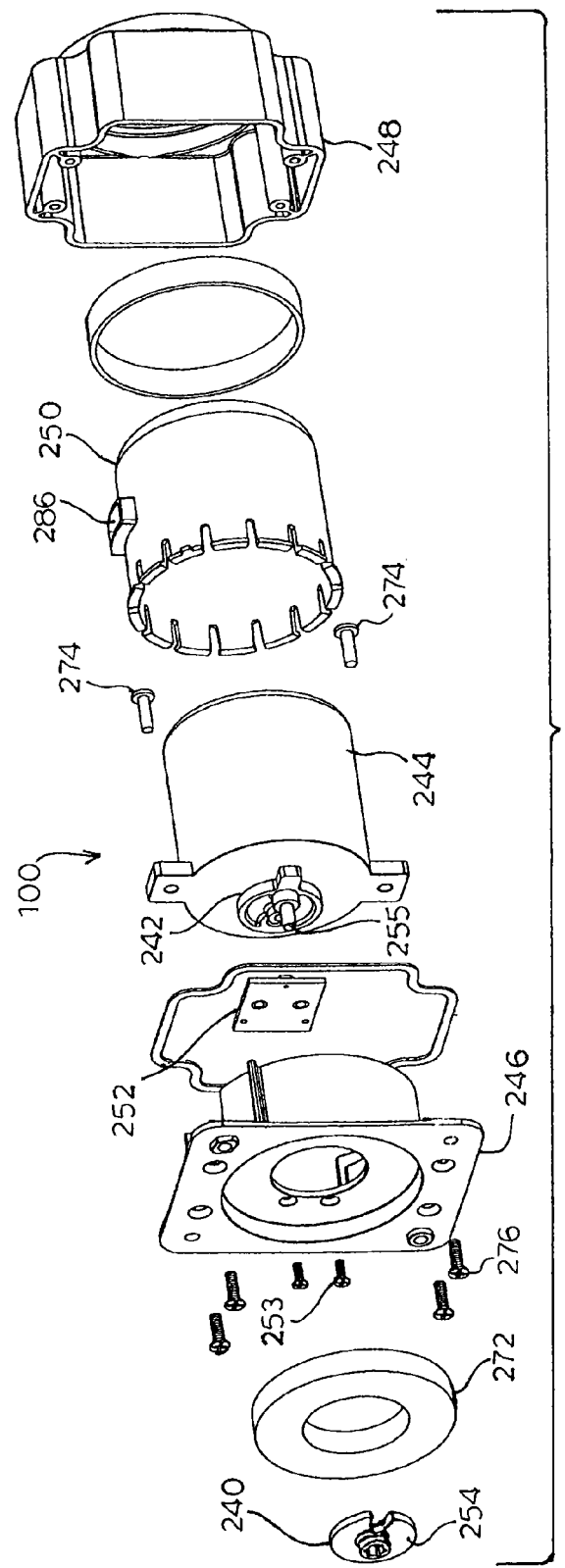
FIG. 17 is an exploded perspective view of the drive unit as shown in FIG. 16.
Figure 18:
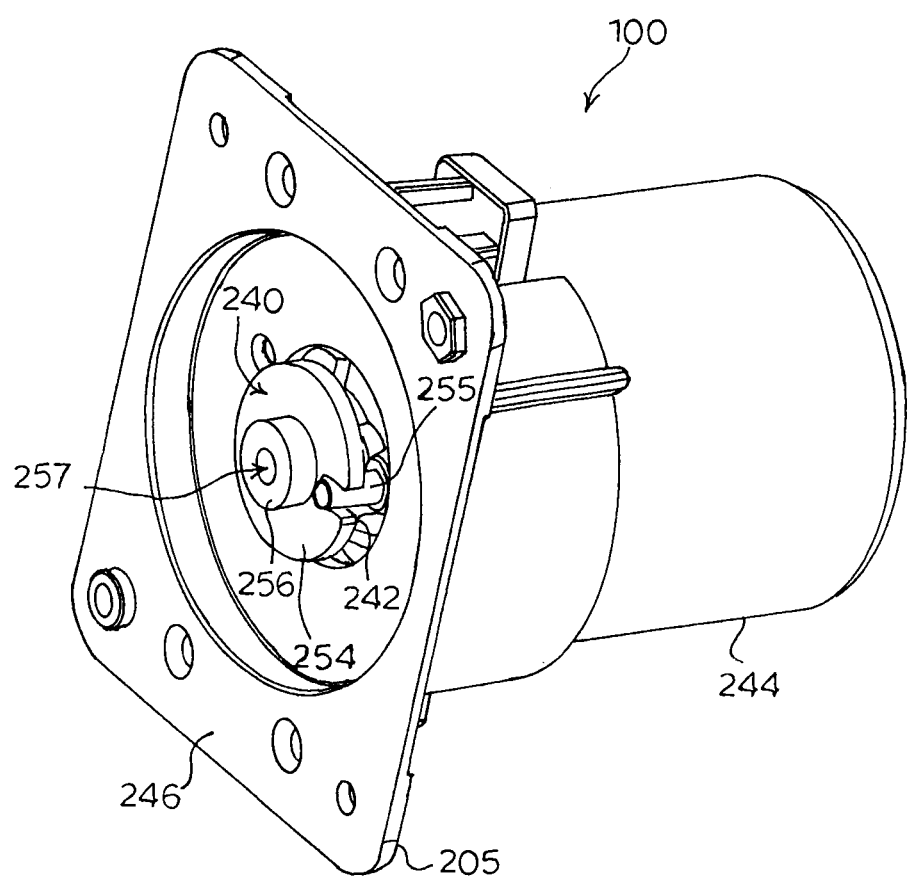
FIG. 18 is a perspective view of the drive unit as shown in FIG. 16 with the cover removed.

The drive unit 100 is coupled to the cut-off screw 202 for rotating the valve shaft 164 as appropriate to control the angular position of the valve shaft 164 in a desired manner, as will be described in more detail below. Referring to FIGS. 16 and 17, the drive unit 100 comprises a COS 164 coupler 240, a motor coupler 242, a motor 244, a mounting bracket 246, a PCB board 252, and a cover, including a fixed cap 248 and a rotating cap 250. As shown in FIGS. 17 and 18, the COS 164 coupler 240 includes a disc 254 with a hollow tab extension 256 positioned at a center of the disc 254. The tab 256 defines a hole 257 for receiving the cut-off screw 202. The central axis of the hole 257 is aligned with the central axis of rotation of the disc 254. The inner wall of the tab 256 is dimensioned such that the cut-off screw 202 fits snugly into the tab 256 for fixed rotation of the cut-off screw 202 and the COS 164 coupler 240 (FIGS. 5-7).

Figure 20:
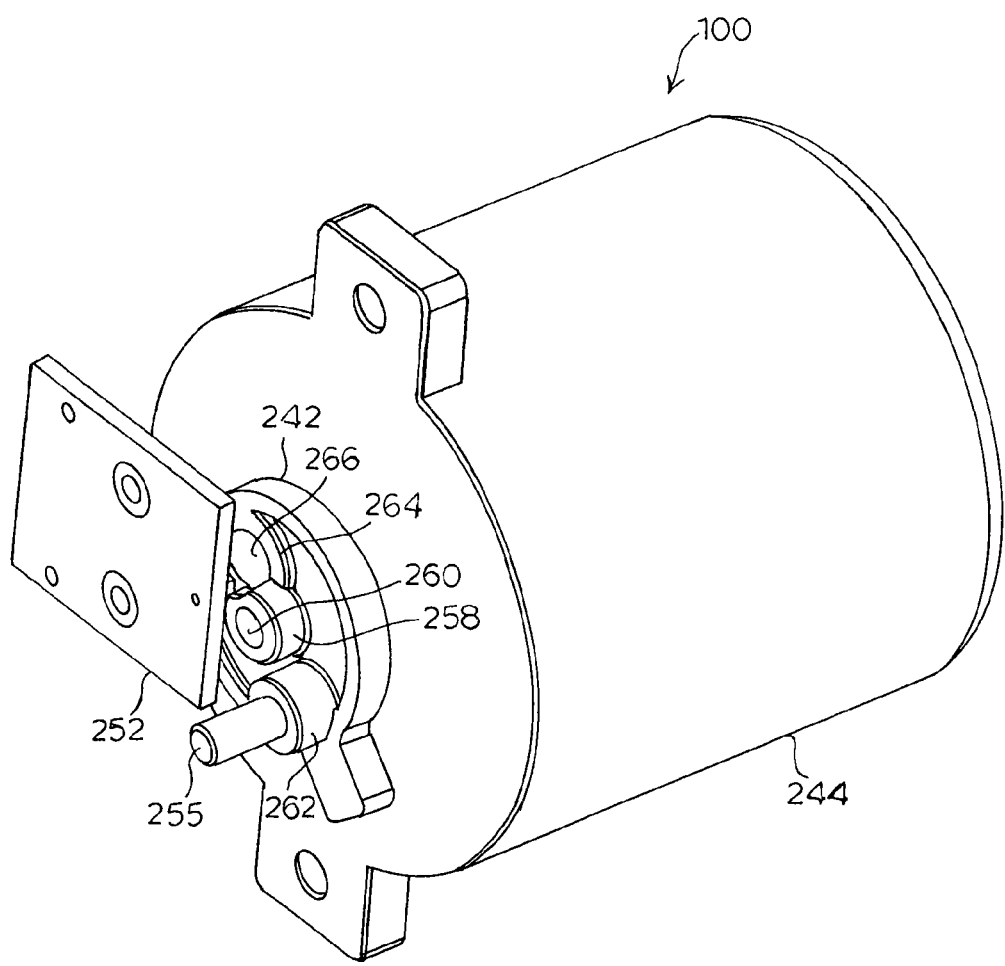
FIG. 20 is a partially exploded perspective view of the drive unit as shown in FIG. 19 with the mounting bracket removed.
Figure 21:
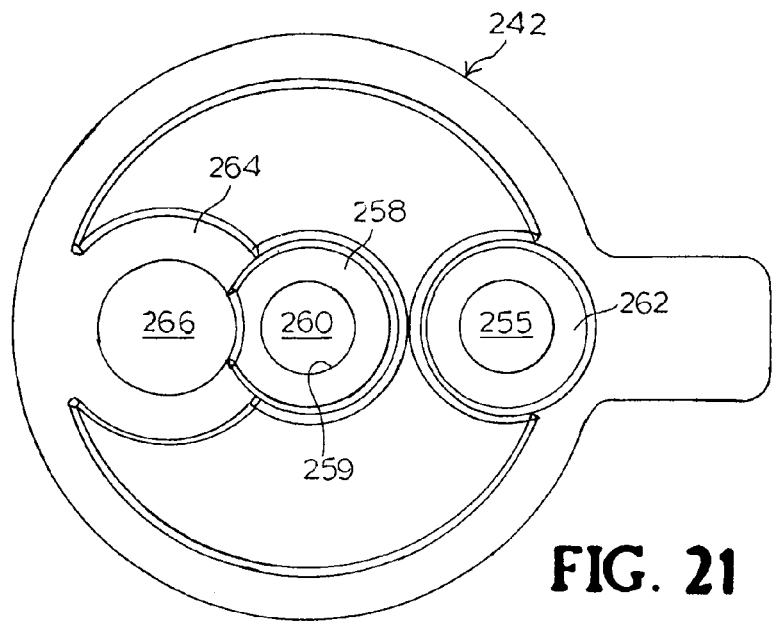
FIG. 21 is a front plan view of an embodiment of a motor coupler for use with the drive unit as shown in FIG. 16.

Referring to FIGS. 20 and 21, the motor coupler 242 is also a disc having a hollow tab extension 258 positioned at a central axis of the motor coupler 242. The tab 258 defines an opening 259 for receiving a motor shaft 260, which is rotated by the motor 244 under the direction and control of control logic as described herein. The inner wall of the tab 258 defining the opening 259 is dimensioned such that the motor shaft 260 fits snugly in the tab 258 for fixed rotation of the motor shaft 260 and the motor coupler 242. The motor coupler 242 has a second hollow tab extension 262 radially spaced from the first hollow tab extension 258. An axially extending pin 255 is disposed in the second hollow tab extension 262. The inner wall of the tab 262 is dimensioned such that the pin 255 fits snugly in the tab 262, and frictional forces generally keep the pin 255 stationary with respect to the motor coupler 242. Therefore, any rotation of the motor coupler 242 moves the pin 255 about the center of the motor shaft 260. The motor coupler 242 has a third hollow tab extension 264 radially spaced from the second hollow tab extension 262. A magnet 266 is disposed in the third hollow tab extension 264. For example, in one exemplary embodiment, the magnet 266 is glued to the motor coupler 242, but other techniques of attaching the magnet 266 to the motor coupler 242 are possible in other embodiments. As the motor coupler 242 rotates with the motor shaft 260, the pin 255 and the magnet 266 rotate about the central axis of rotation of the motor coupler 242.

Figure 22:
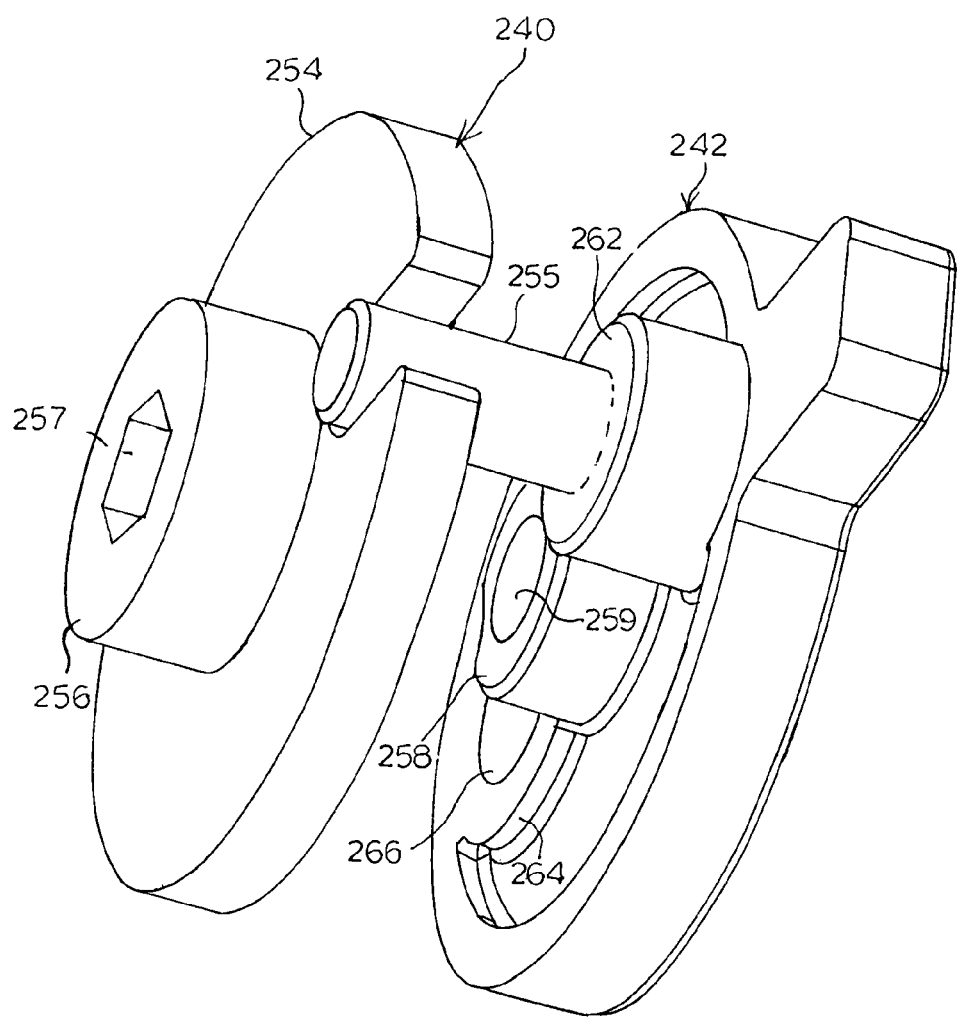
FIG. 22 is an elevated perspective view of an embodiment of a COS 164 coupler operatively connected to the motor coupler as shown in FIG. 21.

Referring to FIGS. 18 and 22, the COS 164 coupler disc 254 has a slot 268 which receives the pin 255 on the motor coupler 242. The slot 268 is dimensioned such that its width (in a direction perpendicular to the r-direction) is slightly larger than the diameter of the pin 255 so that frictional forces do not prevent the COS 164 coupler 240 from moving relative to the pin 255 in the y-direction, which is parallel to the centerline of the pin 255. Therefore, if the COS 164 coupler 240 receives any mechanical forces in the y-direction, such as forces from a user kicking or slamming the door 82 or from pressure of the fluid flowing in the valve assembly 120, the COS 164 coupler 240 is allowed to move in the y-direction relative to the pin 255 thereby preventing such forces from passing through the pin 255 to other components, such as the motor 244, coupled to the pin 255. Such a feature can help prevent damage to such other components and, in particular, the motor 244. In addition, as shown by FIG. 22, the radial length of the slot 268 in the r-direction is significantly greater than the diameter of the pin 255 such that it is unnecessary for the alignment between the couplers 240, 242 to be precise. Indeed, any slight misalignment of the couplers 240, 242 simply changes the position of the pin 255 along a radius of the COS 164 coupler 240 without creating stress between the pin 255 and the COS 164 coupler 240. That is, slight misalignments between the COS 164 coupler 240 and the motor coupler 242 changes the location of the pin 255 in the r-direction. However, since the pin 255 can move freely to at least an extent in the r-direction relative to the COS 164 coupler 240, such misalignments do not create stress in either of the couplers 240, 242.

In one exemplary embodiment, the width (perpendicular to the r-direction) of the slot 268 is about equal to or just slightly larger than the width of the pin 255. Thus, the width of the slot 268 is small enough so that any rotation of the motor coupler 242 causes a corresponding rotation of the COS 164 coupler 240, but is large enough so that significant friction or other mechanical forces are not induced by movement of the COS 164 coupler 240 in the y-direction. Allowing the COS 164 coupler 240 to move relative to the motor coupler 242 in the y-direction not only prevents mechanical forces from transferring from the COS 164 coupler 240 to the motor coupler 242, but also obviates the need to precisely set the separation distance between the couplers 240, 242.

The couplers 240, 242 can be made of various materials. In one embodiment, the couplers 240, 242 may be composed of plastic, which is typically a low cost material. In addition, the size of the couplers can be relatively small. Note that the shapes of the couplers 240, 242, as well as the shapes of devices coupled to such components, can be changed, if desired. For example, the cross-sectional shape of the cut-off screw 202 may be circular; however, other shapes are possible. For example, the cross-sectional shape of the cut-off screw 202 could be a square or rectangle. In such an example, the shape of the hole 257 in the hollow tab extension 256 on the COS 164 coupler 240 may be a square or rectangle to correspond to the shape of the cut-off screw 202. In addition, the cross-sectional shape of the COS 164 coupler 240 is shown to be generally circular, but other shapes, such as a square or rectangle are possible. Similarly, the motor coupler 242 and the pin 255 may have shapes other than the ones shown explicitly in the FIGURES.

In the embodiments described above, the pin 255 is described as being fixedly attached to the motor coupler 242 but not to the COS 164 coupler 240. In other embodiments, other configurations are possible. For example, it is possible for a pin 255 to be fixedly coupled to the COS 164 coupler for rotation with the COS 164 coupler and thus movable relative to a motor coupler.

In addition, it should be further noted that it is unnecessary for the couplers 240, 242 to rotate over a full 360 degree range during operation. In one exemplary embodiment, about a thirty-five degree range of movement is sufficient for providing a full range of angular positions for the valve shaft 164 for opening and closing the valve. In this regard, assuming that the valve shaft 164 is in a fully closed position such that the valve shaft 164 allows no fluid flow, then rotating the integral cut-off screw 202 about 35 degrees transitions the valve shaft 164 from the fully closed position to the fully open position (i.e., the valve's flow rate is at a maximum for a given pressure). In such an example, there is no reason for the cut-off screw 202 to be rotated outside of such a 35 degree range. However, the foregoing 35 degree range is provided herein as merely an example of the possible range of angular movements for the valve shaft 164, and other ranges are possible in other embodiments. For example, as described herein, the slots 224, 226 allow a range of angular movement of about seven degrees, which may be sufficient as the temperature of the fluid increases.

The motor 244 (FIG. 20) is an electric reversible motor with a portion of the motor drive shaft 260 extending from the housing of the motor 244. The motor 244 is reversible such that the rotation of the motor 244 in one direction will cause the drive shaft 260 to rotate in one direction, and rotation of the motor 244 in the opposite direction will cause the drive shaft 260 to rotate in the opposite direction. Such motors are widely commercially available and the construction and operation of such motors are well known; therefore, the details of the motor 244 are not described in specific detail herein. A suitable motor 244 for use in the door closer assembly 80 of the present invention is a 3-volt motor providing a gear ratio of 109:1 and a rated torque of 1.3 oz-in. The motor 244 operates under the direction and control of the control unit 110, which is electrically coupled to the motor via an electrical cable, as will be described below.

The design of the couplers 240, 242 can facilitate assembly and promote interchangeability. In this regard, as described above, precise tolerances between the cut-off screw 202 and the motor shaft 260, as well as between couplers 240, 242, are unnecessary. For example, the couplers 240, 242 may be used to reliably interface motors and door closers of different vendors. Moreover, to interface the motor 244 with the door closer 90, a user simply attaches the COS 164 coupler 240 to the cut-off screw 202 and positions the couplers 240, 242 such that the pin 255 on the motor coupler 242 is able to pass through the slot 268 in the COS 164 coupler 240 as the motor 244 is mounted on the door closer 90. As described above, there is no need to precisely align the couplers 240, 242 as long as the couplers 240, 242 are appropriately positioned such that the pin 255 passes through the slot 268.

In this regard, slight misalignments of the couplers 240, 242 do not create significant stresses between the couplers 240, 242. For example, assume that the couplers 240, 242 are slightly misaligned such that the centerline of the COS 164 does not precisely coincide with the centerline of the motor shaft 260. That is, the central axis of rotation of the COS 164 coupler 240 is not precisely aligned with the center of rotation of the motor coupler 242. In such an example, the pin 255 moves radially relative to the COS 164 coupler 240 as the couplers 240, 242 rotate. In other words, the pin 255 moves toward or away from the central axis of rotation of the COS 164 coupler 240 as the couplers 240, 242 rotate. If the pin 255 is not movable along a radius of the COS 164 coupler 240 when the couplers 240, 242 are misaligned, then the rotation of the couplers 240, 242 would induce stress in the couplers 240, 242 and pin 255. However, since the pin 255 is radially movable relative to the COS 164 coupler 240 due to the dimensions of the slot 268, such stresses do not occur.

In addition, as described above, the COS 164 coupler 240 is movable in the y-direction (i.e., toward and away from the motor coupler 242) without creating stresses in the couplers 240, 242 or transferring significant forces from the COS 164 coupler 240 to the motor coupler 242. In this regard, the pin 255 is not fixedly attached to the COS 164 coupler 240, and the length of the slot 268 in the r-direction (i.e., along a radius of the COS 164 coupler 240) is sufficiently large so that the COS 164 coupler 240 can slide along the pin 255 (or otherwise move relative to the pin 255) without transferring forces through the pin 255 to the motor coupler 242.

Figure 19:
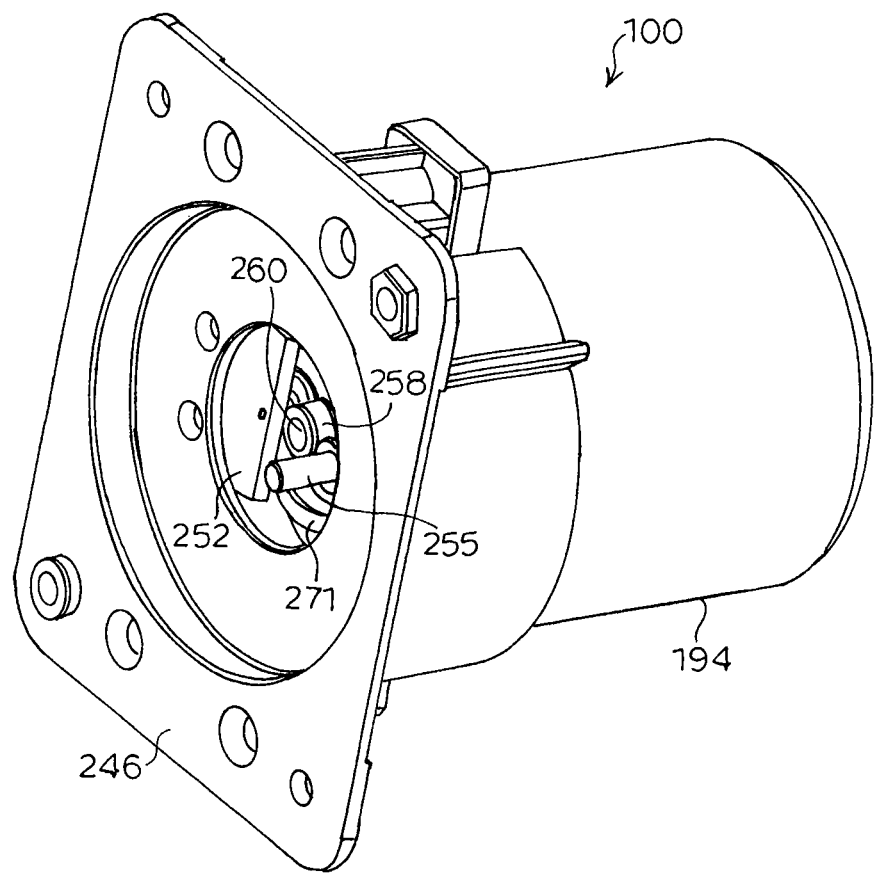
FIG. 19 is a perspective view of the drive unit as shown in FIG. 18 with the COS 164 coupler removed.

Referring to FIGS. 19 and 20, the PCB board 252 is positioned between the motor coupler 242 and the COS 164 coupler 240. In one exemplary embodiment, the PCB board 252 is attached to the mounting bracket 246 via, for example, screws 253 (FIG. 17), but other techniques for mounting the PCB board 252 on the mounting bracket 246 or other component are possible in other embodiments.

Figure 23:
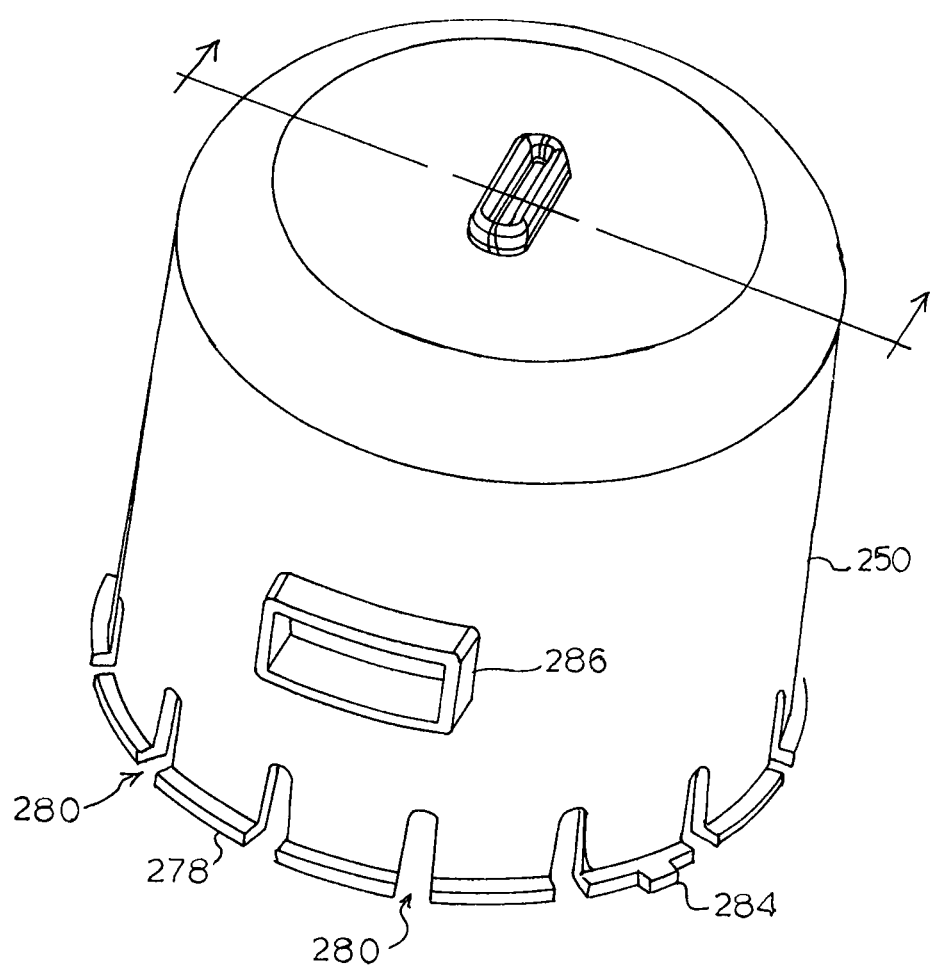
FIG. 23 is a perspective view of an embodiment of a rotatable motor cover for use with the drive unit as shown in FIG. 16.
Figure 24:
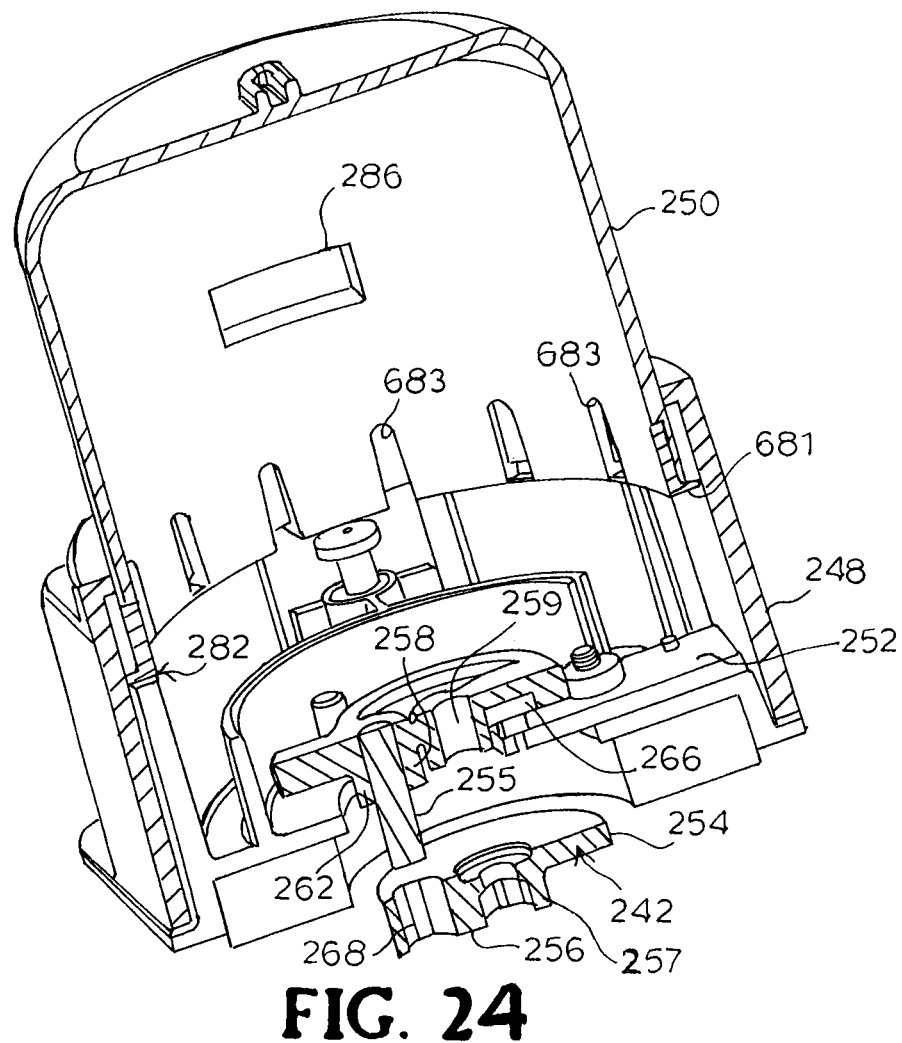
FIG. 24 is a partial view of a cross-section of the drive unit as shown in FIG. 16 taken along line 24-24 of FIG. 23.

As shown by FIGS. 16 and 17, the fixed cap 248 is coupled to the mounting bracket 246 with four screws. As shown by FIG. 24, the fixed cap 248 is coupled to the rotatable cap 250, which can be rotated relative to the fixed cap 248. Referring to FIG. 23, the rotatable cap 250 has a lip 278 that extends around a perimeter of the cap 250. The cap 250 has a plurality of notches 280 along such perimeter, but such notches 280 are unnecessary in other embodiments. The interior of the fixed cap 248 defines a channel 282 (FIG. 24) into which the lip 278 fits and through which the lip 278 slides. A tab 284 extends from the lip 278 and limits the movement of the rotatable cap 250 relative to the fixed cap 248. In this regard, the fixed cap 248 has a pair of stops (not shown). The cap 250 is rotatable within the tab 284 between the stops. As the cap 250 is rotated in one direction, the tab 284 eventually contacts one of the stops preventing further movement of the cap 250 in such direction. As the cap 250 is rotated in the opposite direction, the tab 284 eventually contacts the other stop preventing further movement of the cap 250 in such direction. In one exemplary embodiment, the cap 250 is rotatable up to 180 degrees (i.e., half of full revolution). Limiting the movement of the cap 250 helps to prevent entanglement of a motor cable 288 within or passing through the cap 250.

Figure 26:
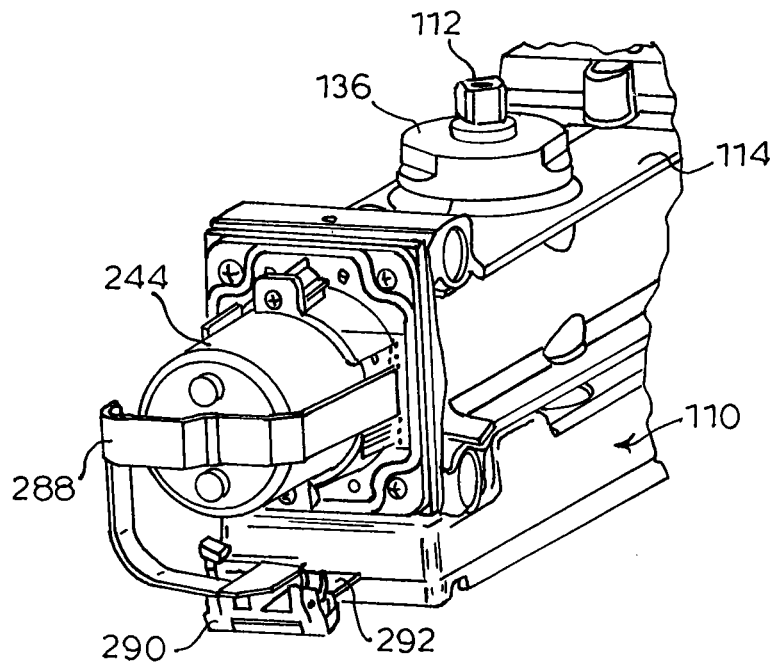
FIG. 26 is a partial perspective end view of the assembled door closer assembly as shown in FIG. 1 with the motor cover removed.
Figure 27:
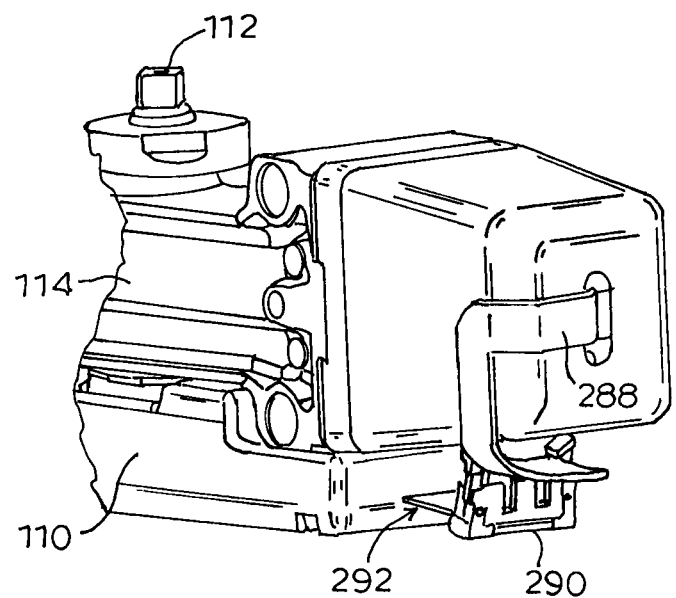
FIG. 27 is a partial perspective end view of the assembled door closer assembly as shown in FIG. 26 with another embodiment of a motor cover.

Referring to FIG. 26, an embodiment of the motor cable 288 is shown as a flexible electrical cable and is electrically connected to the motor 244 and the PCB board 252. The rotatable cap 250 has a receptacle 286 for passing the motor cable 288, such that the motor cable 288 extends outwardly through the cover. The outer end of the motor cable 288 terminates in a connector 290 that electrically connects the motor cable 288 to an electrical cable from the control unit, as will described below. Thus, one end of the motor cable 288 is connected to the cable 292 from the control unit 110, and the other end is connected to the PCB board 252 thereby electrically connecting the drive unit 100 to the control unit 110. It is possible to position the control unit 110 at various locations, such as either on top of or below the door closer, and to then rotate the cap 250 until the receptacle 286 is oriented in a manner conducive to receiving the motor cable 288. In addition, the cap 250 may be rotated such that the receptacle 286 is generally faced downward in order to help keep rainwater from falling into the receptacle 286 and reaching electrical components housed by the covers 248, 250. Another embodiment of a cover 294 for the drive unit 100 is shown in FIG. 27. In this embodiment, a slot 295 centered in the end of the cover 294 passes the motor cable 288, which protrude through the center of the cap 294. The covers 248, 250, 294 may be composed of plastic, but other materials for the covers are possible in other embodiments.

Figure 3:
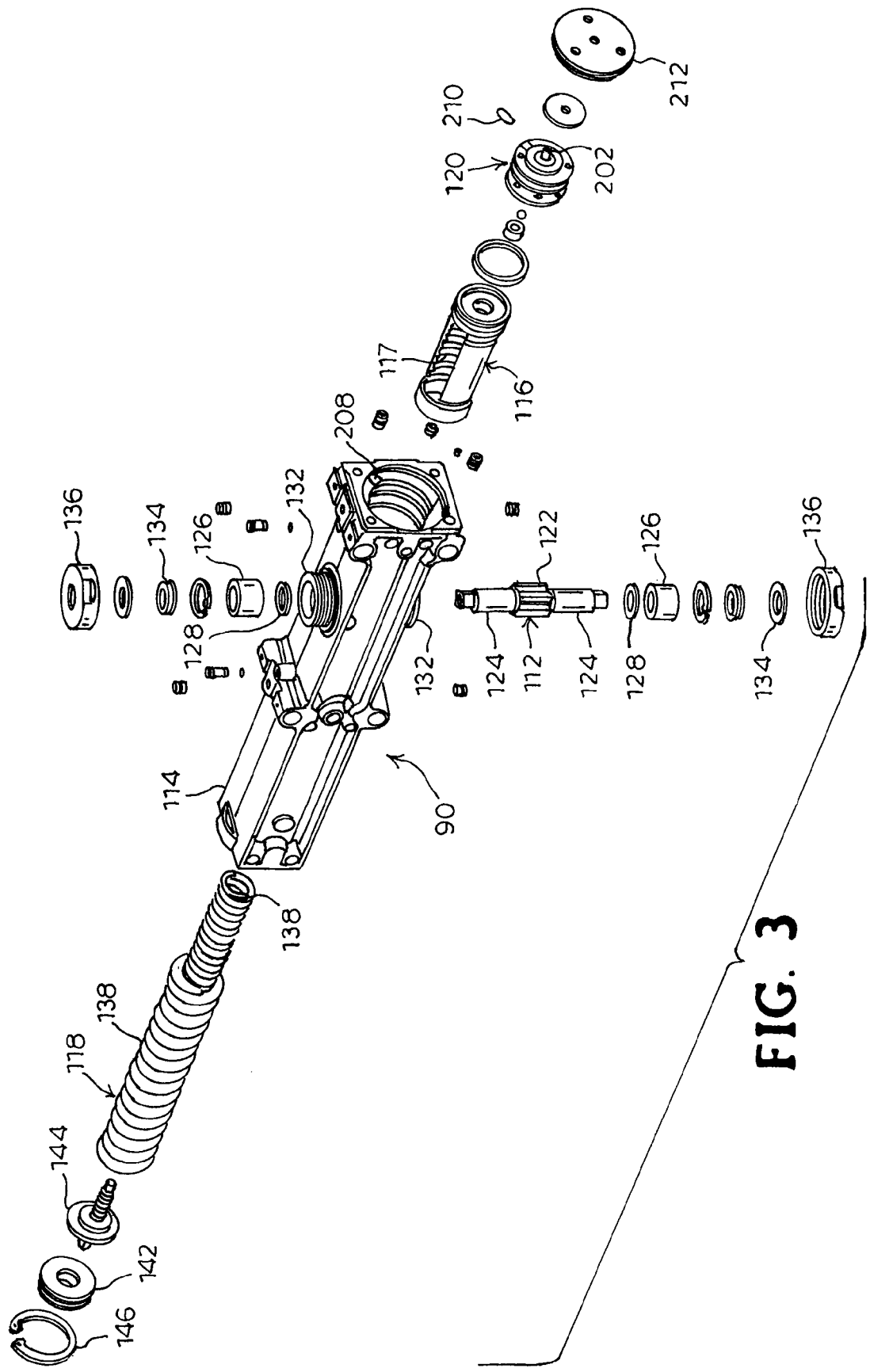
FIG. 3 is an exploded perspective view of an embodiment of a door closer for use with the door closer assembly shown in FIG. 1.
Figure 4:
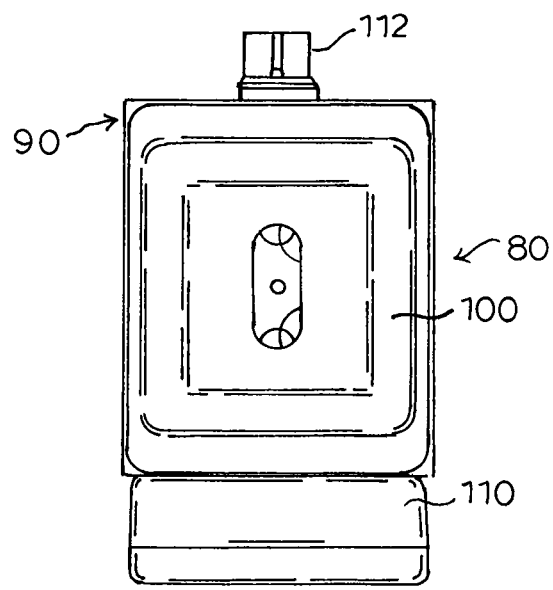
FIG. 4 is an end view of the assembled door closer assembly as shown in FIG. 1.

The motor 244 is secured to the mounting bracket 246 using screws 274 (FIG. 17) received in threaded openings in the bracket 246. The motor 224 has opposed ears which are received in corresponding tabs on the bracket 246 for securing the motor 244 against rotation. A sealing ring 272 is received in a corresponding recess in the mounting bracket 246 and for engaging the door closer housing 114. The mounting bracket 246 is then fastened to the door closer housing 114 using threaded fasteners received in axial threaded openings 270 in the corners of the end of the housing 114 (FIG. 3). Opposed axial tabs 271 are received in corresponding openings at the other corners. The mounting bracket 246 is then fastened to the door closer housing 114 using threaded fasteners received in axial threaded openings 270 in the corners of the end of the housing 114 (FIG. 3). The cut-off screw 202 passes through the opening of mounting bracket 246. The sealing ring 272 helps to keep any water from seeping between the drive unit 100 and the door closer 90 and reaching the various electrical components of the drive unit.

Figure 25:
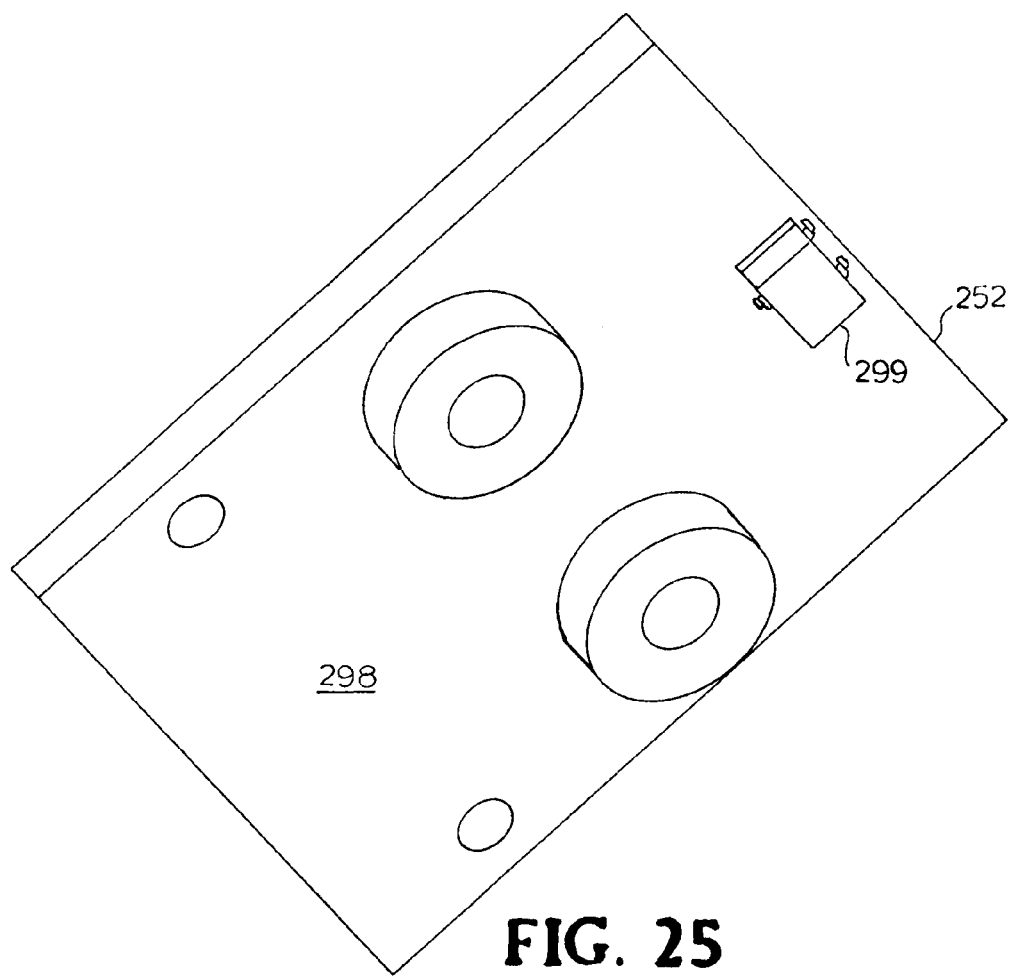
FIG. 25 is perspective view of an inner surface of an embodiment of a PCB board for use with the drive unit as shown in FIG. 16.

As shown by FIG. 25, two magnetic sensors 299a, 299b are mounted on an inner surface 298 of the PCB board 252. The magnetic sensors 299a, 299b are configured to detect the strength of the magnetic field generated by the magnet 266 on the motor coupler 242. Such a detection is indicative of the angular position of the valve shaft 164 of the door closer 90. As described herein, to change such angular position, the motor 244 rotates the motor shaft 260 causing the motor coupler 242 to rotate so that the motor coupler 242 moves the pin 255 about the motor shaft 260. Such rotation is translated to the COS 164 coupler 240 through the pin 255

When moving, the pin 255 presses against and moves the COS 164 coupler 240. In particular, the pin 255 rotates the COS 164 coupler 240 and, therefore, the cut-off screw 202 that is inserted into the hollow tab extension 256. The rotation of the cut-off screw 202 changes the angular position of the valve shaft 164. Since rotation of the motor coupler 242 ultimately changes the angular position of the valve shaft 164, the position of the magnet 266 relative to the sensors 299a, 299b on the PCB board 252, which is stationary, indicates the angular position of the valve shaft 164.

The sensors 299a, 299b are configured to transmit a signal having a voltage that is a function of the magnetic field strength sensed by both of the sensors 299a, 299b. In one exemplary embodiment, the sensors 299a, 299b are ratiometric sensors such that a ratio (R) of the input voltage to the sensors to the output voltage to the sensors is indicative of the angular position of the valve shaft 164. In this regard, each discrete angular position of the valve shaft 164 is associated with a specific voltage ratio (R), which is equal to the input voltage of the sensor 299a, 299b divided by the output voltage of the sensor 299a, 299b. For example, assume that to open the valve shaft 164 more so that flow rate increases, the motor coupler 242 is rotated such that the magnet 266 is moved closer to one of the sensors 299a thereby increasing the magnetic field strength sensed by the sensor 299a. In such an example, R increases the more that the valve shaft 164 is opened. Further, R decreases when the motor coupler 242 is rotated such that the magnet 266 is moved away from the sensor 299a. Thus, R decreases as the valve shaft 164 is closed in order to decrease flow rate. It also follows that the further away from the ratiometric sensor 299a that the magnet 266 gets, the lower the reading R and therefore causing an eventual unknown position of the valve shaft 164. To prevent this as well as allowing for a longer distance of angular travel for the valve shaft 164, the other ratiometric sensor 299b can simultaneously read positions as the first ratiometric sensor 299a readings of R go out of range. The other ratiometric sensor 299b then controls within the new range using the same methodology as described above. The only difference being that as the readings from the first ratiometric sensor 299a get weaker, the other ratiometric sensor 299b will be in a better physical proximity to assume control.

In one exemplary embodiment, control logic stores data, referred to herein as "valve position data," that maps various possible R values to their corresponding angular positions for the valve shaft 164. Thus, the control logic can determine an R value from a reading of the sensors 299a, 299b and use the stored data to map the R value to the angular position of the valve shaft 164 at the time of the reading. In other words, based on the reading from the sensors 299a, 299b and the mappings stored in the valve position data, the control logic can determine the angular position of the valve shaft 164.

Note that the use of a ratiometric sensor can be desirable in embodiments for which power is supplied exclusively by a generator. In such an embodiment, conserving power can be an important design consideration, and it may be desirable to allow the input voltage of the sensors 299a, 299b to fluctuate depending on power demands and availability. Using a voltage ratio to sense valve position allows the input voltage to fluctuate without impairing the integrity of the sensor readings. In other embodiments, other types of magnetic sensors may be used to sense the magnetic field generated by the magnet 266.

In one exemplary embodiment, the electrical cables 288, 292 comprise at least six wires. In this embodiment, the sensors 299a, 299b may be coupled to the control unit 110 via six wires of the cables 288, 292. Two wires carry an input voltage for the sensors 299a, 299b circuitry. Two other wires carry an output voltage for the sensors 299a, 299b, and the fifth and sixth wires carry an enable signal for each sensor. In this regard, each sensor 299a, 299b is configured to draw current from the control logic only when receiving an enable signal from the logic. Thus, if the sensors 299a, 299b do not receive an enable signal, the sensors 299a, 299b do not usurp any electrical power. Moreover, when the control logic desires to determine the current position of the valve shaft 164, the control logic first transmits an enable signal to one of the sensors 299a, 299b that should be activated based upon a temperature profile or table, waits a predetermined amount of time (e.g., a few microseconds) to ensure that the sensor 299a, 299b is enabled and providing a reliable reading, reads a sample from the one of the sensors 299a, 299b and then disables the sensor thereby preventing the sensor from drawing further current. Accordingly, for each reading, each sensor 299a, 299b draws current only for a short amount of time thereby helping to conserve electrical power.

In one exemplary embodiment, readings from the sensors 299a, 299b are used to assist in the control of the motor 244. In such an embodiment, the control logic instructs the motor 244 when and to what extent to rotate the motor shaft 260 (thereby ultimately rotating the cut-off screw 202 by a corresponding amount) by transmitting pulse width modulation (PWM) signals to the motor 244 via electrical cable. In this regard, pulse width modulation is a known technique for controlling motors and other devices by modulating the duty cycle of control signals. Such techniques can be used to control the motor 244 such that the motor 244 drives the motor shaft 260 by an appropriate amount in order to precisely rotate the motor shaft 260 by a desired angle.

In controlling the door closer 90, the control logic may determine that it is desirable to set the angular position of the valve shaft 164 to a desired setting. For example, the control logic may determine that the angle of the door 82 has reached a point at which the force generated by the door closer 90 is to be changed by adjusting the angular position of the valve shaft 164. If the current angular position of the valve shaft 164 is unknown, the control logic initially determines such angular position by taking a reading of the sensors 299a, 299b in the drive unit 100. In this regard, the control logic enables the sensors 299a, 299b based on the temperature table, waits a predetermined amount of time to ensure that the sensors are enabled and is providing a reliable value, and then determines the angular position of the valve shaft 164 based on the sensor reading. In one exemplary embodiment in which the sensors 299a, 299b are ratiometric, the control logic determines the ratio, R, of the input voltage to the sensor and the output voltage form the sensor and maps this ratio to a value indicative of the current angular position of the valve shaft 164 via the valve position data.

Based on the current angular position of the valve shaft 164, the control logic determines to what extent the cut-off screw 202 is to be rotated in order to transition the valve shaft 164 to the desired angular position. For example, the control logic can subtract the desired angular position from the current angular position to determine the degree of angular rotation that is required to transition the valve shaft 164 to the desired angular position. The control logic then transmits a PWM signal to the motor 244 to cause the motor to rotate the motor shaft 266 by a sufficient amount in order to transition the valve shaft 164 to its desired angular position. In response, the motor 244 rotates the shaft 266 thereby rotating the motor coupler 242. Since the pin 255 passes through the COS 164 coupler 240, the COS 164 coupler 240 rotates in unison with the motor coupler 242 thereby rotating the cut-off screw 202. Accordingly, the motor 244 effectively drives the cut-off screw 202 such that the valve shaft 164 is transitioned to its desired angular position. Once the valve shaft 164 is transitioned to its desired angular position, the control logic, if desired, can take another reading of the sensors 299a, 299b, according to the techniques described above, in order to ensure that the valve shaft 164 has been appropriately set to its desired angular position. If there has been any undershoot or overshoot of the angular position of the valve shaft 164, the control logic can transmit another PWM signal to the motor 244 in order to activate the motor 244 to correct for the undershoot or overshoot.

Figure 28:
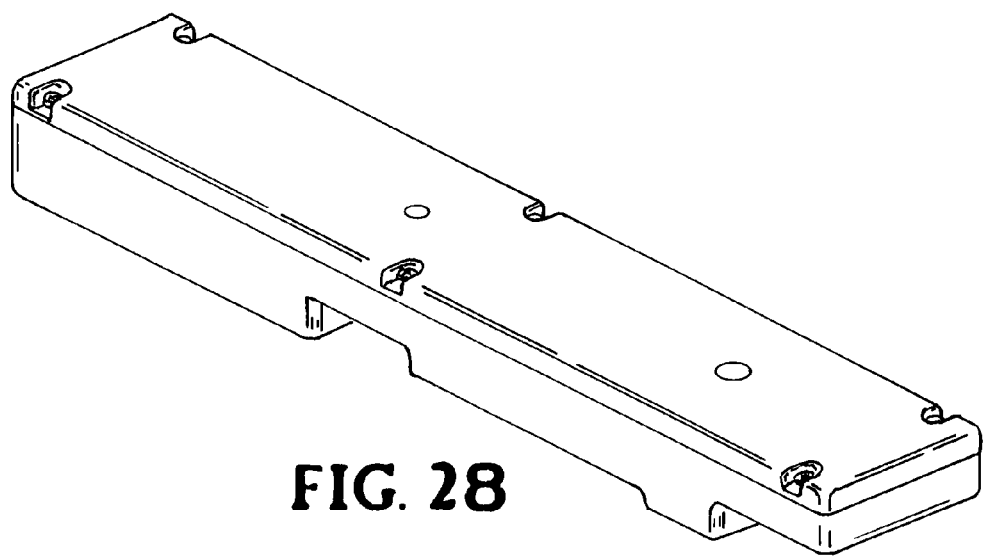
FIG. 28 is a perspective view of an embodiment of a control unit for use with the door closer assembly as shown in FIG. 1.
Figure 29:
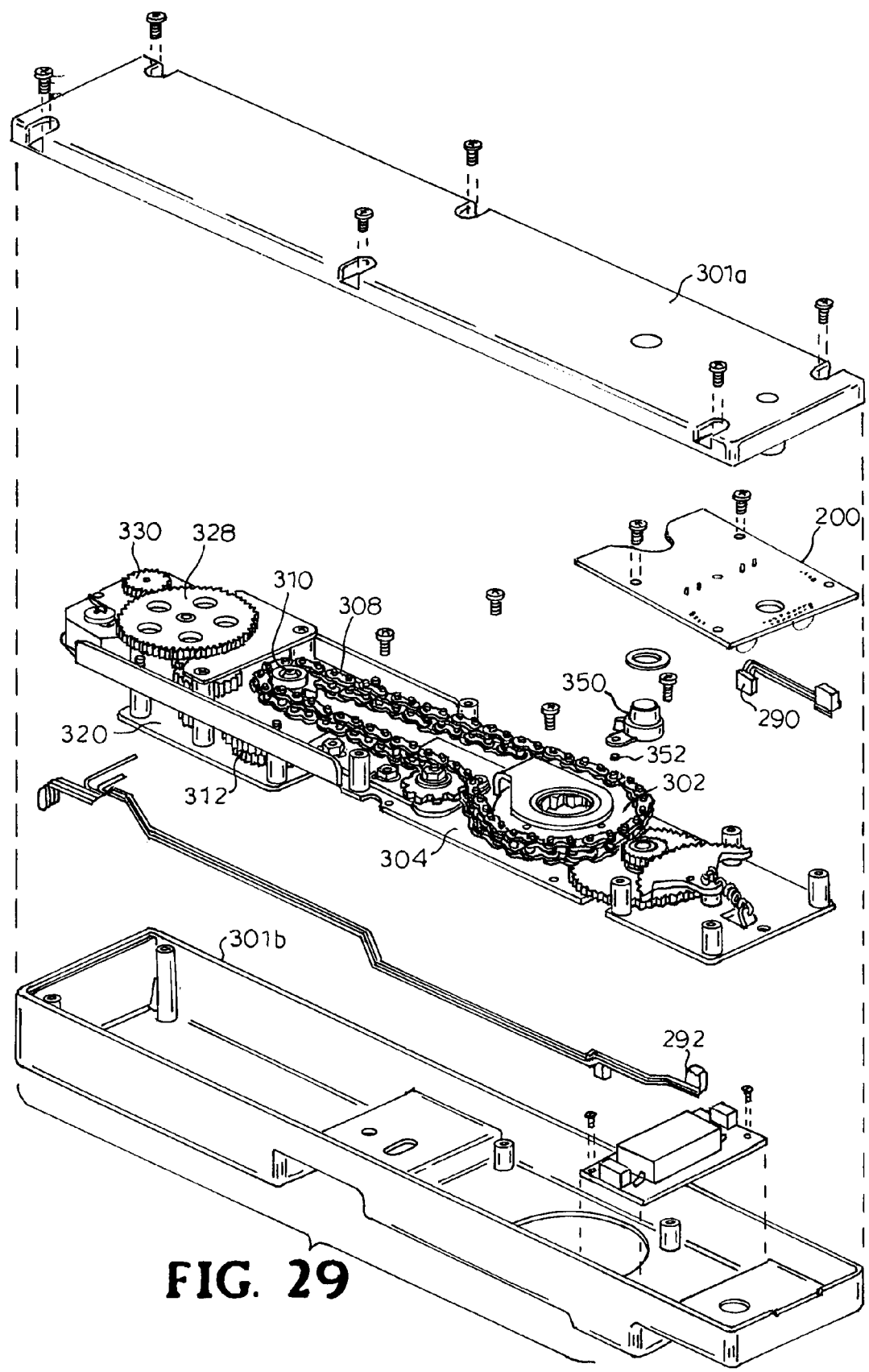
FIG. 29 is an exploded perspective view of the control unit as shown in FIG. 28.

FIGS. 28 and 29 depict an exemplary embodiment of the control unit 110. The control unit 110 may also be referred to herein as a "controller". The components of the control unit 110 are housed by a two-piece cover 303a, 303b, which can be mounted on the bottom or the top of the door closer 90.

As described above, the control unit 110 has a printed circuit board (PCB) 300 on which logic, referred to herein as the "control logic," resides. Such logic may be implemented in hardware, software, firmware, or any combination thereof. In an exemplary embodiment illustrated in FIG. 30, the control logic 580 is implemented in software and stored in memory 582 mounted on the PCB 300.

Figure 30:
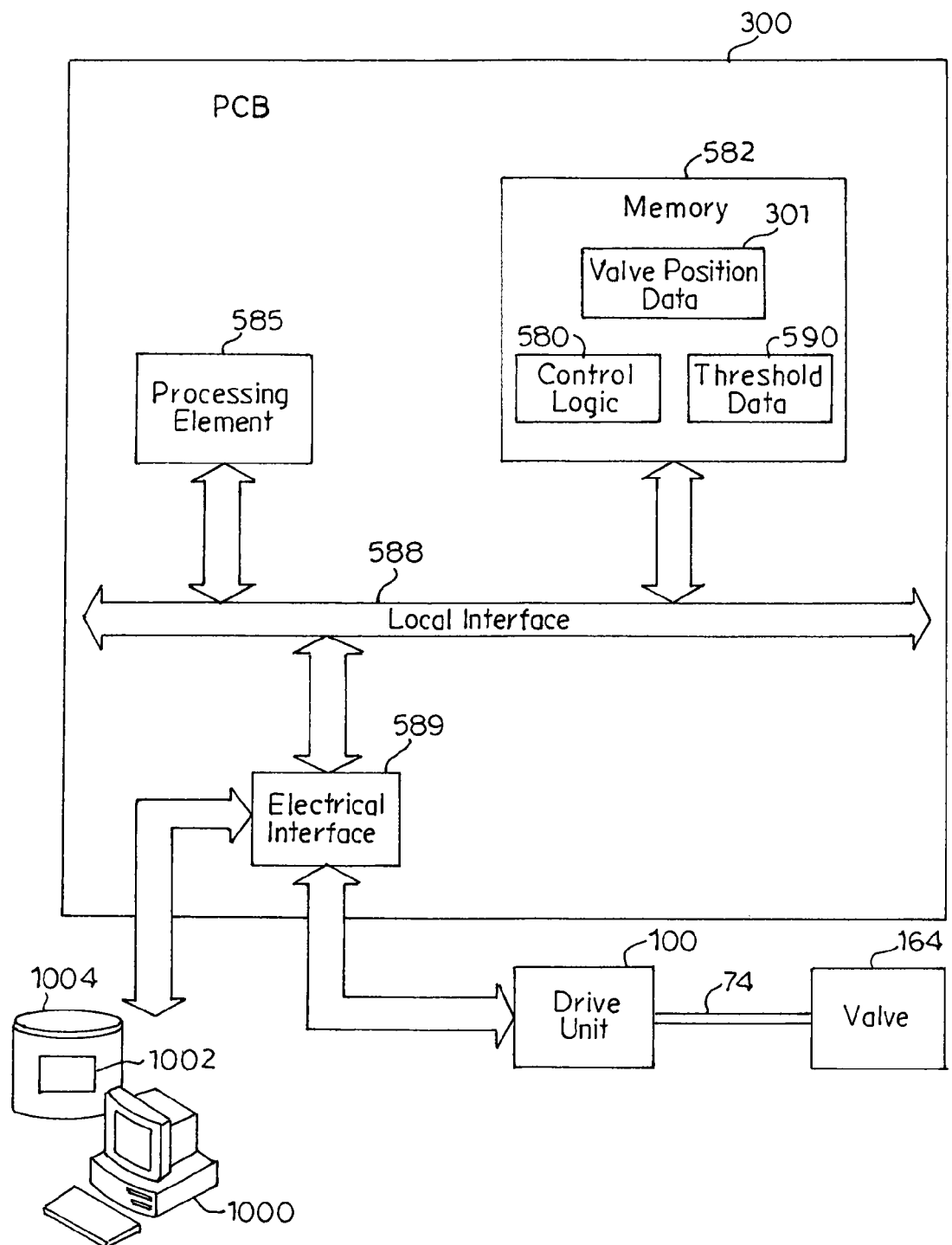
FIG. 30 is a block diagram of an embodiment of a printed circuit board for use in a control unit for controlling a valve of a door closer.

The exemplary embodiment of the PCB 300 depicted by FIG. 30 comprises at least one processing element 585, such as a digital signal processor (DSP) or a central processing unit (CPU), that communicates to and drives the other elements of the PCB 300 via a local interface 588, which can include at least one bus. Furthermore, an electrical interface 589 can be used to exchange electrical signals, such as power or data signals, with other components in the door closer assembly 80 or external to the door closer assembly 80. In one exemplary embodiment, the electrical cable 292 of the control unit 110 is coupled to the interface 589.

Note that FIG. 30 also shows a workstation 1000 optionally connected to the electrical interface 589. This workstation may serve as an instruction execution platform to execute software 1002 stored on a storage medium 1004 that runs during a calibration mode to store calibration positional values in memory 582. The calibration mode is discussed in detail later with respect to FIGS. 47 and 48. In some embodiments the calibration software may be in the workstation. In other embodiments, it may be stored in memory 582. In still other embodiments, it may reside in part or in whole in both places. The software may be distributed as part of a computer program product including computer program code or instructions on a medium or on media. The memory may be any of various types. In some embodiments, an EEPROM can be used.

Any suitable computer usable or computer readable medium may be utilized. The computer usable or computer readable medium may be, for example but not limited to, an electronic, magnetic, optical, or semiconductor system, apparatus, or device. More specific examples (a non-exhaustive list) of the computer readable medium would include any tangible medium such as a portable computer diskette, a hard disk, a random access memory (RAM), a read-only memory (ROM), an erasable programmable read-only memory (EPROM, EEPROM or flash memory), a compact disc read-only memory (CD-ROM), or other optical, semiconductor, or magnetic storage device The components of the PCB 300 receive electrical power from a generator, which will be described in more detail below. It should be noted that there are varied methods of harnessing door movement energy as well as translating the physical movement into electrical energy, but due to the modular design of this exemplary embodiment of a door closer assembly 80, differing implementations can be used when appropriate. One method explained in detail will be referred to as the direct drive method throughout this document.

Figure 31:
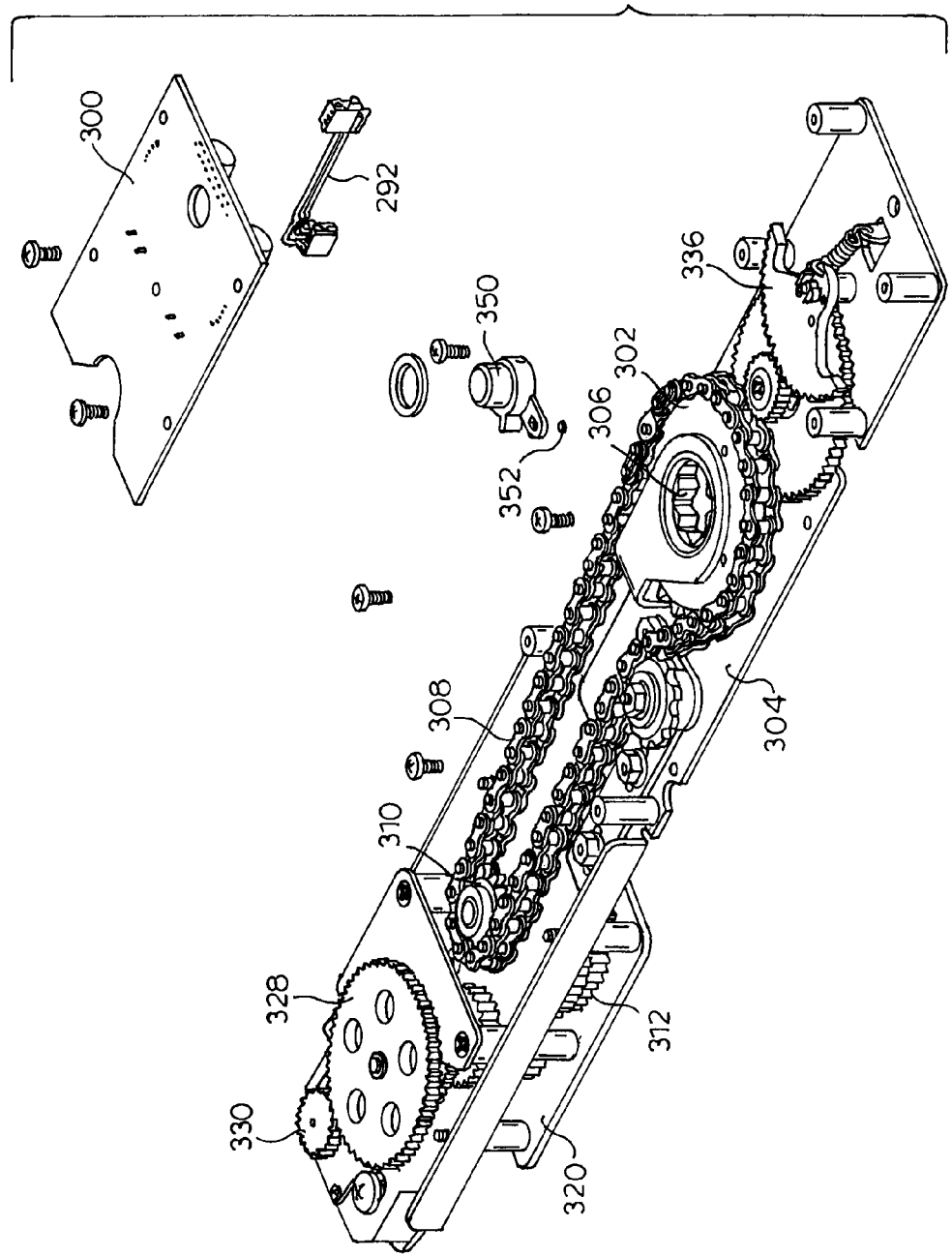
FIG. 31 is a partially exploded perspective view of a portion of the control unit as shown in FIG. 29.

Referring now to FIGS. 29 and 31, a large drive gear 302 is rotatably mounted on a base plate 304 using an S-shaped bracket. The base plate 304 is supported on four internally threaded posts 305a and held in place with screws 305b threaded into the posts 305a. The drive gear 302 defines a star-shaped opening 306 for receiving an end of the pinion 112 of the door closer 90. The end of the pinion 112, which is square, fits in the opening 306 such that the large drive gear 302 is rotated with the pinion 112 during door 82 movement. The large drive gear 302 is the start of all direct drive method power generation. The drive gear 302 engages a chain 308. Linear motion of the chain 308 in either the +/−x direction results in corresponding clockwise/counterclockwise rotation of a small drive sprocket 310 longitudinally spaced from the drive gear 302 on the base plate 304. An idler tension gear 311 on the base plate 304 is adjustable for holding the chain 308 at the appropriate tension to allow for all gear teeth to grip the chain 308 during door 82 motion.

The direct drive method harnesses the rotational motion from the pinion 112 of the door closer 90, which is coupled to the large drive gear 302. When the pinion 112 rotates through door movement, such rotational motion is translated into linear motion down the chain 308 in the +/−x direction depending on clockwise or counterclockwise rotation of the pinion 112. For example, if rotation of the pinion 112 is in the clockwise direction, and the linear motion of the chain 308 is in the −x direction, it also follows that counter-clockwise rotation of the pinion 112 will propagate the chain 308 in the +x direction. It should be noted that rotational motion of the pinion 112 in either the clockwise or counterclockwise direction is the result of the door 82 being opened or closed and will vary in eventual linear +/−x motion depending on orientation of mounting of the door closer assembly 80.

Figure 32:
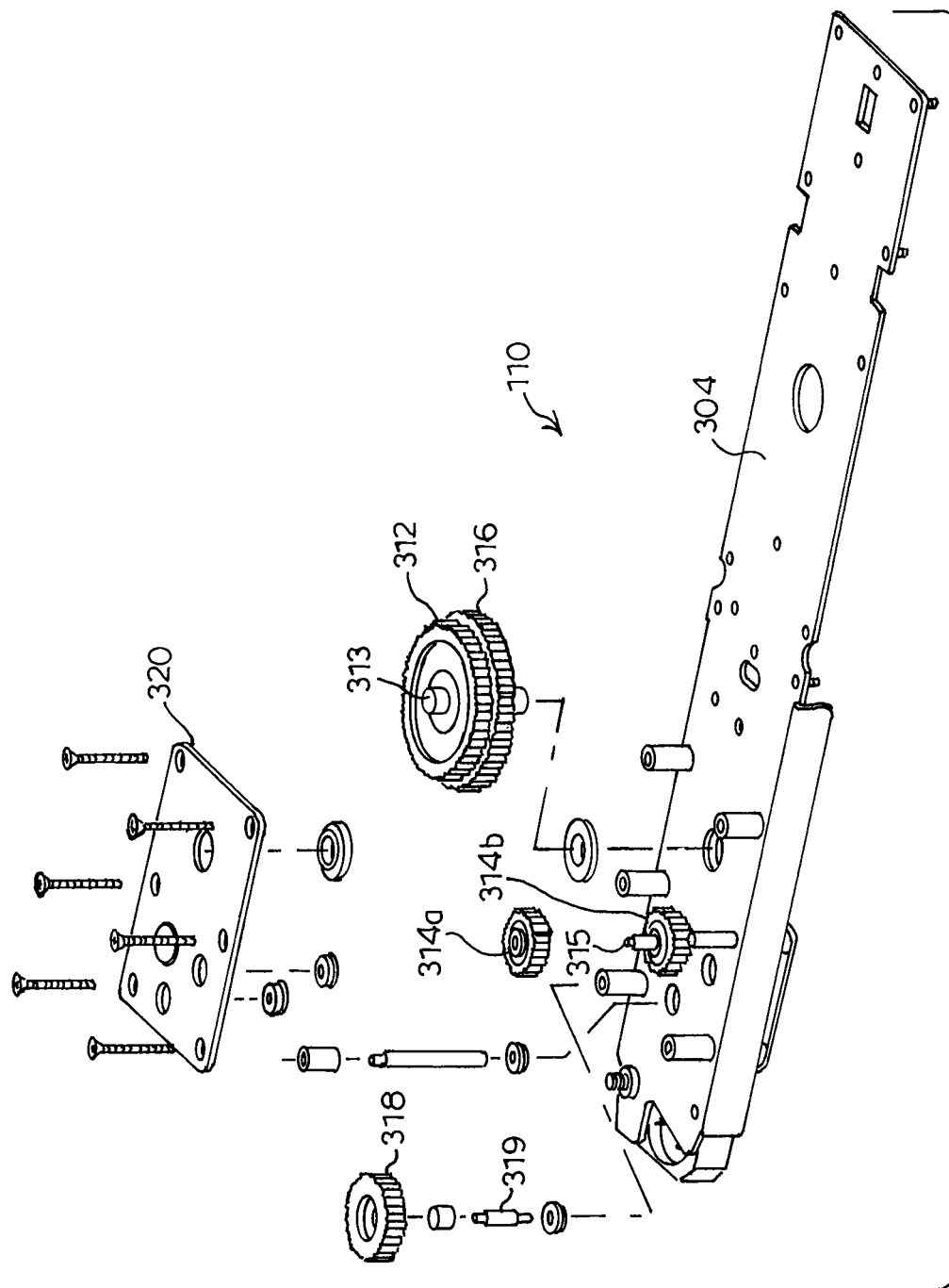
FIG. 32 is an exploded bottom perspective view of an embodiment of a power generator portion of the control unit as shown in FIG. 29.
Figure 33:
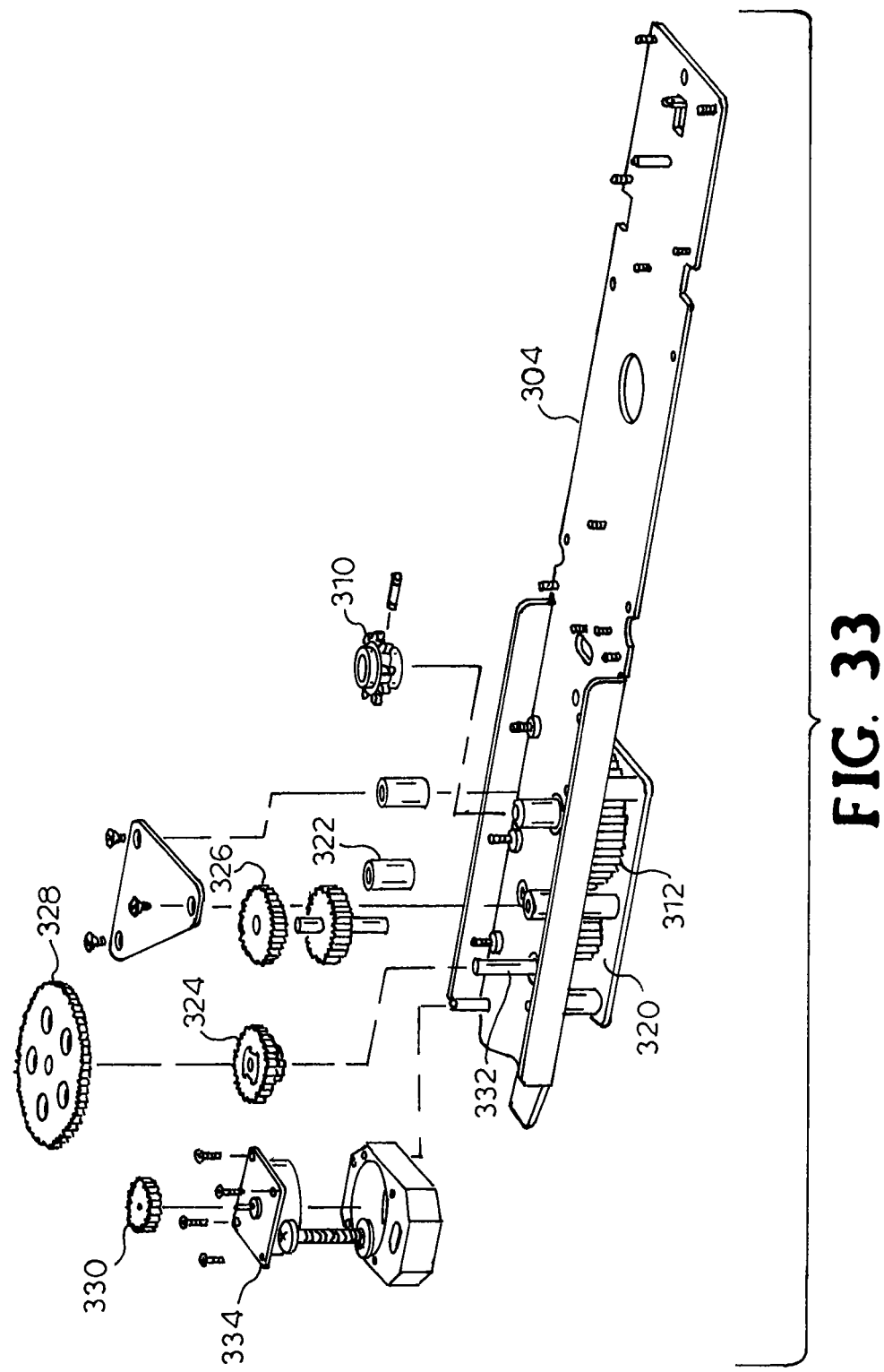
FIG. 33 is an exploded top perspective view of the power generator portion of the control unit as shown in FIG. 32.
Figure 34:
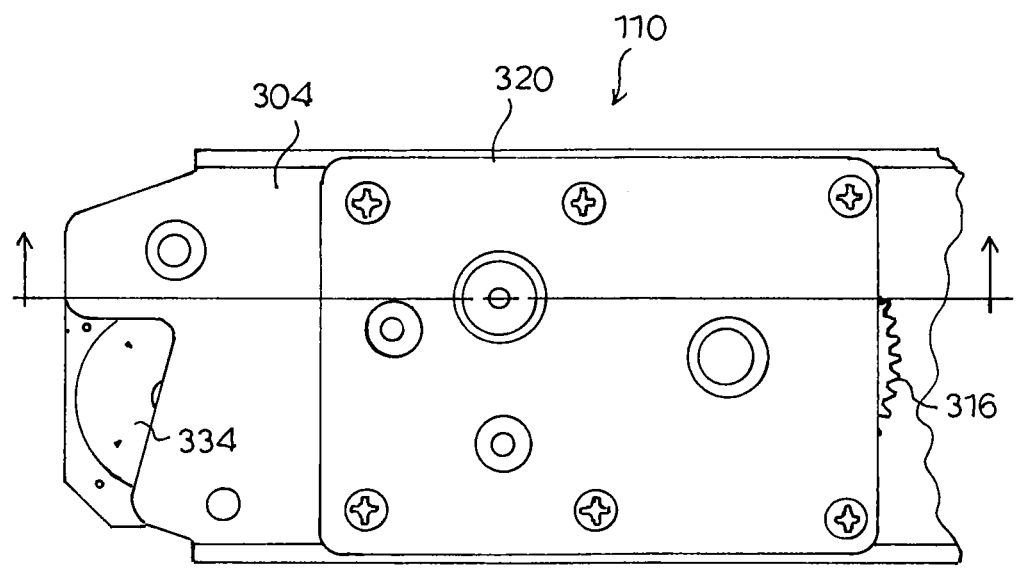
FIG. 34 is a partial bottom plan view of the power generator portion of the control unit as shown in FIG. 32.
Figure 35:
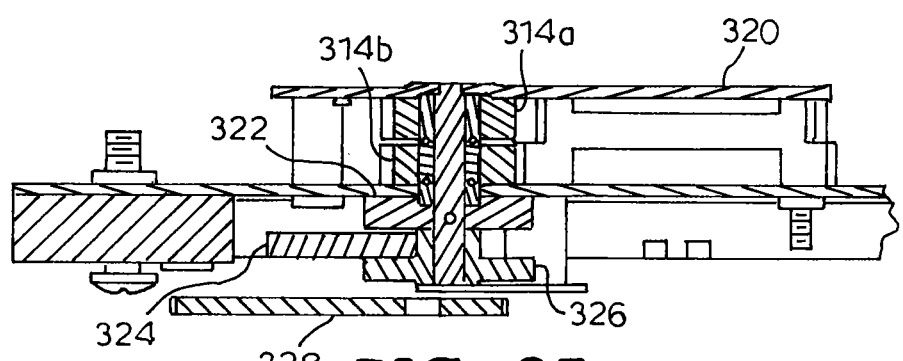
FIG. 35 is a longitudinal cross-section view of the power generator taken along line 35-35 of FIG. 34.

Referring to FIGS. 32 and 33, the drive sprocket 310 is fixed for rotation with a large compound box gear 312 on the opposite side of the base plate 304 through a sprocket shaft 313. The box gear 312 has a larger diameter than the drive sprocket 310, thereby maintaining the rotational rate of the original door 82 motion. The box gear 312 also has a higher tooth density, which helps distribute the angular rotational torque, so varying materials can be used in the box gear design. This arrangement also helps prevent the box gear 312 from exerting a reverse torque and thereby inhibiting the door from opening or closing freely.

Since the pinion 112 and the large box gear 312 will rotate in the same clockwise or a counterclockwise direction depending on the direction the door 82 is moving, a pair of clutch gears 314a, 314b are provided. The clutch gears 314a, 314b ensure that, regardless of the direction of rotation of the box gear 312, all downstream gear rotation, including the final interpretation of a generator gear 330, is the same direction of rotation. Thus, electrical energy will be generated in the same manner regardless of the direction the door 82 is moving. The set of clutch gears 314a, 314b also ensures that the gears further downstream will not be subject to unwanted gear wear associated with bi-directional rotation. It should be noted that a regulated generator is an alternative design for this exemplary embodiment, which would render the pair of clutch gears unnecessary.

The gear train for achieving unidirectional rotation of the generator gear 330 is shown in FIGS. 32-37. The clutch gears 314a, 314b are disposed on a shaft 315 extending between the base plate 304 and a support plate 320 secured to posts extending from the base plate 304 such that the support plate 320 is spaced from and parallel to the base plate 304. Rotational motion from the box gear 312 is directly transferred to the inner clutch gear 314b by direct engagement with the larger gear 316 of the box gear 312. The opposite rotational motion is simultaneously transferred from the box gear 312 through an intermediary gear 318. The intermediary gear 318 spins freely on a shaft 319 extending between the base plate 304 and the support plate 320 by direct engagement with smaller gear 317 of the box gear 312. The intermediary gear 318 directly engages the outer clutch gear 314a. The clutch gears 314a, 314b are oriented such that the clutch gears 314a, 314b only grip the shaft 319 for rotation in one direction. For example, when the box gear 312 rotates clockwise, the outer clutch gear 314a grips the shaft 315 through the intermediary gear 318 and turns the shaft 315 in the clockwise direction. The inner clutch gear 314a spins freely in the counterclockwise direction. It also follows that when the box gear 312 rotates in the counterclockwise direction, the inner clutch gear 314b directly grips the shaft 315 and rotates the shaft 315 in the clockwise direction while the outer clutch gear 314a spins freely in the counterclockwise direction through the intermediary gear 318. In this manner, the shaft 315 only receives one direction of rotation, which is transferred to a fixed drive gear 322 non-rotatably disposed on the shaft 315 on the other side of the base plate 304. Thus, a single direction of rotation is established for all gears between the generator gear 330 and the clutch gears 314a, 314b. It follows that, since the door 82 opening or closing motion can be translated into unidirectional rotation on the fixed drive gear 322, all subsequent gears will only see one direction of rotation regardless of whether the door 82 is opening or closing.

The fixed drive gear 322 transfers rotational motion through a series of compound gears 324, 326, 328, 330 with the explicit intent to increase overall rotational velocity for any given motion of the pinion 112, which is directly derived from door 82 movement. The fixed drive gear 322 engages the smaller inner gear of the compound gear 324 rotatably mounted on an adjacent shaft 332. The larger gear of the compound gear 324 engages the smaller gear of the compound gear 326 rotatably mounted on the clutch gear shaft 315. The larger gear of the compound gear 326 engages the smaller gear of the third, large compound gear 328 which is also on the adjacent shaft 332. This final higher velocity rotation of the large compound gear 328 is transferred to the generator gear 330 affixed to a generator 334.

For the embodiment as depicted, the rotational energy derived from door opening or closing and redirected through the subsequent gear train described above is used by the generator 334 to generate electrical power. The large drive gear 302 advances the chain 308 by door movement in the opening or closing direction, and the generator 334 generates power when the door is moving. The generator supplies power through connected wires, which may be part of a multi-conductor cable, such as cable 292. When the door 82 is no longer moving, such as after the door fully closes, various electrical components, such as components on the PCB 300, are shut-off. Thus, the electrical power requirements of the door closer assembly 80 can be derived solely from movement of the door, if desired. Once a user begins opening the door, the movement of the door 82 directly drives the large drive gear 302 and subsequently the gear train to the generator 334 and electrical power is, therefore, generated. When the generator 334 begins providing electrical power, the electrical components are powered, and the door closer assembly 80 is controlled in a desired manner until the door closes or otherwise stops moving at which time various electrical components are again shut-off.

It should be emphasized that techniques described above for generating electrical power are exemplary. Other techniques for providing electrical power are possible in other embodiments, and it is unnecessary for electrical components to be shut-off in other embodiments. In addition, other devices besides a generator can be used to provide power for the controller 110. For example, it is possible for the control unit 110 to have a battery (not shown) in addition, or in lieu of, the generator 334 in order to provide power to the electrical components of the door closer assembly 80. In such a case, the device to provide power consists of a battery holder with connections for the control circuitry. However, a battery, over time, must be replaced. The device to provide power might also be a connector or wires to interface with external power. In one exemplary embodiment, the control unit 110 is designed such that all of the electrical power used by the control unit 110 is generated by the generator 334 so that use of a battery is unnecessary. In other embodiments, electrical power can be received from other types of power sources.

As described above, the control logic 580 may function to adjust the angular position of the valve shaft 164 based on the door angle. There are various techniques that may be used to sense door angle. In one exemplary embodiment, the control logic 580 is configured to sense the door angle based on a magnetic position sensor, similar to the techniques described above for sensing the angular position of the valve shaft 164 via the magnetic sensors 299a, 299b in the drive unit 100.

Figure 38:
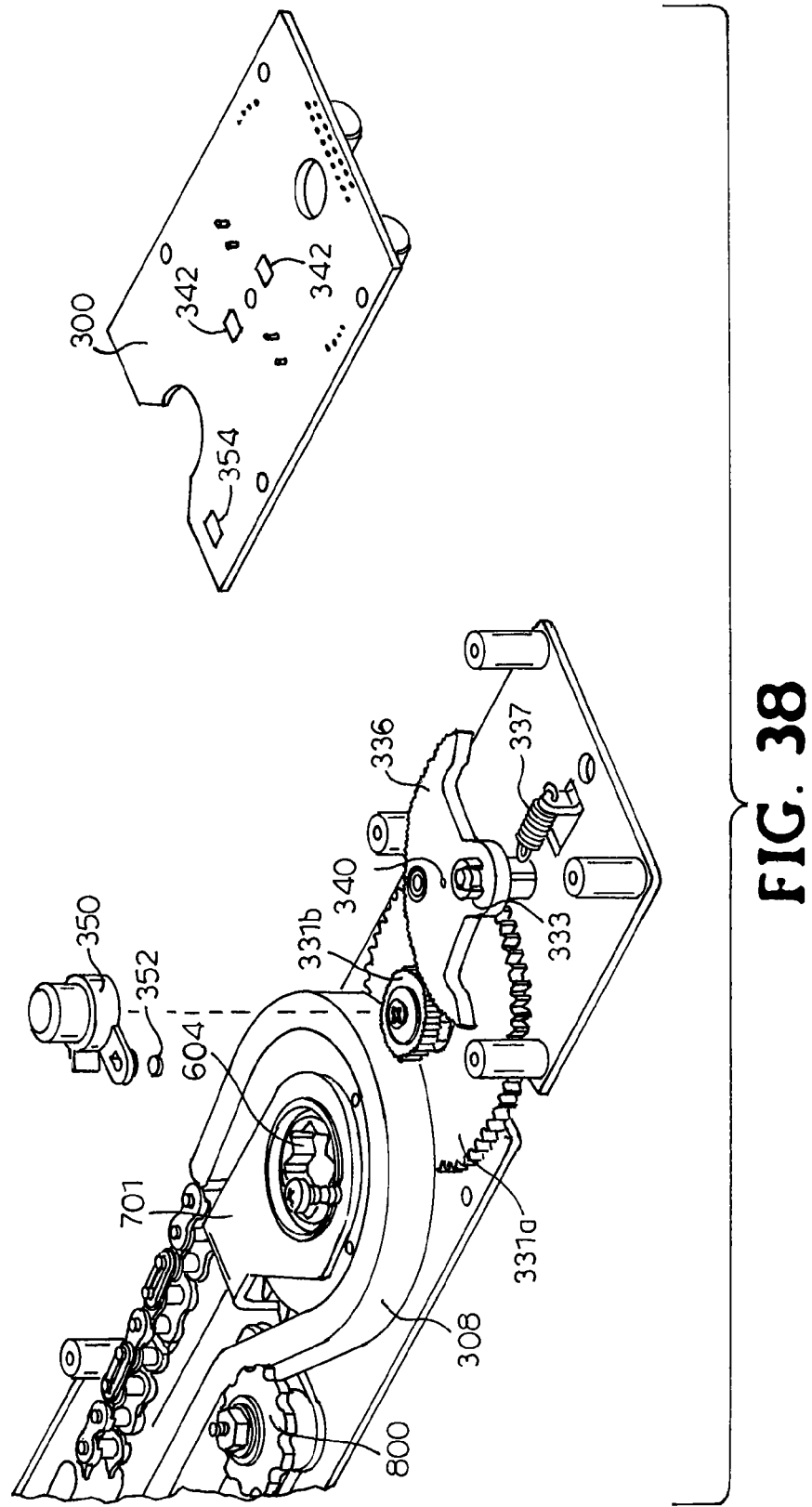
FIG. 38 is a partially exploded perspective view of an embodiment of an encoder portion of the control unit as shown in FIG. 29.
Figure 39:
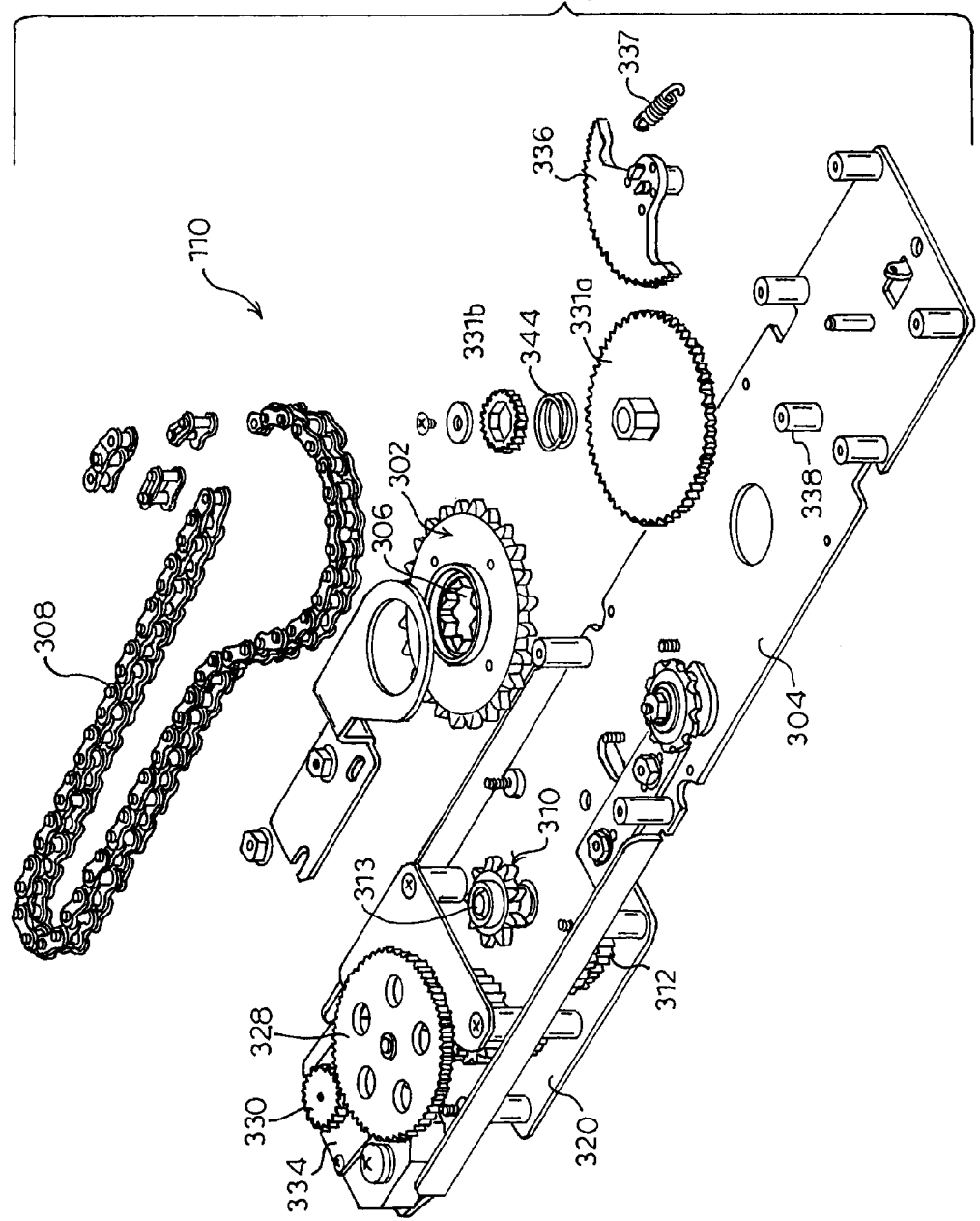
FIG. 39 is an exploded top perspective view of the encoder portion of the control unit shown in FIG. 29.
Figure 40B:
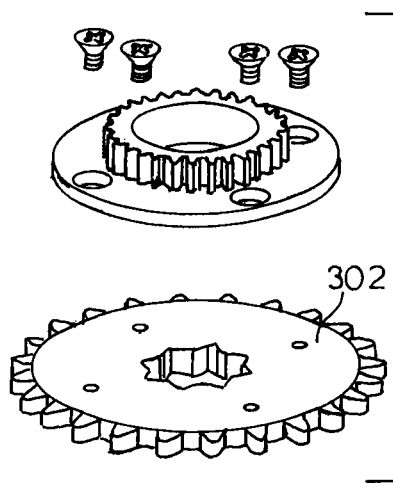
FIGS. 40A and 40B are bottom and top perspective views, respectively, of an embodiment of a drive gear for use with the control unit as shown in FIG. 29.
Figure 40A:
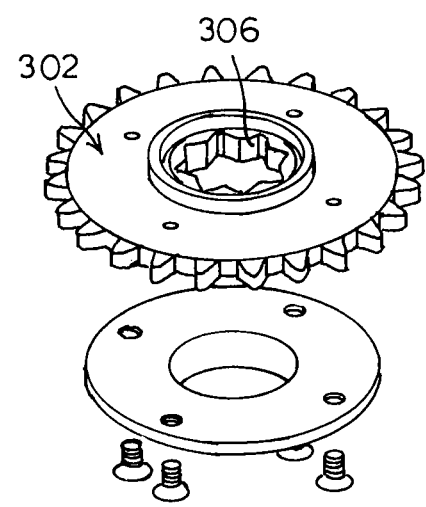

Referring to FIGS. 38-40, the control unit 110 comprises an arcuate arm gear 336 that is coupled to the pinion 112 through the drive gear 302 and arm encoder gears 331a, 331b. The arm encoder gears 331a, 331b are fixed for joint rotation on a post 338 extending from the base plate 304 at a position longitudinally spaced from the drive gear 302. The smaller upper encoder gear 321b is engaged with the arm gear 336. As best seen in FIG. 40, the drive gear 302 has a smaller inner gear that engages the larger arm encoder gear 331a. When the large drive gear 302 rotates with the pinion 112, the lower arm encoder gear 331a also rotates by engagement with a smaller inner gear 362 on the drive gear 302. Since the upper arm encoder gear 331b rotates with the lower arm encoder gear 331a, interaction of the upper arm encoder gear 331b and the arm gear 336 rotates the arm gear 336. Thus, any rotation of the pinion 112 caused by movement of the door 82 causes a corresponding rotation of the arm gear 336. In one embodiment, the pinion 112 rotates at a ratio of six-to-one relative to the arm gear 336. That is, for six degrees of rotation of the pinion 112, the arm gear 336 rotates one degree. However, other ratios are possible in other embodiments.

At least one magnet 340 is mounted on the arm gear 336. The PCB 300 is mounted over the arm gear 336 on four threaded posts with screws. At least one magnetic sensor 342 is mounted on the PCB 300. The magnetic sensor 342 is stationary, and the magnet 340 moves with the arm gear 336. Thus, any movement by the door 82 causes a corresponding movement by the magnet 340 relative to the sensor 342. The control logic 580 is configured to determine a value indicative of the magnetic field strength sensed by the sensor 342 and to then map such value to the angular position of the door 82. Further, as described above, the control logic 580 is configured to use the angular position of the door 82 to control the angular position of the valve shaft 164, thereby controlling the force generated by the door closer 90.

For illustrative purposes, assume that it is desirable for the door closer 90 to control the hydraulic force generated by the closer during opening based on two door angles, referred to hereafter as "threshold angles," of fifty degrees and seventy degrees. In this regard, assume that the door closer is to generate a first hydraulic force resistive of the door motion during opening for door angles less than fifty degrees. Between fifty and seventy degrees, the door closer is to provide a greater hydraulic force resistive of the door motion. For door angles greater than seventy degrees, the door closer is to provide a yet greater hydraulic force resistive of the door motion. This high-force region of motion is often termed the "back check" region, since the greater force is intended to prevent the back of the door from hitting a wall or stop. Further assume that during closing, the closer is to generate another hydraulic force for door angles greater than fifteen degrees and a smaller hydraulic force for door angles equal to or less than fifteen degrees. This latter region, where the door is close to the jamb, is often referred to as the "latch region" of motion. These angles are a design choice and can vary.

As shown by FIG. 30, the control logic 580 stores threshold data 590 indicating the desired opening and closing characteristics for the door 82. In this regard, the data 590 indicates the threshold angles and the desired angular position of the valve for each threshold range. In particular, the data 590 indicates that the angular position of the valve is to be at one position, referred to hereafter as the "high-flow position," when the door angle is fifty degrees or less during opening, but the door is not in the latch region. The data 590 also indicates that the angular position of the valve to be at another position, referred to hereafter as the "medium-flow position," when the door angle is greater than fifty degrees but less than or equal to seventy degrees during opening. The data 590 further indicates that the angular position of the valve is to be at yet another position, referred to hereafter as the "low-flow position," when the door angle is greater than seventy degrees during opening, and thus the door is in the back-check region. Note that the medium-flow position allows a lower flow rate than that allowed by the high-flow position, and the low-flow position allows a lower flow rate than that allowed by the medium-flow position, and also that there may be many variations of angle used as trigger points for entering into a particular flow rate region as well as numerous degrees of each flow rate described above. Thus, the hydraulic forces generated by the closer resisting door movement should be at the highest above a door angle of 70 degrees and at the lowest below a door angle of 50 degrees. In addition, assume that the data 590 also indicates that, when the door is closing, the angular position of the valve is to be at a position for angles less than or equal to 15 degrees to allow for very slow closing in the latch region.

In some embodiments of the closer assembly, velocity measurements of door movement can add more intelligence to COS 164 movement decisions. Deciding if a threshold has been met is only one scenario of trying to mitigate an unnecessary reposition of the COS 164. It also follows that if door movement is slow enough during opening mode that there will not be a need to move the COS 164 to the next mode of COS, valve operation stored in the threshold data 590. For instance, if when opening the door 82 under normal decision processing, the threshold data 590 determines that the door movement requires the COS 164 be positioned at a low flow rate to prevent the door from opening further than desired, it then will have to perform another movement to position the COS 164 in the appropriate position for a close mode when the threshold data 590 has determined it is necessary. So, in this embodiment, the COS 164 had to make two movements and therefore use energy for moving the COS 164 both times. However, if after determining the door 82 is closing the determination was made whether there was a predetermined high velocity violation, the decision for determining if the COS 164 should be moved to the next position would only happen if velocity is too high. This will help conserve energy during slow door movement, which does not require a low-flow rate to protect the door from opening too fast and therefore allow the closer to bypass one movement of the COS 164 as normal operation would indicate. A process that can be used to measure the velocity of the door is to determine the door angle difference over time using a timer in the control logic 580. Furthermore, it also follows that this same velocity measurement can be used to make other decisions that the control logic 580 will discern. For example, if the velocity is extremely high, a decision could be made to move COS 164 to a low flow rate position sooner than threshold data 590 normally requires. This would be useful in a scenario where a door 82 is being kicked and thereby prevent damage to people or the surroundings.

As described above, electrical power can be harnessed from the energy created by door movement. In one exemplary embodiment, all of the electrical power for powering the electrical components of the door closer 90, including electro-mechanical components, such as the motor 244, is derived from door movement. Accordingly, the door closer assembly 80 may not be provided with power from an external power source and does not require batteries. Since power is limited and only available when the door 82 is moving and a short time thereafter, various techniques are employed in an effort to conserve power to help ensure that there is enough power to control valve position in a desired manner.

In one embodiment, the sensors 299a, 299b in the drive unit 100 and the sensor 342 in the control unit 110 are enabled only for enough time to ensure that an accurate reading is taken. In this regard, the control logic 580 enables the sensors 299a, 299b, waits a short amount of time (e.g., a few microseconds), takes a reading, and then disables the sensors 299a, 299b. Indeed, in one embodiment, the control logic 580 enables the one of the sensors 299a, 299b in the drive unit 100 in response to a determination that a reading of the sensor 299a, 299b should be taken, and the control logic 580 thereafter disables the sensors 299a, 299b in response to the occurrence of the reading. Thus, for each reading, the sensor 299a, 299b draws power for only a short time period, such as about 10 microseconds. Similarly, the control logic 580 enables the sensor 342, waits a short amount of time (e.g., a few microseconds), takes a reading, and then disables the sensor 342. Thus, for each reading, the sensor 342 draws power for only a short time period, such as about 10 microseconds. Note that, as described above for the drive unit sensors 299a, 299b, the sensor 342 on the POCB 300 may be enabled in response to a determination that a reading of the sensor 342 should be taken and may be disabled in response to a determination that such reading has occurred.

Figure 41:
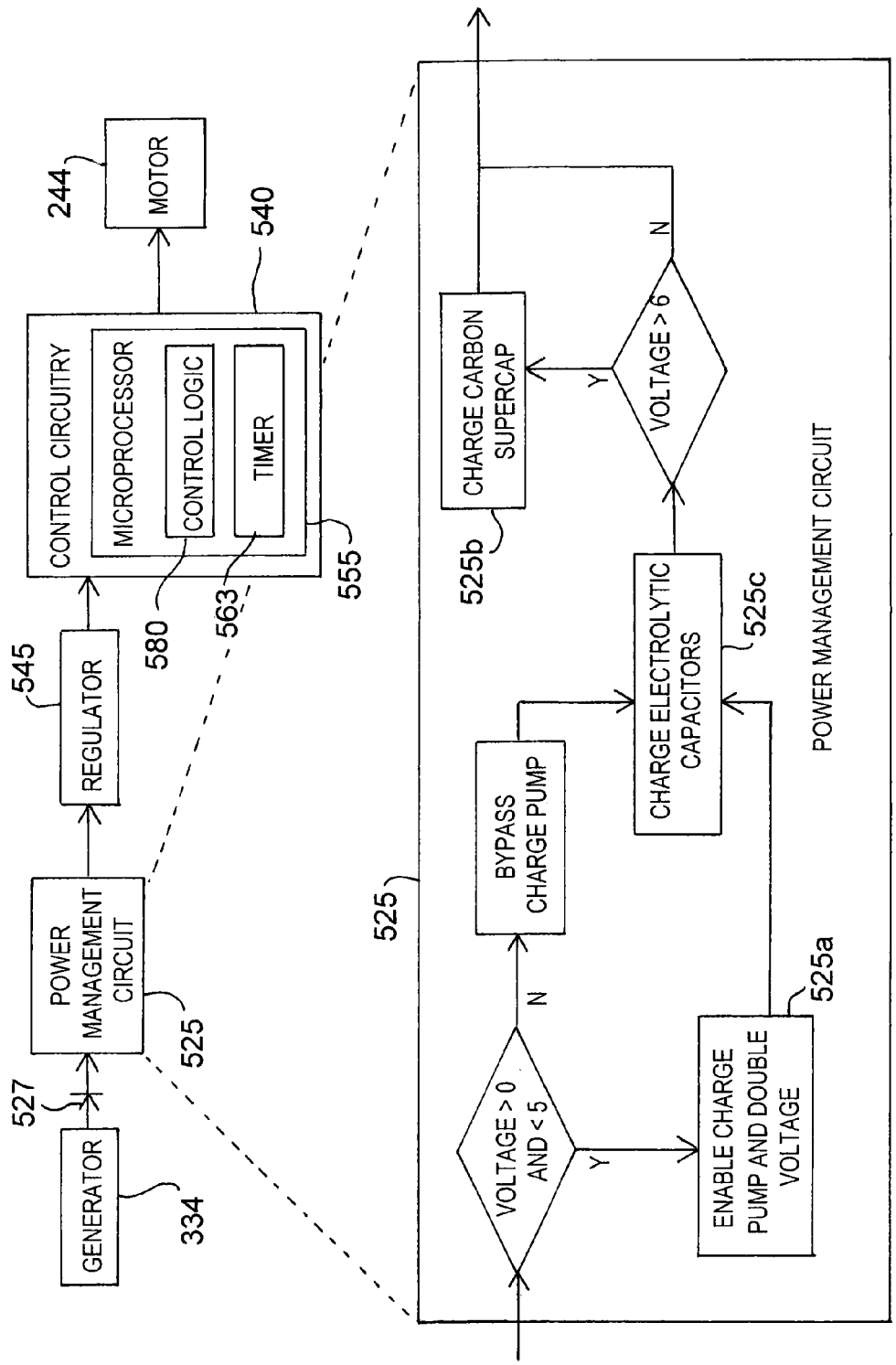
FIG. 41 is an embodiment of a circuit diagram for providing power to various electrical components of a door closer.
Figure 42:
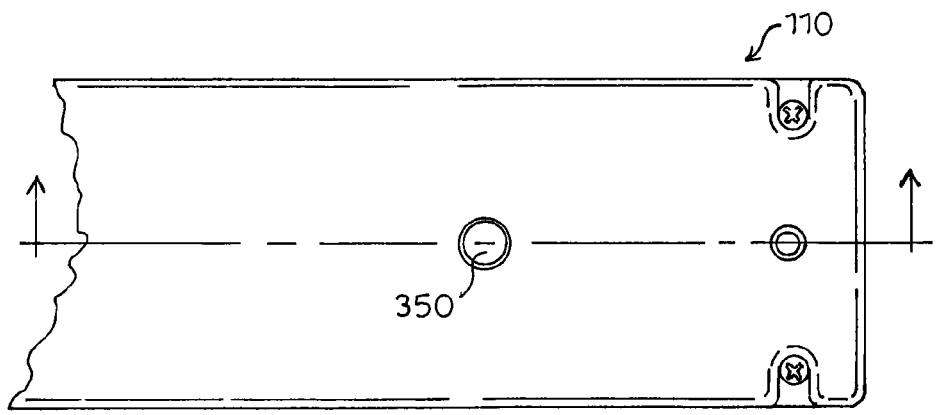
FIG. 42 is partial top plan view of the encoder portion of the control unit as shown in FIG. 28.

To further help conserve power, the control logic 580 tracks the amount of power that is available and takes various actions based on the amount of available power, as will be described in more detail below. In one embodiment, FIG. 41 depicts an exemplary circuit for providing power to various electrical components of the door closer assembly 80. In this regard, a power management circuit 525 is coupled to the generator 334 via a diode 527. As described herein, when the large drive gear 302 in the control unit 110 is rotated by door movement, and the chain 308 transfers the motion through the gear train, the generator 334 generates an electrical pulse. As long as the door continues moving, the generator 334 repetitively generates electrical pulses.

Each electrical pulse from the generator 334 charges the power management circuit 525. The power management circuit 525 is comprised of a charge pump 525a, SuperCap™ battery ("SuperCap") 525b, and an electrolytic capacitor 525c, which are electrically combined to maximize instant voltage output for low power situations and to maximize energy storage when power is being generated. In general, as power is generated by the generator 334, a circuit detects if the voltage being generated is greater than zero volts but less than 5 volts, and if so will turn on the charge pump 525a to double the voltage. This type of circuit can help minimize the errors that a slow moving door can cause when not enough power is available to move the COS 164 to the appropriate position. For example, in this exemplary embodiment, a slow moving door may provide one to two volts on the onset of the slow movement and therefore not generate enough energy for control circuitry 540 to determine if a valve movement needs to take place, but with the charge pump the control circuitry 540 would wake immediately and determine next course of action without delay and therefore be able to move the COS 164 when appropriate.

However, once the voltage level increases past five volts from the generator 334, the efficiencies of the charge pump 525a start to reduce and may damage the rest of the circuit, so the circuit then switches the outputted voltage away from the charge pump 525a and directly charges the electrolytic capacitor 525c until such time the voltage being generated then rises above 6 volts, which then means the energy being produced is more than required for immediate use, so it can be stored. Upon determining extra voltage is available the circuit then allows the outputted energy to charge the carbon SuperCap 525b and the electrolytic capacitor 525c simultaneously so that all energy being generated is available for valve operation or being stored for later use. Since the electrolytic capacitor 525b is of much smaller capacitance, its charging and discharging properties are relatively fast and respond to COS 164 movement needs instantaneously. The carbon SuperCap 525b has a much higher capacitance and is used to recharge the electrolytic capacitor when no power is being generated but energy is still needed for valve operation.

Accordingly, if the door is moving fast enough, electrical power is continually delivered to control circuitry 540 during such movement. As shown by FIG. 41, a voltage regulator 545 is coupled to the capacitor 525c and regulates the output from the power management circuit 525, so that this voltage is constant provided that there is sufficient power available to maintain the constant voltage. For example, in one embodiment, the regulator 545 regulates the voltage across the power management circuit 525 to three volts. Thus, as long as the power management circuit 525 is sufficiently charged, the regulator 545 keeps the voltage across capacitor 525c equal to three volts. However, if the door stops moving thereby stopping the generation of electrical pulses by the generator 334, then the voltage across the power management circuit 525 eventually falls below three volts as the electrolytic capacitor 525c and carbon SuperCap 525b discharges.

Also as shown by FIG. 41, the control circuitry 540 in one exemplary embodiment comprises a microprocessor 555. Further, in such embodiment, at least a portion of the control logic 580 is implemented in software and run on the microprocessor 555 after being loaded from memory. The microprocessor 555 also comprises a timer 563 that is configured to generate an interrupt at certain times, as will be described in more detail hereafter.

The parameters on which decisions are made to adjust valve position change relatively slowly compared to the speed of a typical microprocessor. In this regard, a typical microprocessor is capable of detecting parameters that have a rate of change on the order of a few microseconds, and a much longer time period is likely to occur between changes to the state of the valve position. To help conserve power, the control logic 580 is configured to transition the microprocessor 555 to a sleep state after checking the sensors 299a, 299b, 342 and adjusting valve position based on such readings, if appropriate.

Before transitioning to the sleep state, the control logic 580 first sets the timer 563 such that the timer 563 expires a specified amount of time (e.g., 100 milliseconds) after the transition to the sleep state. When the timer 563 expires, the timer 563 generates an interrupt, which causes the microprocessor 555 to awaken from its sleep state. Upon awakening, the control logic 580 checks the sensors 299a, 299b, 342 and adjusts the valve position based on such readings, if appropriate. Thus, the microprocessor 555 repetitively enters and exits a sleep state thereby saving electrical power while the microprocessor 555 is in a sleep state. Note that other components of the control circuitry 540 may similarly transition into and out of a sleep state, if desired.

In one exemplary embodiment, the control logic 580 monitors the voltage across the power management circuit 525 to determine when to perform an orderly shut-down of the control circuitry 540 and, in particular, the microprocessor 555. In this regard, the control logic 580 is configured to measure the voltage across the power management circuit 525 and to compare the measured voltage to a predefined threshold, referred to hereafter as the "shut-down threshold." In one embodiment, the shut-down threshold is established such that it is lower than the regulated voltage but within the acceptable operating voltage for the microprocessor. In this regard, many microprocessors have a specified operating range for supply voltage. If the microprocessor is operated outside of this range, then errors are likely. Thus, the shut-down threshold is established such that it is equal to or slightly higher than the lowest acceptable operating voltage of the microprocessor 555, according to the microprocessor's specifications as indicated by its manufacturer. It is possible for the shut-down threshold to be set lower than such minimum voltage, but doing so may increase the risk of error.

If the measured voltage falls below the shut-down threshold, then the power management circuit 525 has discharged to the extent that continued operation in the absence of another electrical pulse from the generator 334 is undesirable. In such case, the control logic 580 initiates an orderly shut-down of the control circuitry 540 and, in particular, the microprocessor 555 such that continued operation of the microprocessor 555 at voltages outside of the desired operating range of the microprocessor 555 is prevented. Once the shut-down of the microprocessor 555 is complete, the microprocessor 555 no longer draws electrical power.

In addition, the control logic 580 may be configured to take other actions based on the measured voltage of the power management circuit 525. For example, in one embodiment, the control logic 580 is configured to delay or prevent an adjustment of valve position based on the measured voltage. In this regard, as the capacitor 525c discharges, the measured voltage (which is indicative of the amount of available power remaining) may fall to a level that is above the shut-down threshold but nevertheless at a level for which the shut-down threshold will likely be passed if an adjustment of valve position is allowed. In this regard, performing an adjustment of the valve position consumes a relatively large amount of electrical power compared to other operations, such as reading sensors 299a, 299b, 342. As described above, to change valve position, the motor 244 is actuated such that the COS 164 is driven to an appropriate position in order to effectuate a desired valve position change. If the voltage of the power management circuit 525 is close to the shut-down threshold before a valve position adjustment, then the power usurped by the motor 244 in effectuating the valve position adjustment may cause the voltage of the power management circuit 525 to fall significantly below the shut-down threshold.

In an effort to prevent the capacitor voltage from falling significantly below the shut-down threshold, the control logic 580 compares the measured voltage of the power management circuit 525 to a threshold, referred to hereafter as the "delay threshold," before initiating a valve position change. The delay threshold is lower than the regulated voltage but higher than the shut-down voltage. Indeed, the delay threshold is preferably selected such that, if it is exceeded prior to a valve position adjustment, then the power usurped to perform such adjustment will not likely cause the capacitor voltage to fall significantly below the shut-down threshold.

If the measured voltage is below the delay threshold but higher than the shut-down threshold, then the control logic 580 waits before initiating the valve position adjustment and continues monitoring the capacitor's voltage. If an electrical pulse is generated by the generator 334 before the shut-down threshold is reached, then the pulse should charge the power management circuit 525 and, therefore, raise the voltage of the power management circuit 525. If the measured voltage increases above the delay threshold, then the control logic 580 initiates the valve position adjustment. However, if the measured voltage eventually falls below the shut-down threshold, then the control logic 580 initiates an orderly shut-down of the circuitry 540 and, in particular, the microprocessor 555 without performing the valve position adjustment. However, it may be more desirable to ensure that the COS 164 is positioned in a known safe state as the last operation before allowing any valve movements that may cause an interruption to the control circuit. For example, if a door is in a closing function and the control circuitry 540 determines that there is only enough energy for one more COS 164 movement, so instead of moving the COS 164 into the final COS position before reaching full close, the last move may be to put the COS in the ready to open position to ensure correct functioning for the next user of the door.

As described herein, the control unit 110 can be mounted in many orientations with respect to the door closer 90 with a variety of arm mounting options. For example, the control unit 110 can be mounted on top of or on bottom of the door closer 90. Further, the components of the control unit 110 are designed to be operable for multiple orientations of the control unit 110 with respect to the pinion 112. In one embodiment, the control unit 110 is secured to the door closer via screws, which pass through the control unit 110 and into the door closer 90. Whether the control unit 110 is mounted on the top or bottom of the door closer 90, the same side of the control unit 110 abuts the door closer 90 such that the large opening defined in the cover receives the end of the pinion 112. That is, the control unit 110 is rotated 180 degrees when changing the mounting from the top of the door closer 90 to the bottom of the door closer 90 or vice versa. In other embodiments, other techniques and orientations for mounting the control unit 110 are possible.

When the control unit 110 is mounted on one side (e.g., top) of the door closer 90, the pinion 112 may rotate in one direction (e.g., clockwise) relative to the large drive gear 302 when the door is opening, but when the control unit 110 is mounted on the opposite side (e.g., bottom) of the door closer 90, the arm shaft may rotate in the opposite direction (e.g., counter-clockwise) relative to the large drive gear 302. The control unit 110 is operable regardless of whether the pinion 112 rotates clockwise or counter-clockwise when the door is opening.

Once an installer has mounted the door closer assembly 80 for whatever orientation desired, the control logic 580 must be taught the specifics of the relative final angular displacement that the control unit 110 will see during operation. In particular, the control unit 110 must know if the door closer assembly 80 is mounted as a parallel mount, top jamb mount, or normal mount, whether the swing of the door is left-handed or right-handed, and then the corresponding closed position of the door 82 as well as the 90 degree open position. This is because the range of angular displacement of the arm encoder gear 336 will differ for each installation. In addition, installers may choose varying physical locations even within these mounting options. The end result of such a variety of possible installation orientations is that the overall angular displacement of the pinion 112 during door operation will vary such that any set parameters for where threshold data 590 has predetermined a change in COS 164 positioning may not be correct for the expectations of the user.

In one embodiment, a teach button assembly provides a means for an installer to inform the control logic 580 what configuration has been chosen to assist in setting the appropriate threshold data 590 for proper operation. Referring to FIGS. 38 and 42-43B, the teach button assembly depicted includes a teach button 350 and a magnet 352. In some embodiments, the door closer assembly 80 can be initially pre-set as determined by the manufacturer as the most common mode of operation based upon market knowledge. First the installer is instructed to install the door closer assembly 80 as described in installation instructions onto a door. After installation is complete, the installer then energizes the electronics of the control unit 110 by opening the door and closing the door up to three times and then allowing the door to rest at close. Then the installer is instructed to push the teach button 350 a certain number of times which indicates what style of installation the closer is in (i.e., regular, top jamb mount, or parallel mount). In another embodiment, an alternate method of indicating the style would be to use switch settings located on the control unit 110 and accessible to the installer.

Once the style is selected, the installer then opens the door 82 to 90 degrees, where the arm encoder gear 336, magnetic sensor 342 on the PCB 300, and control logic 580 store the values for calibration calculations. The installer is then instructed to release the door 82 such that when it comes to rest at the closed position the arm encoder gear 336, the magnetic sensor which may be a Hall effect sensor 342, and control logic 580 store the values for calibration calculations. Once the door 82 returns to the closed position, the door closer assembly 80 has been taught for its specific installation parameters. Threshold data 590 is updated and will stay constant until the teach button 350 is invoked again, as described above. This operation can be redone as many times as deemed necessary for either a mistake during the installation process, if the door closer assembly is removed and put on another door, or if style is changed for the existing door.

Figure 43A:
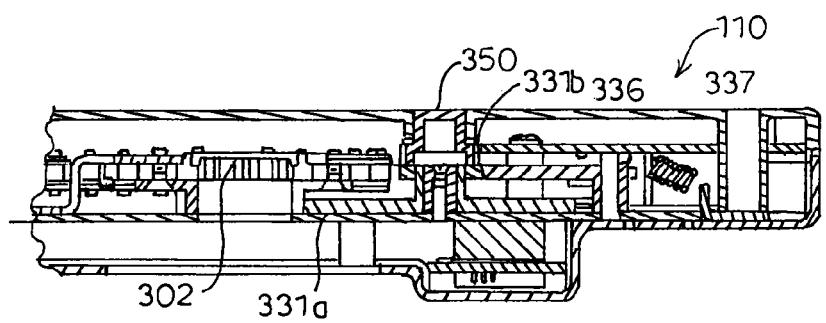
FIG. 43A is a longitudinal cross-section view of the encoder portion of the control unit taken along line 43-43 of FIG. 42 with a teach button in a first position.
Figure 43B:
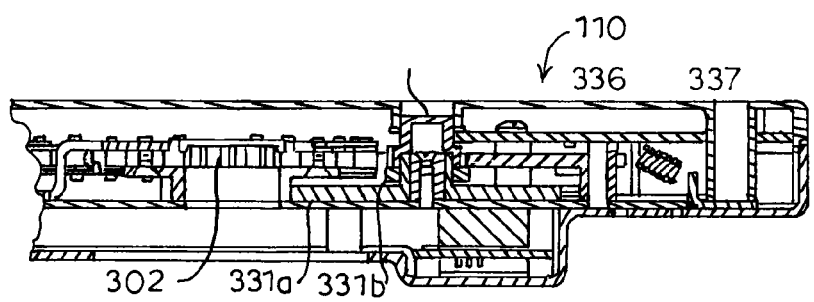
FIG. 43B is a longitudinal cross-section view of the encoder portion of the control unit taken along line 43-43 of FIG. 42 with the teach button in a second position.

The teach button 350 is accessible in an opening in the cover of the control unit 110. When the teach button 350 is pushed, another magnetic sensor 354, such as a Hall effect sensor, on the PCB 300 will recognize that the magnetic field strength from the teach button magnet 352 has deviated and that the teach operation has been invoked. Referring to FIG. 43B, at the point that the teach button 350 is fully depressed, the upper arm encoder gear 331b engages and compresses a spring 344 between the arm encoder gears 331a, 331b and disengages the arm encoder gear 331b from the arm gear 336. This allows the arm gear 336 to spring back to a home position due to a spring 337 affixed to a tab 366, such that the one or more magnets 340 on the arm gear 336 aligns to a zero position relative to the one or more sensors 342 on the PCB 300. When the teach button is released, the spring 344 acts to push the upper encoder gear 331b back into engagement with the arm gear 336, thus fixing all gears to this new known zero state. It should be understood that a known zero state implies that the door is in the closed position, the arm has been preloaded, and power has been generated for the door 82 to recognize the teach operation has been initiated. During the next step of opening the door 82 to 90 degrees, the arm encoder gear 336 rotates as described above. Specifically, the pinion 112, due to door 82 movement, rotates the large drive gear 302. The lower gear of the drive gear 302 engages and rotates the lower arm encoder gear 331a. Rotation of the lower arm encoder gear 331a rotates the upper arm encoder gear 331b. The upper arm encoder gear 331b engages and rotates the arm gear 336, which changes the relative position of the magnet 340 and the sensor 342. The control logic 580 monitors this activity and calibrates the ratiometric readings for both the zero position and the 90 degree position of the door 82, along with physical characteristics of known angular distances for a full sweep of 90 degrees, such that now COS 164 threshold data 590 can be augmented for the specific installation.

Figure 44A:
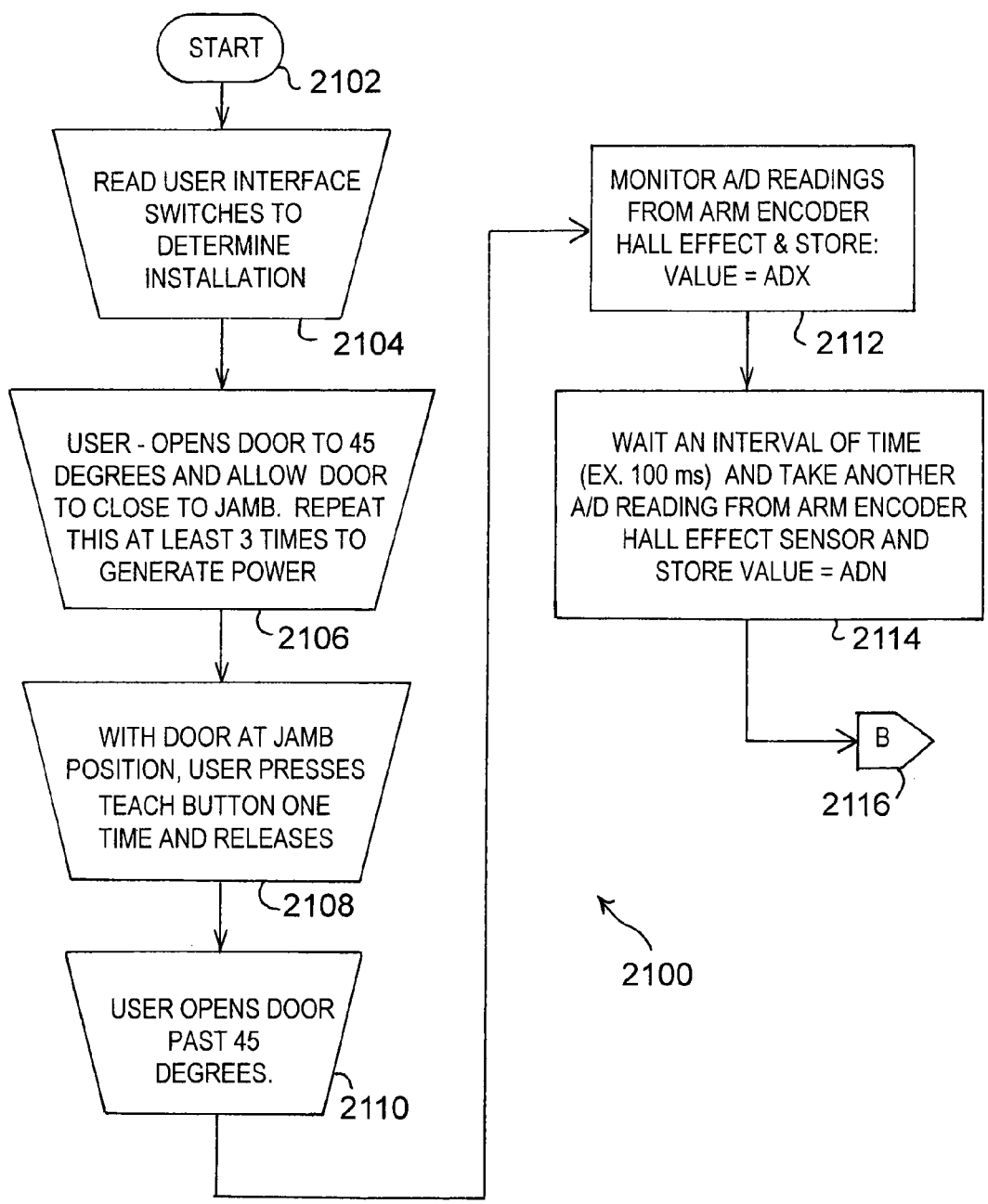
FIG. 44 is a flow diagram of an embodiment of a process for using a teach mode of a door closer, presented as FIGS. 44A, 44B and 44C.
Figure 44B:
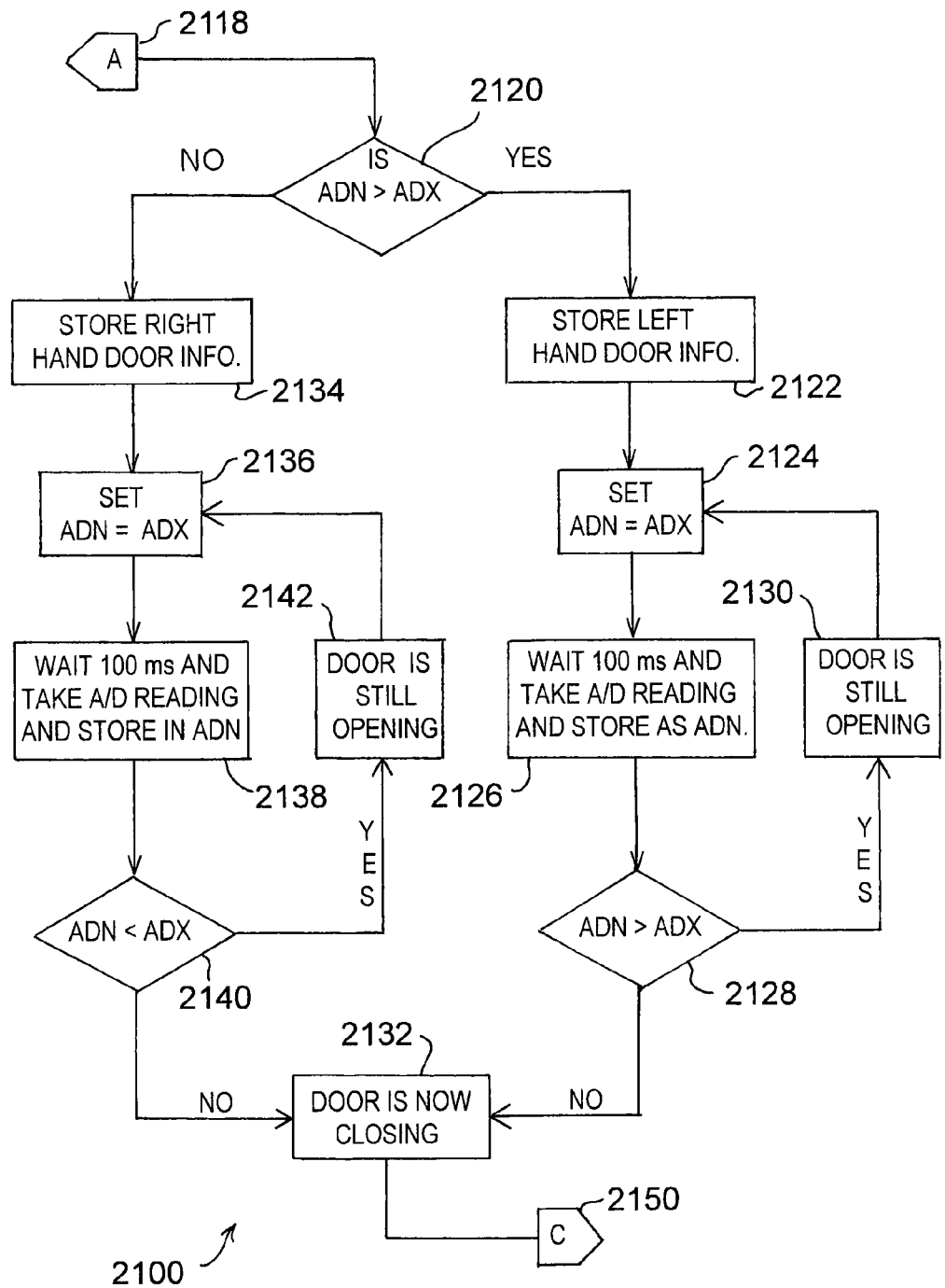
Figure 44C:
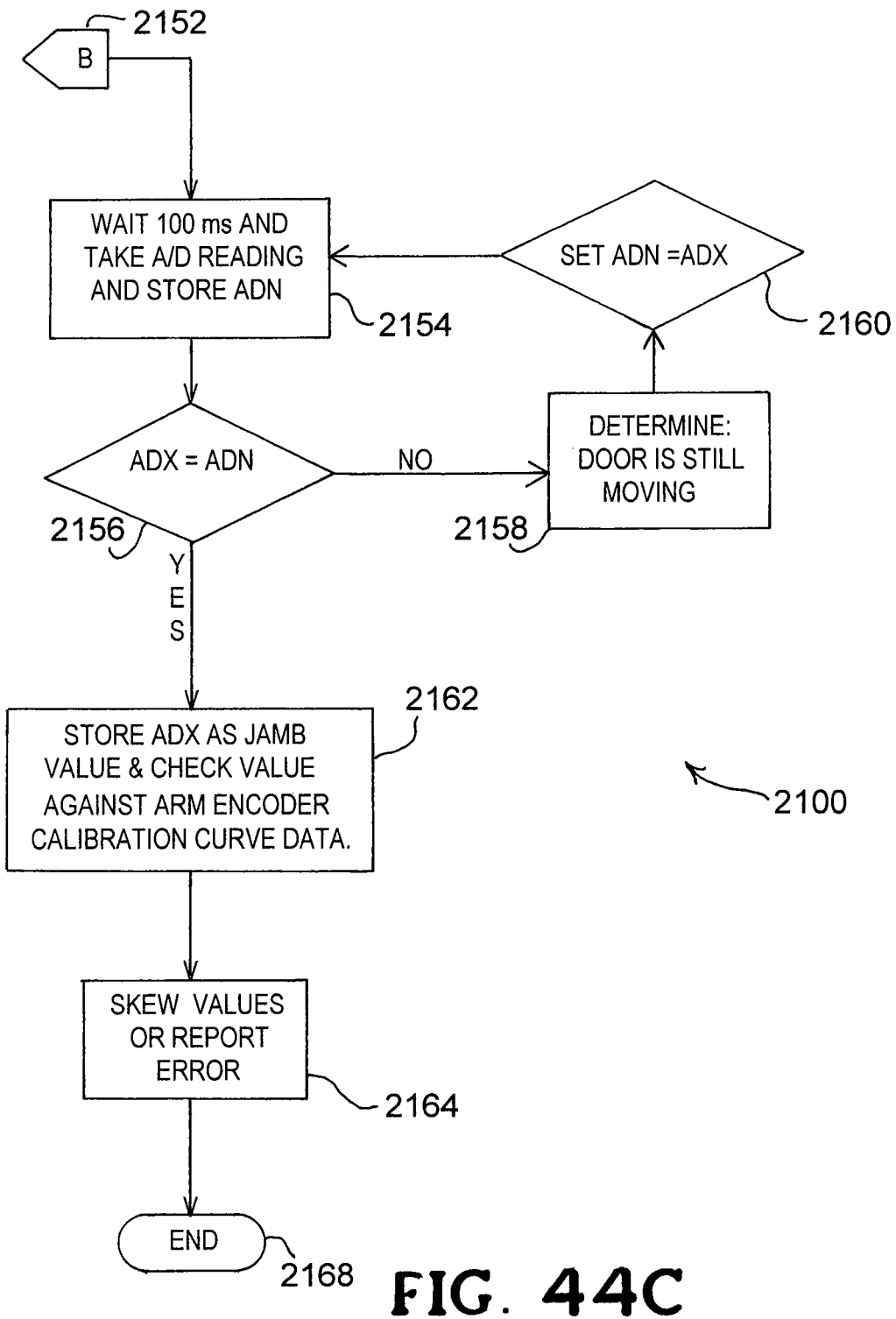

In additional embodiments, the teach mode of a door closer may follow the process illustrated in FIG. 44. FIG. 44 is a flowchart that is presented as FIG. 44A, FIG. 44B, and FIG. 44C for clarity. Like many flowcharts, FIG. 44 illustrates the method or process as a series of process or sub-process blocks. The teach mode process 2100 begins in this embodiment at block 2102. At block 2104, user interface switches are read by the controller to determine the installation configuration. At block 2106 of FIG. 44A, the user opens and closes the door to power the controller. At block 2108, the control circuitry detects that the user has pressed the teach button of the door closer with the door at jamb position. At block 2110, the user opens the door at least past the 45 degree position, in most cases, following instructions supplied with the door closer. The arm gear 336 is monitored at block 2112 and values are stored in memory as variable ADX. Alternately, at some time interval, for example, 100 ms, the arm gear 336 is monitored and a second value is stored in memory as variable ADN at block 2114. Processing then proceeds as indicated by off-page connector 2116, to incoming off page connector 2118 in FIG. 44B.

Continuing with FIG. 44B, a determination is made at block 2120 as to whether ADN is greater than ADX while the door is opening. If so, it is determined that the door must be mounted for left handed opening, and a value indicating this is stored at block 2122. The two variables are set to be equal at block 2124 and at block 2126, the second variable is again updated after a time delay. The variables are compared again at block 2128. If the value of the second variable has increased at decision block 2128, it is determined that the door is still opening at block 2130 and this part of process 2100 repeats. Otherwise, it can be assumed that the door is now closing at block 2132.

Still referring to FIG. 44B, if ADN is not greater than ADX at block 2120, the door must be mounted for right handed operation and a value indicated this type of swing information is stored at block 2134. The two variables are set to be equal at block 2136 and at block 2138, the second variable is again updated after a time delay. The variables are compared again at block 2140. If the value of the second variable has decreased at decision block 2140, the door is still opening at block 2142 and this part of the process 2100 repeats. Otherwise, it can be assumed that the door is now closing at block 2132. Note that the selection and naming of variables, and which one increases based on movement of the door, is arbitrary and will vary depending on the particular hardware and software design of the control unit. Once this portion of the process is completed and the door begins to close, processing moves to FIG. 44C via off page connector 2150.

Turning to FIG. 44C, processing picks up with incoming off page connector 2152, where the value of the variable ADN is again updated and stored at block 2154. At decision block 2156 a determination is made as to whether the two variables are equal. If not, it can be assumed that the door is still moving at block 2158, in which case the variables are set to be equal again at block 2160 and the variable ADN is updated again. Otherwise, it can be assumed that the door has reached the jamb position at block 2162, and the value is stored as the jamb value and checked against a stored calibration curve. If necessary, values can be skewed at block 2164, or an error can be reported if the value makes no sense. Process 2100 ends at block 2168, normally with the controller exiting the teach mode. The processes involved in obtaining calibration data are described below.

Due to mechanical tolerance stack up expectations, after final assembly of the door closer 90 and the drive unit 100, a final calibration capability can also be designed into the control logic 580, such that when motor calibration is invoked via a predefined command, the door closer assembly 80 will determine the ratiometric value seen by hall effect sensors 299a, 299b that designate a COS 164 position for a fully opened valve and a COS position for a fully closed valve.

For example, in this exemplary embodiment the calibration method would start with a fully assembled door closer assembly either on a test bench or installed on a door, interconnected with an interface controller board (factory board) such that commands can be sent to the control unit 110 and the control unit 110 can be monitored and controlled by an external software application. This application can be designed to invoke the motor calibration via a predefined command through any standard serial communication interface. At such a time, the control logic 580 would prompt the user to rotate the closer arm ninety degrees and release, relying on the spring tension of the door closer 90 to try and force the arm 94 of the linkage assembly 92 to the door closed position. It should be noted that the choice of 90 degrees as the amount of movement required for calibration is an example, and that other implementations can use other values as necessary.

The control logic 580 will then send PWM pulses to the motor 244, such that the motor coupler 242 turns the COS 164 coupler 240 and then an eventual rotation of the COS 164 with the intent of finding the fully closed position of the valve. Control logic 580 simultaneously monitors the output data of the arm gear 336 through the hall effect sensor 342 readings of the magnet 340. If the control logic 580 senses movement of the arm encoder gear 336, the control logic 580 will continue to move the COS 164 to a more closed position until it is determined that arm encoder gear 336 has stopped moving. At this point, the reading from the magnetic or Hall effect sensor 299a will be read and stored in the threshold table as the known, valve-closed position for the COS 164. It should be noted that the calibration routine may be designed to move the COS 164 multiple times between the open and closed positions and monitor the effects thereof for further determination of a truly closed position. The control logic 580 can send the COS 164 towards the full open position and monitor both hall effect sensors 299a, 299b in the drive unit 100 for their minimum sensor reading feedback change. The ratiometric readings reduce as the magnet 266 on the motor coupler 242 gets further away from the Hall effect sensors 299a, 299b, and there will be a point that the values will stop changing and therefore signify a ratiometric measurement that will be stored for that sensor for this calibration on a particular closer assembly. In this manner, mechanical variations can be taken into account for the minimum and maximum ranges of the sensors 299a, 299b in the drive unit 100 such that final values can be stored in the threshold data 590. Calibration as described above includes human intervention to move the closer arm. However, calibration can be automated by providing mechanized, computer-controlled apparatus to move the door closer during calibration.

Figure 45:
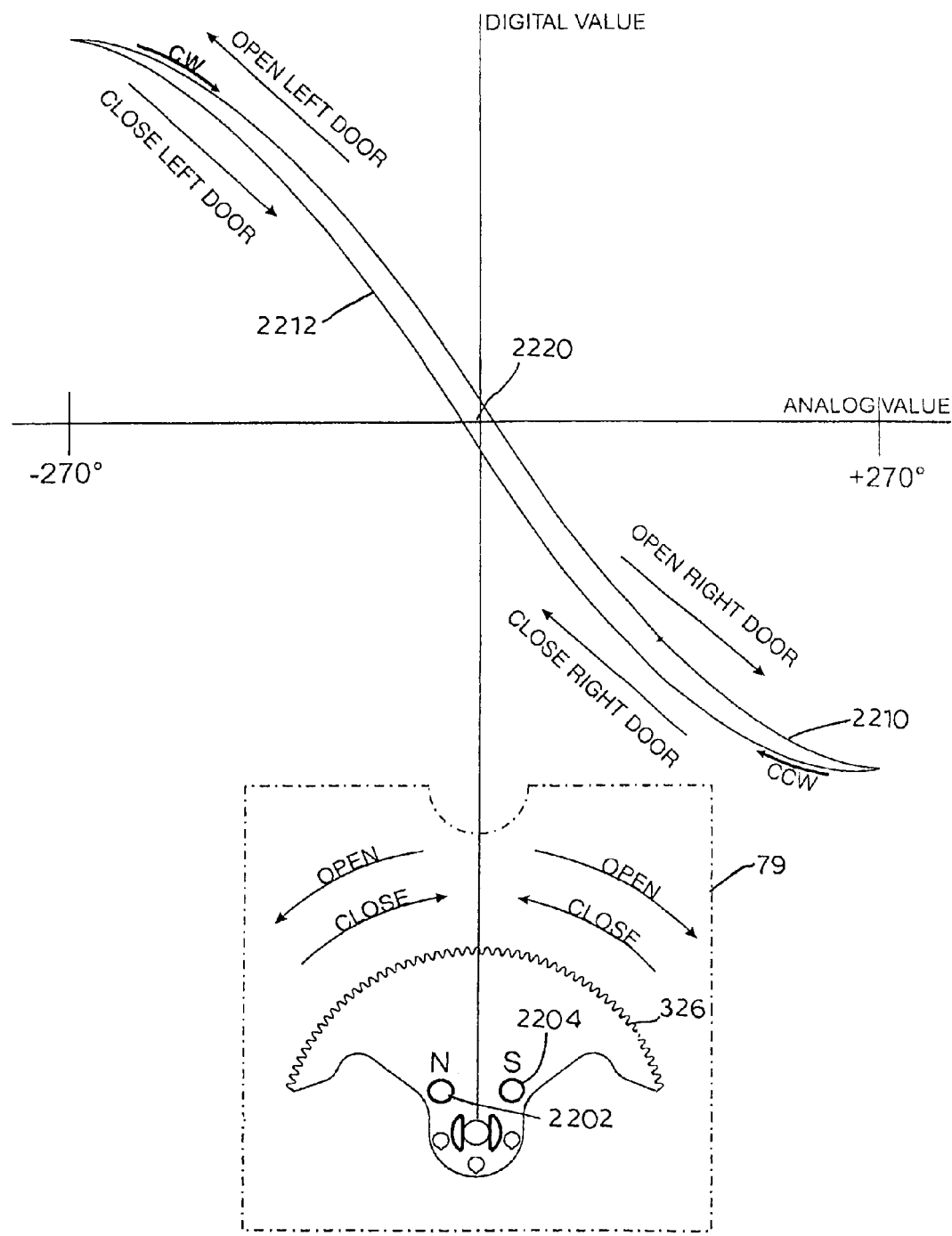
FIG. 45 is a diagram of a calibration curve.

FIG. 45 illustrates how a calibration curve works. Arm positional values for such a curve can be stored in the memory of a controller for use in operations such as the teach mode. In the case of FIG. 45, calibration of the arm gear 336 is shown. The arm gear 336 includes a North magnet 382 and a South magnet 383. These magnets interact with magnetic or Hall effect sensors on the PCB 300. A clockwise calibration curve 2210 and a counter clockwise calibration curve 2212 are shown in the graph, which the virtual jamb position 2220 residing at or near the middle of both curves. For a right hand opening door, the right side of the graph is used, as is the part of the arm gear 336 shown on the right. For a left hand opening door, the left side of the graph is used, as is the part of the arm gear 336 shown on the left. The PCB 300 and the arm gear 336 are shown aligned with the graph for clarity.

It has been determined that when using an electro-mechanical device such as described herein to measure an angular position of a door, that it is necessary to profile both the opening motion and closing motion independently for the door, such that physical door angles can be converted into electrical A/D measurements and stored away in memory on main board in the form of data for curves like those shown in FIG. 45. The reason for this dual profile is to ensure that any mechanical gear tolerance motion deviation when direction of door mount is changed is accounted for. Thus, an arm gear 336 is put through a calibration process as described herein. The calibration curve information stored in memory can then be used in the teach mode previously described so that any tolerance deviations for all mounting options can be accounted for during normal operation.

Figure 46:
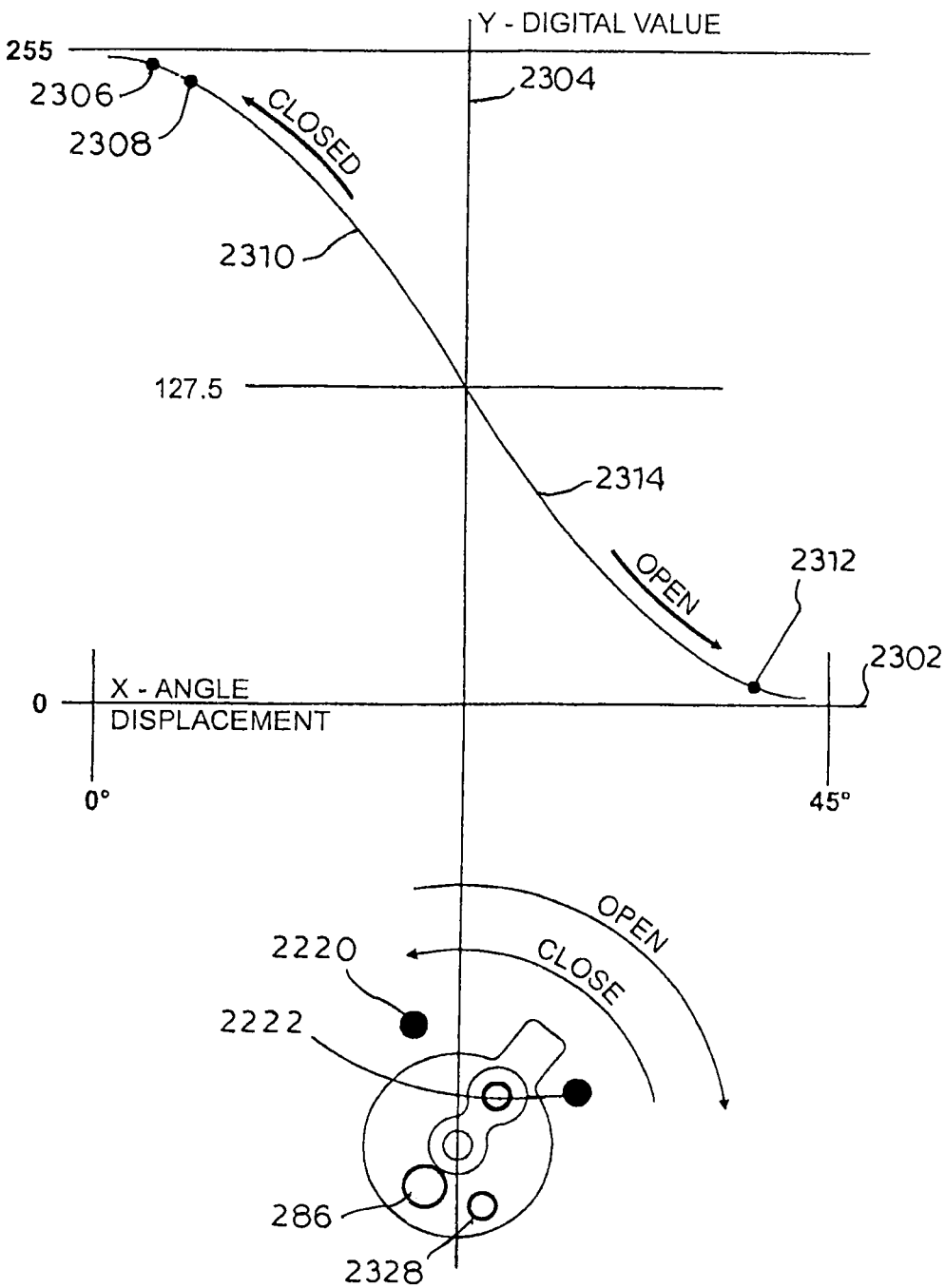
FIG. 46 is a diagram of a motor encoder calibration curve.

FIG. 46 illustrates a motor encoder calibration curve made up of valve positional values in a manner similar to the way the arm gear 336 calibration curve was illustrated above. The graph shows the motor angle displacement on horizontal or x-axis 2302 and the digital value on vertical or y-axis 2304. The graph is superimposed over a schematic view of the motor coupler 242 to illustrate the relationship of the curve to physical position. The digital value of the motor 244 may also be referred to as the number of "clicks" in possible movement of the motor. In this embodiment, the number of clicks can be from zero to 255. A maximum A/D value 2306 and a delayed action A/D value 2308 are shown on closed portion 2310 of the calibration curve. A minimum A/D value 2312 is shown on the open portion 2314 of the calibration curve. It can also be observed that in this embodiment, the curve crosses the y-axis at 127.5 clicks, and the displacement angle range for the motor is from zero to 45 degrees. Referring to the schematic diagram of the motor coupler 242 over which the graph is superimposed, mechanical stop 2220 is effective in the close direction and mechanical stop 2222 is effective in the open direction. The magnet 266 in the drive unit, previously discussed, is also visible, along with addition magnet, 2328.

The motor assembly 244 has its own electro-mechanical tolerance stack up deviation from unit to unit when installed with a particular valve assembly 120 and thus requires a calibration for proper operation. Overall, the calibration procedure is designed to find a minimum A/D value. The A/D reading is a value with respect to the relative position of the magnets on the arm gear 336 to the hall effect sensor on the PCB 300. This minimum value is what the sensor reads when the valve is in a full open position and the maximum A/D value can be used to close the valve completely off. Once the minimum and maximum values have been established, a user can be prompted to position the pinion 112 at a location such that the spring force within the door closer 90 will try to force the pinion 112 back to its original starting point. As this occurs, calibration software will change the COS 164 position towards the maximum A/D value with the expectation that some value prior to the maximum A/D value will indeed stop the pinion 112 from moving back to its original starting point. The value determined becomes the known A/D shutoff value that can be used for delayed action as well as the offset for initial values for sweep and latch speeds. The value is stored in memory for future normal door operation.

FIGS. 47 and 48 describe calibration routines that can be partially or fully automated by software and can be used when a controller 110 is initially fitted to a door closer 90, when a controller 110 is replaced, or when a controller 110 is retrofit to an existing door closer 90.

Figure 47A:
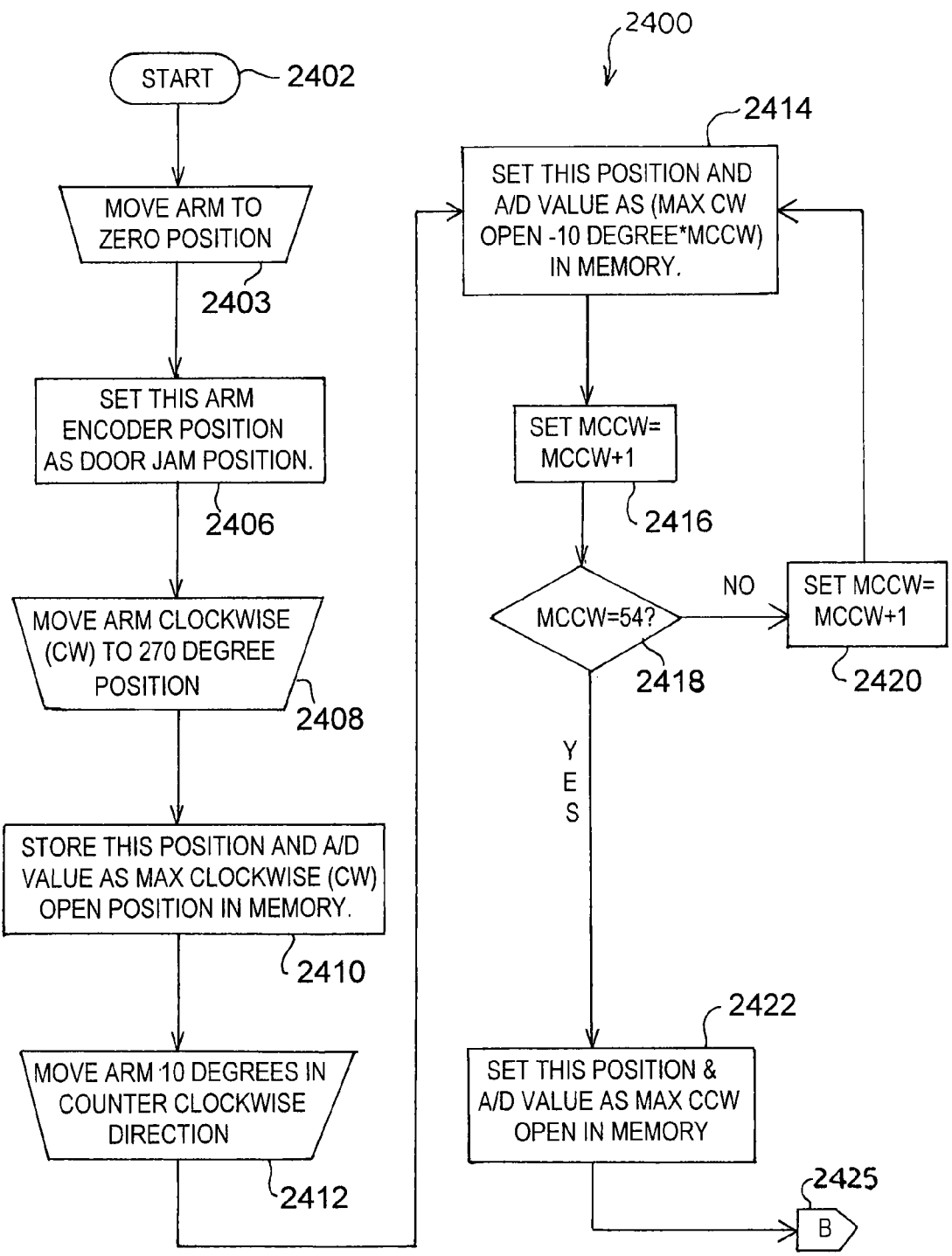
FIG. 47 is a flow diagram of an embodiment of a process for arm encoder calibration, presented as FIGS. 47A and 47B.
Figure 47B:
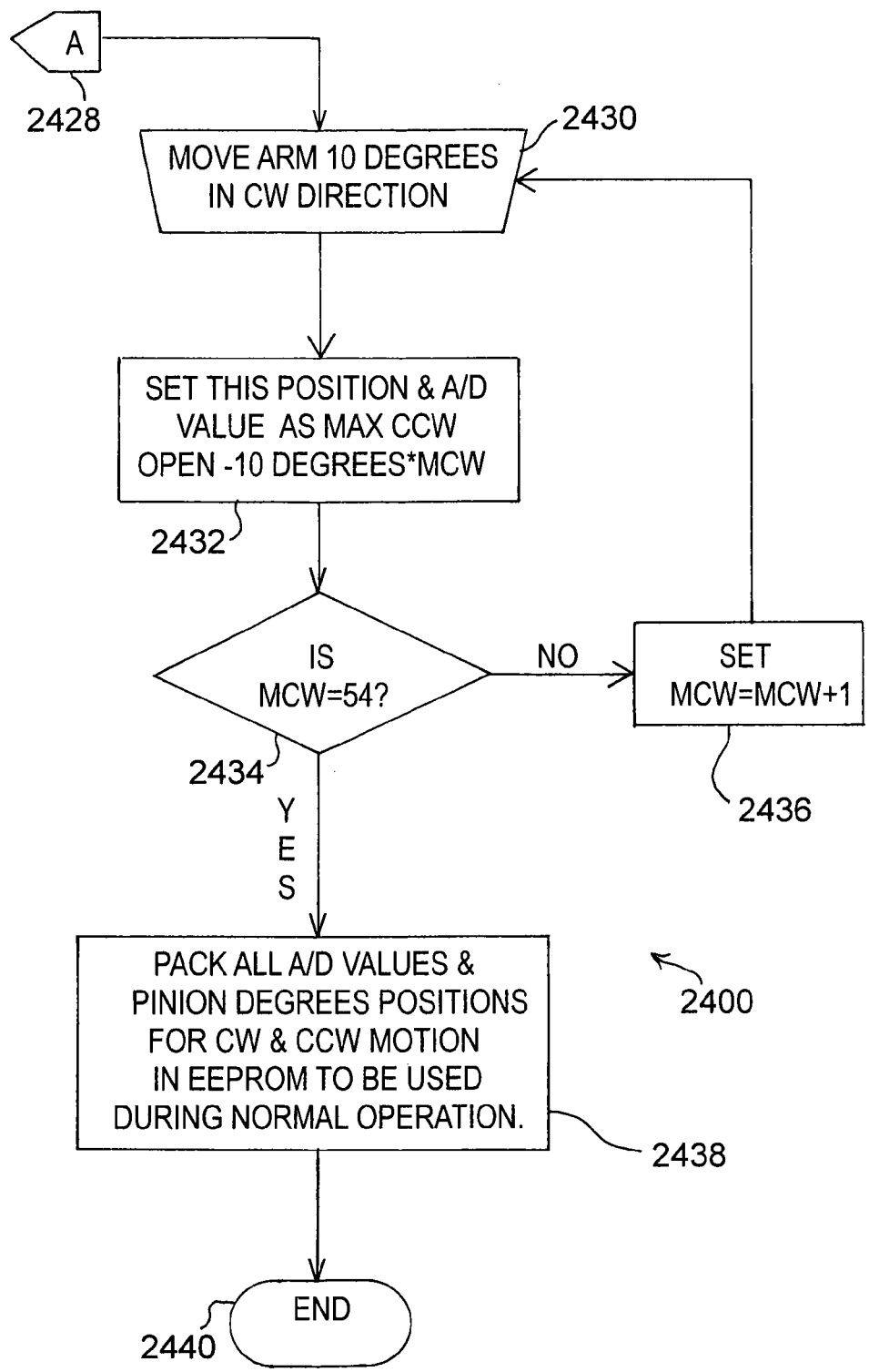

FIG. 47 is a flowchart illustration of the process 2400 for arm gear 336 calibration according to some example embodiments of the invention. Process 2400 is shown partly in FIG. 47A and partly in FIG. 47B for clarity. Process 2400 begins at block 2402 of FIG. 47A. At block 2403, the arm 94 of a door closer 90 being calibrated is moved to the zero position. A user can move the arm 4 manually and then indicate its position through a connected workstation or with a button on the controller 110, for example, the teach button 350. Alternatively, a completely computerized test bed can be used, wherein the arm 94 can be moved using, as an example, a robotic device. At block 2406, the zero position is set as the initial jamb position for the closer. At block 2408, the arm is moved clockwise to the 270 degree position. Again, this movement, as all movements of the arm 94 described with respect to FIG. 47, can be either by manual or automated means. This position is then stored at block 2410 as the maximum clockwise, or open position. The arm 94 is then moved ten degrees counter clockwise at block 2412.

Still referring to FIG. 47A, the current position at block 2414 is set with the positional value from an A/D converter in the encoder as the maximum clockwise value minus the result of ten degrees times the maximum counter clockwise value, and this positional value is stored in memory. The value in memory is incremented the known amount that equates to a change in encoder output value of one unit at block 2416, and a determination is made at block 2418 as to whether the known maximum for the encoder has been reached. In this particular example, the maximum value is 54. If the value has not been reached, the value is incremented again at block 2420 and this part of the process 2400 repeats. Otherwise, the current position is set at the maximum counterclockwise position and stored in memory at block 2422, and processing proceeds to FIG. 47B via off-page connector 2425.

Turning to FIG. 47B, process 2400 continues from incoming off-page connector 2428. The previous process is essentially repeated for the clockwise direction with the movement of the arm by ten degrees at block 2430, resetting the value at block 2432, and determining at block 2434 if the maximum clockwise value for the encoder A/D converter has been reached. If not, at block 2436 this part of the process 2400 repeats. Otherwise, all A/D values and corresponding positions for counter-clockwise and clockwise rotation of the arm 94, or the pinion 112 that is coupled to the arm 94, are packed into memory at block 2438, that is, stored in the form of a table which effectively represents the calibration curve. Process 2400 then ends at block 2440.

Figure 48A:
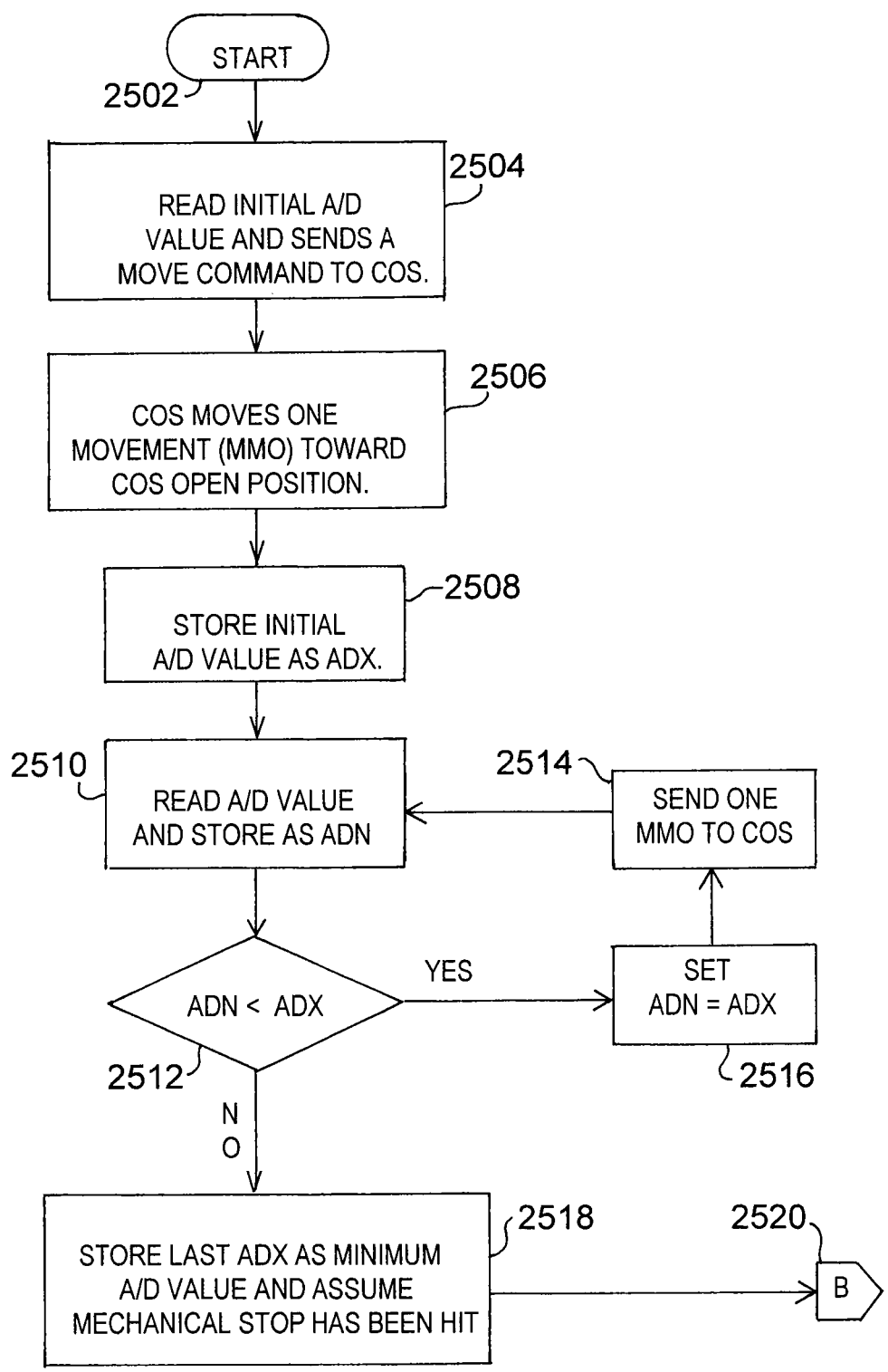
FIG. 48 is a flow diagram of an embodiment of a process for calibration of a valve encoder with respect to valve position, presented as FIGS. 48A, 48B and 48C.
Figure 48B:
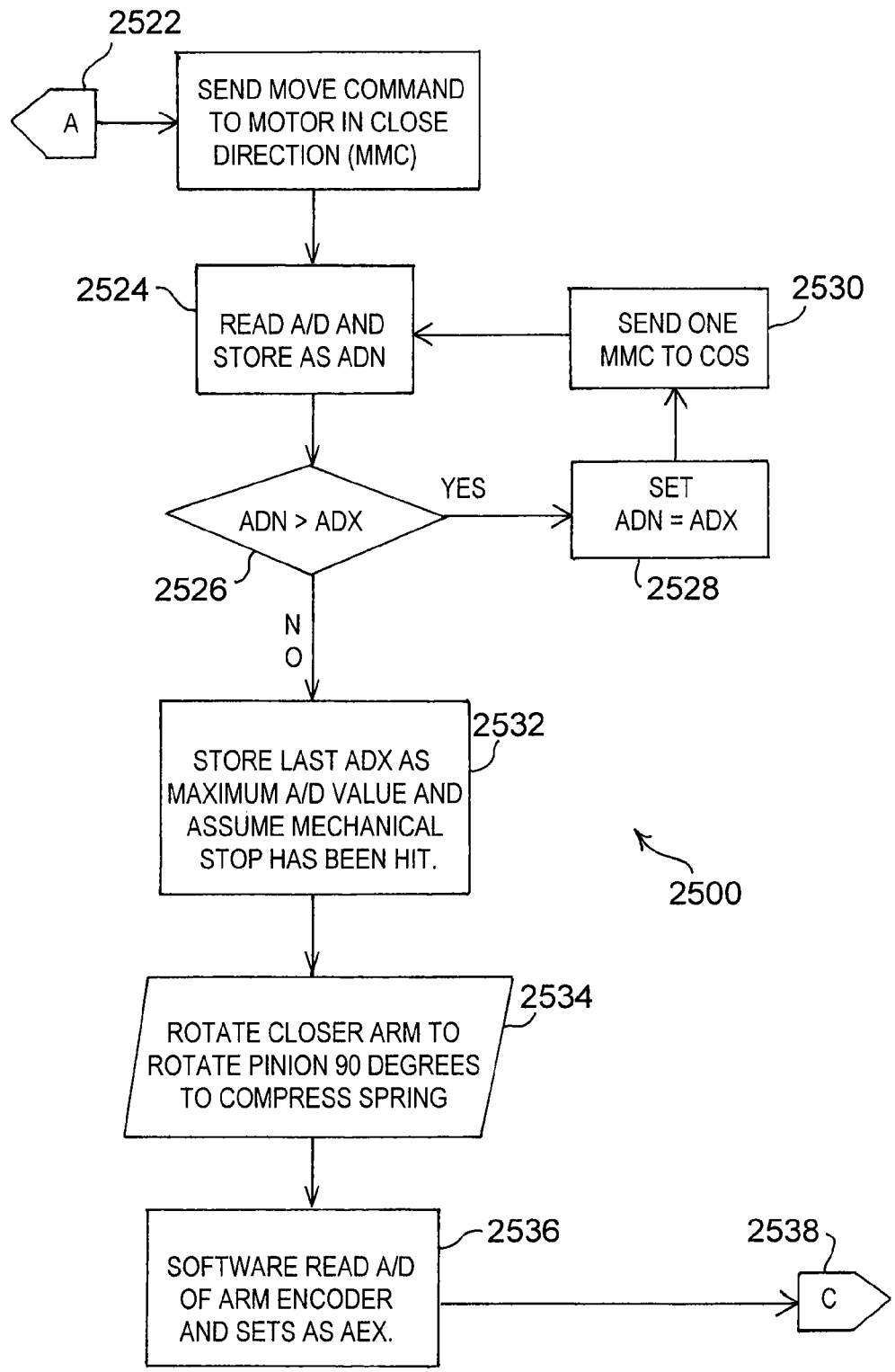
Figure 48C:
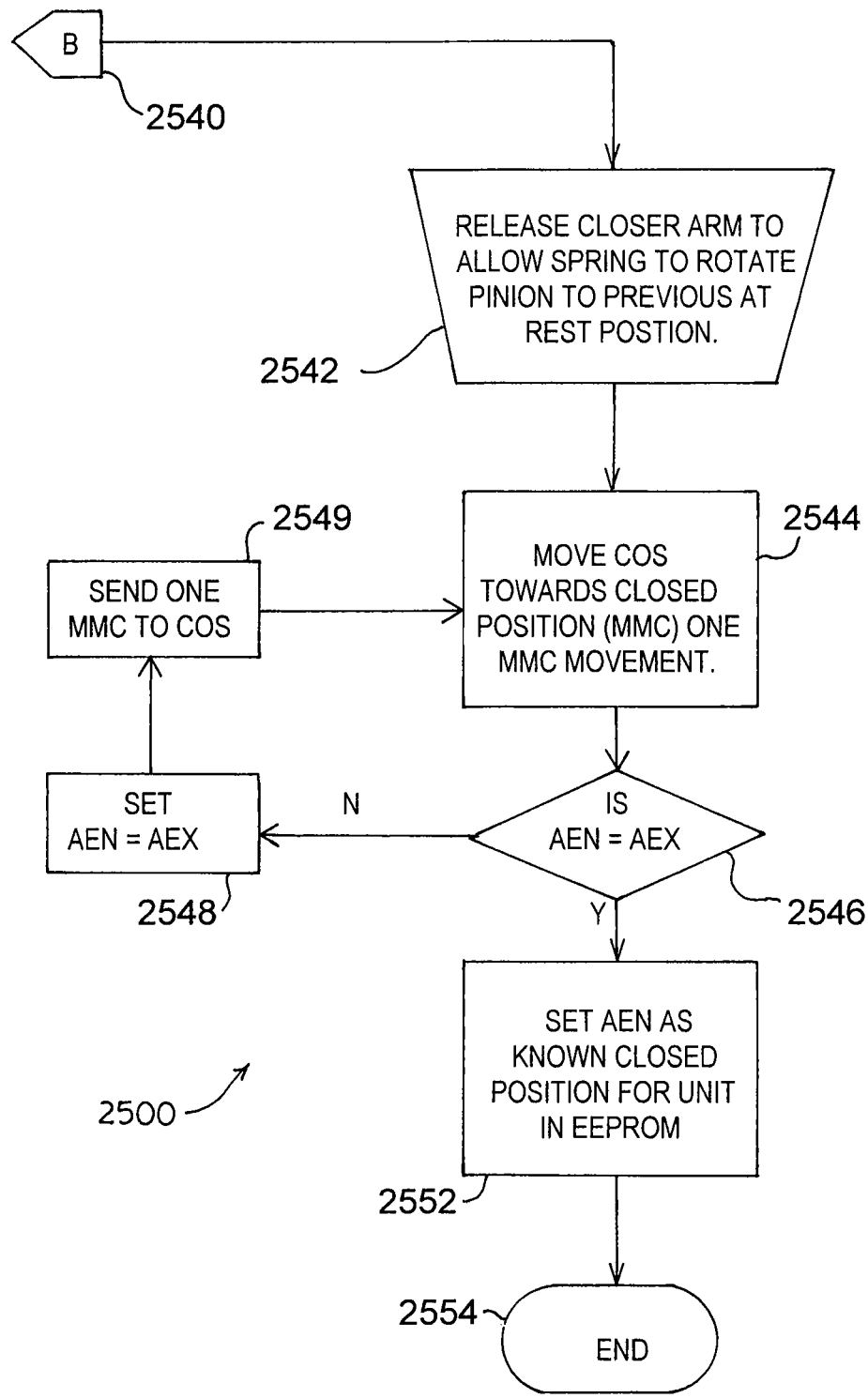

FIG. 48 is a flowchart illustrating a process 2500 for accomplishing calibration with respect to valve position. This process can be accomplished in parallel or in series with the arm calibration, and can be controlled by computer program code residing in the control unit 110 or elsewhere. In this example embodiment, valve position is recognized by reading the position of the COS 164, and the valve is moved by moving the COS 164. FIG. 48 is presented as FIGS. 48A, 48B and 48C for clarity. Process 2500 begins at block 2502. At block 2504, the initial A/D value is read from the valve position (COS 164) encoder and the COS 164 is commanded to move one increment or one "click." The COS 164 moves one click towards the full open position at block 2506. The initial value read above, ADX, is stored at block 2508, and the new value, ADN, is stored at block 2510. As long as the original value stays less than the new value at block 2512, the values are equalized and the COS 164 is moved one click and the new value stored at blocks 2514 and 2516, respectively. Otherwise, the last value is stored as the minimum positional value from the A/D converter in the encoder at block 2518, and the process continues to FIG. 48B via off-page connector 2520.

Turning to FIG. 48B, the process 2500 picks up from incoming off-page connector 2522. The COS 164 is moved by the motor one click towards the closed position at block 2523, and a similar process is repeated as the valve moves towards the closed position, with a check for movement by comparing the two values at block 2526, a setting of the two values as equal at block 2528, and a movement of the COS 164 by one click at block 2530. Once the two values are equal, it can be assumed a mechanical stop has been hit at block 2532, and the last positional value is stored in EEPROM memory. At block 2534, the arm 94 is rotated, either manually or under computer control, to 90 degrees to compress the spring 118 of the door closer 90. The valve positional value from the encoder is read at block 2536, and the process 2500 proceeds to FIG. 48C via off-page connector 2538.

Turning to FIG. 48C, the process 2500 picks up at incoming off-page connector 2540. The arm is released at block 2542. The COS 164 is moved one click towards the closed position at block 2544. Stored positional values, in this case, AEN and AEX, are again checked at block 2546, in this case, to see if the values are equal. If not, they are set to be equal at block 2548, and the COS 164 is incremented at block 2549 and this part of the process repeats. Once they are equal, the current positional value is set as the value for the closed position of the valve at block 2552, and this part of the calibration process 2500 ends at block 2554.

Calibration as described above can be used to adjust a control unit for a particular closer. However, the valve position can be adjusted to maintain appropriate closing forces as conditions vary in the field, or based on installation. These variations can even result from temperature changes or normal wear and tear. Set points of the valve can be dynamically changed while a closer is installed to account for these variations, thus obviating the need to manually adjust a closer at regular intervals. This feature may be referred to as "dynamically adjustable valve set-points."

In addition, the latch region can be dynamically adjusted by changing the angle at which the latch region is encountered. In some circumstances, the default parameters for the final COS 164 position for close mode will not allow enough momentum for complete closure of a door 82. Under this condition, and, in this example embodiment, after eight consecutive occurrences, the control logic 580 will then adjust the encoder angle that it normally sets for the final angle of close, to occur earlier in the cycle. The control logic 580 is preprogrammed to recognize occurrences of non-closure violations and adjust accordingly. This exemplary embodiment currently uses three occurrences as the trigger point for adjustment to occur and then monitors for success. If problem persists, the adjustment will continue until adjustment reaches a predefined limit of adjustment set by the factory. This feature may be referred to a "dynamically adjustable latch position" or alternatively as "latch boost."

FIG. 49 is a flowchart that illustrates the operational method of a controller according to at least some embodiments of the present invention. Again, FIG. 49 illustrates the method or process as a series of process or sub-process blocks. The process 2600 of FIG. 49 is illustrated in six parts for clarity. The six pages of FIG. 49 on which the six parts of the flowchart are shown are designated as FIGS. 49A, 49B, 49C, 49D, 49E and 49F. Various portions of the flowchart are illustrated as connected via off-page connectors, as is known in the art, with each pair of connectors being designated with a letter of the alphabet.

The process 2600 of FIG. 49 begins at block 2602. At block 2604, a determination is made as to whether there is sufficient power to move the motor 244 that controls the valve. If not, the controller simply waits. If so, the controller, at block 2606, reads the input switches (discussed below) to determine the settings of the door closer 90, and reads the ambient temperature from an on-board temperature sensor. A determination is made at block 2610 as to whether the door 82 is opening or closing, based on readings of the hall effect sensors that have been previously discussed above. If the door is opening, the control unit sets the valve to a "safe close" position at block 2612, and the door is monitored at block 2614 to determine if the door reaches the set back check (BC) position. The back check position is where the door 82 begins to require the most force to open. In this example, the back check position is 65 degrees. If the door does not reach the back check position, it will begin to close at block 2616, with the same effect the logic as if the door was closing at determination block 2610. If the door does reach the back check position, processing continues via the off-page connector designated "A" to FIG. 49D, described in more detail below.

Figure 49A:
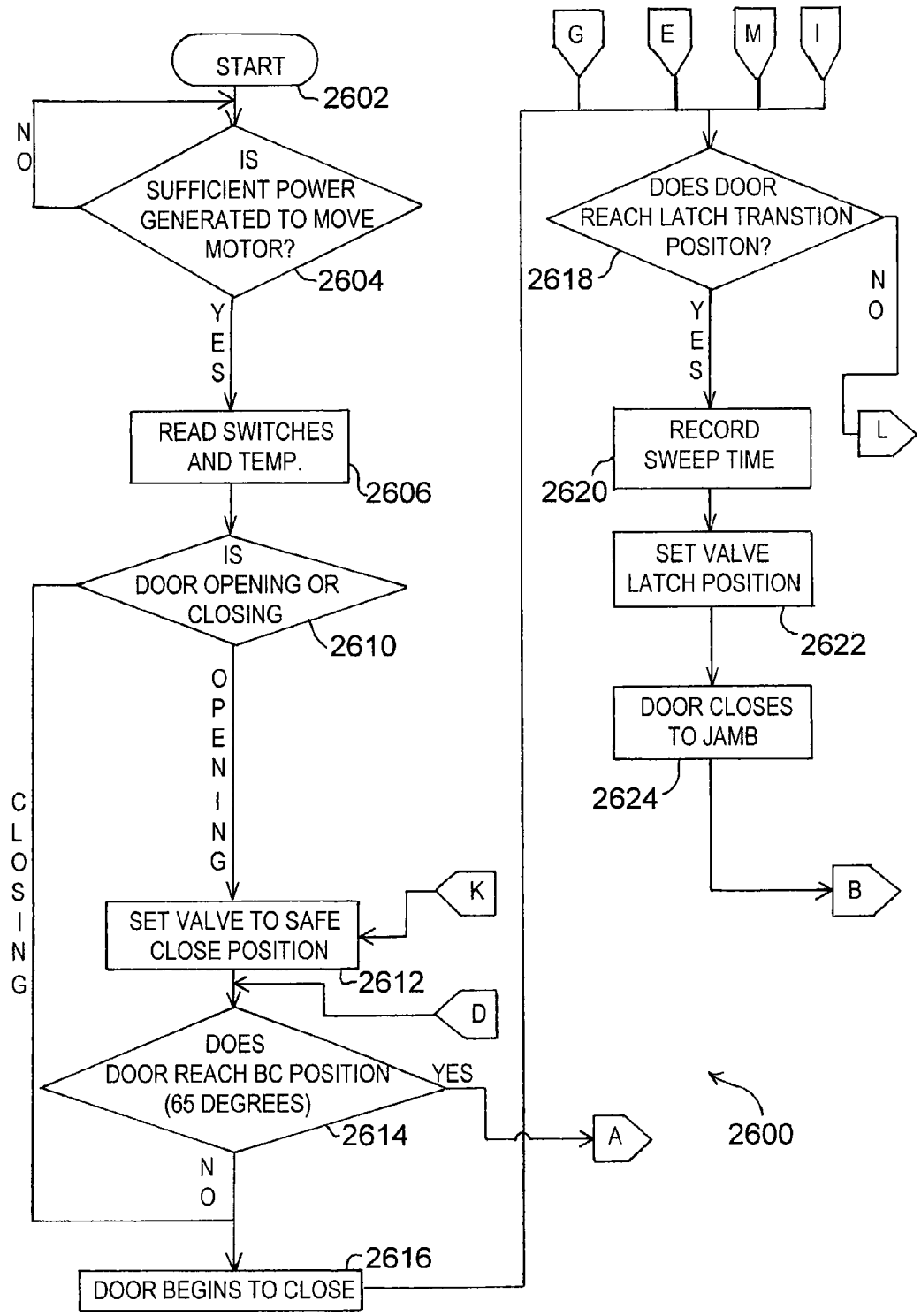
FIG. 49 is a flow diagram of an embodiment of a process for operating a controller, presented as FIGS. 49A, 49B, 49C, 49D', 49D", 49E', 49E", 49F' and 49F".

Continuing with FIG. 49 and referring to FIG. 49A, when the door is closing it is monitored to determine at block 2618 whether it reaches the latch position. The latch position is the point in the swing or movement of a door where it is close to being closed, and the force is reduced, both so that the door is easier to open at first, and so that it closes with less force and is less likely to damage the frame, injure a person who might be in the doorway, and the like. By industry convention, a door closer is typically designed so that the latch position is when the outward edge of the door is approximately 12 inches from the jamb. If the door 82 does not reach latch position when closing, processing proceeds via the off-page connector designated "L" to FIG. 49C, to be discussed below. If the door 82 does reach the latch position, the sweep time is recorded in memory at block 2620. The sweep time is the time it takes for the door to move from the fully open position to the latch position. The controller sets the valve to the latch position at block 2622 and the door 82 closes towards the jamb at block 2624. Processing then moves to FIG. 49B via the off-page connector designated "B".

Figure 49B:
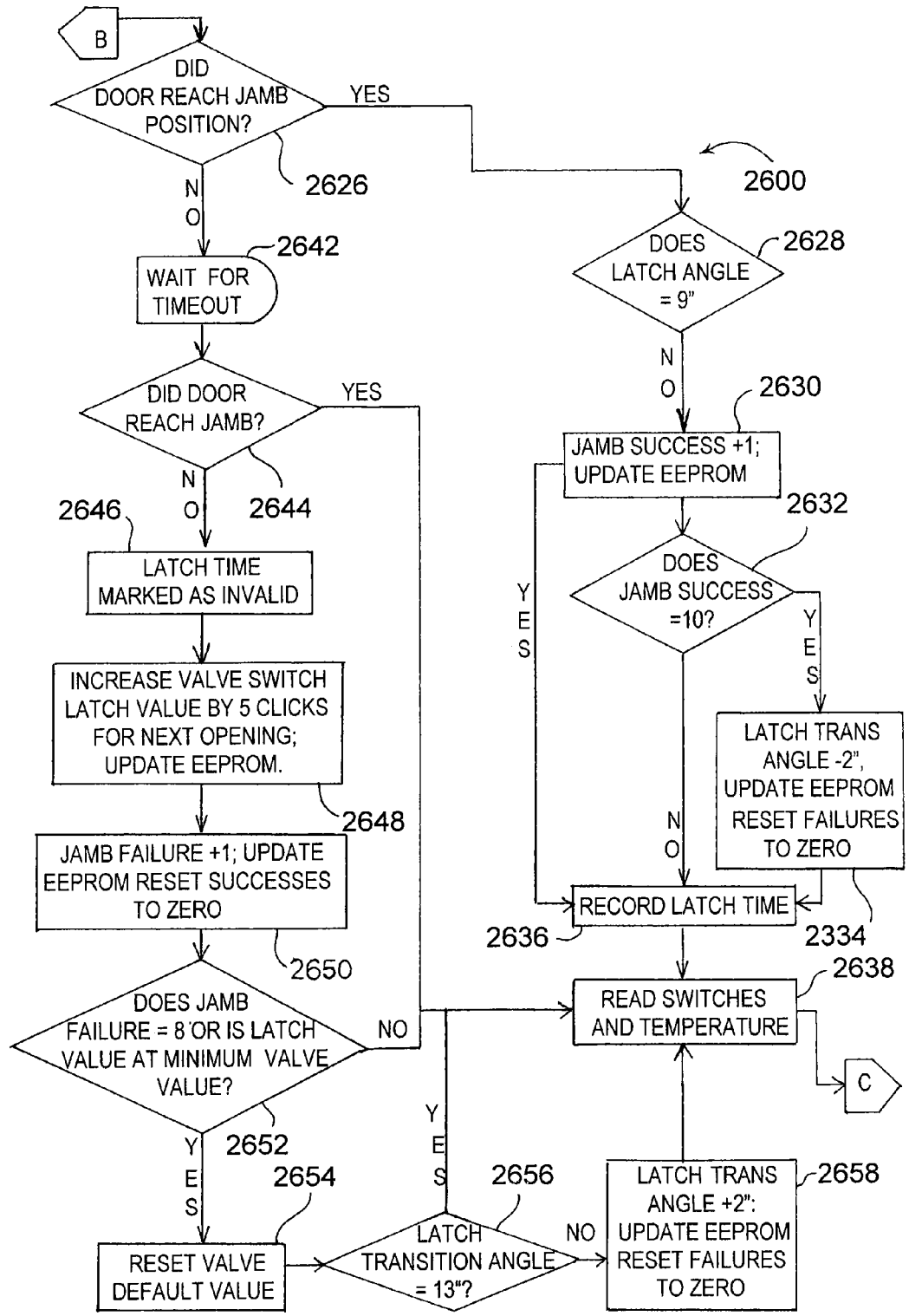

FIG. 49B processing starts with a determination at block 2626 as to whether the door actually reached the jamb, that is, whether the door closed the whole way. As will be appreciated from the discussion below, this determination is being made before the expiration of a time-out timer. If so, a determination is made at block 2628 as to whether the latch angle is such that the door reached the latch region when it was nine inches away from the jamb. In this embodiment, nine inches is considered the smallest acceptable latch region. Despite the fact that the latch region is specified as distance of the edge of the door from the jamb, this distance may still sometimes be referred to informally as the "latch angle." If not, a counter stored in the EEPROM within the control unit is incremented by one at block 2630. This counter keeps track of how many times the door has closed successfully. At block 2632, a determination is made as to whether the door has successfully reached the jamb 10 times with the valve setting for where the latch region begins. The number of successful closes serves as a stored jamb success threshold. If so, the latch angle is adjusted to subtract two inches from the latch distance at block 2634. In either case the latch time, that is, the time required for the door to swing from the latch angle to jamb, is recorded at block 2636. At block 2638, any input switches and temperature are read by the control unit, and processing proceeds to FIG. 49F via the connector designated as "C" in FIG. 49B. The switches, described n more detail below, are set by a user and may signal the control unit 110, for example, what type of installation the closer is in, whether delayed action is desired, where the back check region should be, and the like. Note that the control unit can take temperature into account in setting the valve to cause the behavior indicated by the switches.

Staying with FIG. 49B, and returning to block 2626, if the door did not reach the jamb at block 2626, a timer runs at block 2642. Once the timer has timed out, a determination is made at block 2644 as to whether the door is at the jamb. If so, processing again proceeds to block 2638. If the door has not reached jamb at all, the latch time is invalidated at block 2646. At block 2648, the valve setting for the current input switch position is changed in this example embodiment by five clicks to increase latch force, where a "click" is the minimum increment in which the control unit 110 is capable of adjusting the valve. The EEPROM is also updated. In this example embodiment, an EEPROM in the controller stores latch region parameters. Other types of memory and other devices can also be used in addition to or instead of an EEPROM. At block 2650, the jamb failure counter stored in the EEPROM is incremented by one, and the success counter is set to zero. At block 2652 a determination is made as to whether eight jamb failures have been recorded in memory or the latch is at the minimum acceptable value. The number of jamb failures in this case serves as a stored jamb failure threshold. In either case, the default valve set point is changed to the current set point at block 2654. A determination is made at block 2656 as to whether the latch transition angle is such that the distance of the edge of the door from the jamb is 13 inches. If so, the switches and temperature are read at block 2638 and processing proceeds via the off-page connector designated "C". Otherwise, the latch angle is adjusted to add two inches to the distance of the door from the jamb where the latch region begins at block 2658, prior to proceeding to block 2638.

Reviewing FIG. 49B, this portion of the operational flowchart for the control unit 110 of embodiments of the present invention illustrates the latch boost feature previously referred to. Latch region parameters include, but may not be limited to, the latch region distance and the force on the door 82 in the latch region. If the door 82 is failing to close, the valve position for the latch region of the door can be adjusted to alter the force on the door 82, and the beginning of the latch region can also be adjusted up or down by changing when the valve moves to the appropriate set point for the latch region of the door. The force on the door 82 in the latch region can serve as a first setting for the latch region from among the latch region parameters. The latch region definition, by door angle, or by distance of the edge of the door 82 from the jamb, can serve as a second setting from the latch region parameters. These settings can be reversed or otherwise occur at different points in the operational process of the controller, and either one or both can be based on a failure count or a success count. The adjustments to these latch region parameters can be made dynamically and automatically, based on recorded successes or failures of the door closing to the jamb. Thus, as environmental conditions change, or mechanical resistance of the door 82 or door closer 90 change with wear, the door closer 90 self-adjusts these latch region parameters to maintain appropriate closing behavior for the door 82.

Figure 49C:
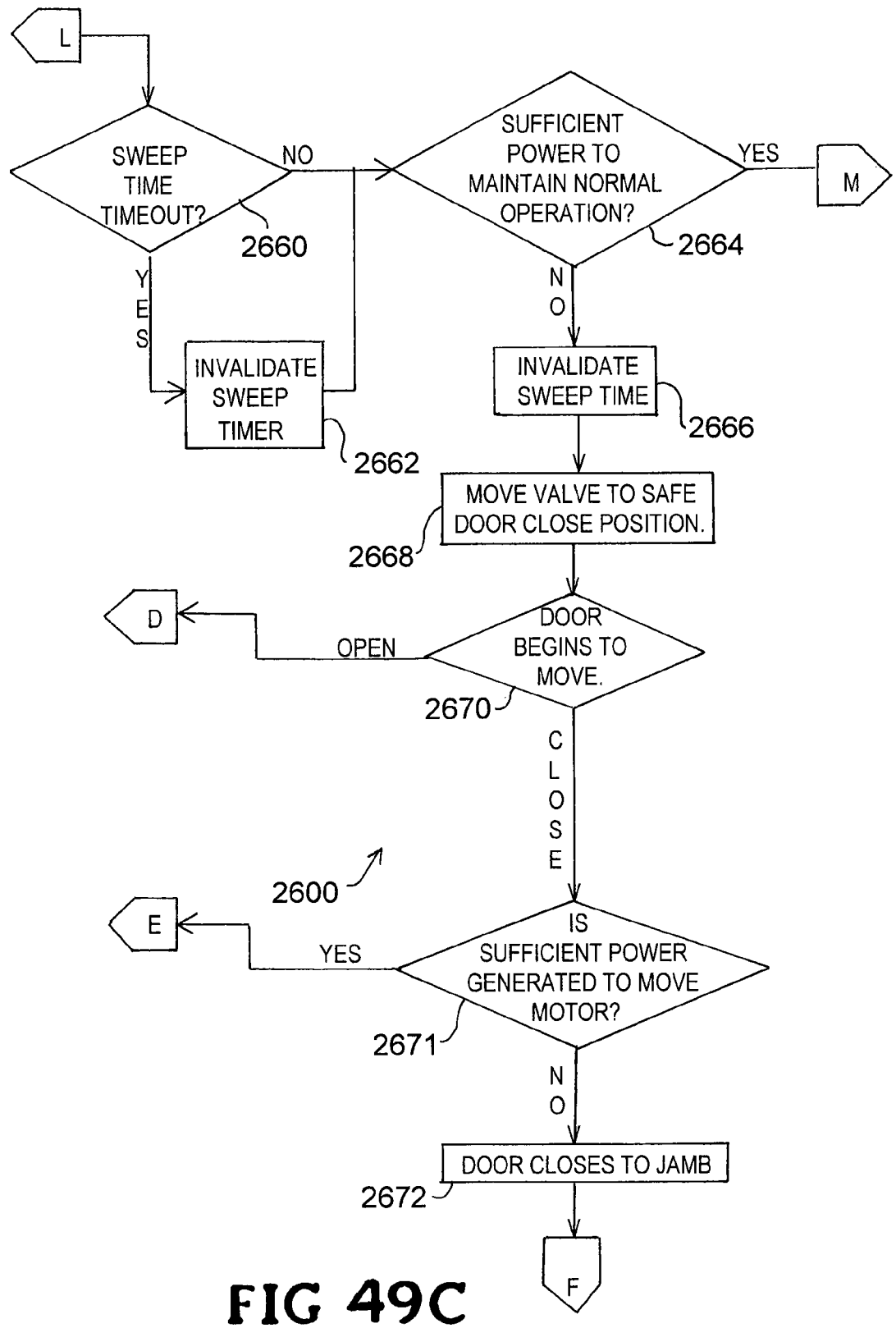

Turning to FIG. 49C, processing picks up at the off-page connector designated "L" from FIG. 49A, where the door does not reach the latch region. At this point, the control unit programmatically presumes that the door is being held or is otherwise being prevented from closing normally. At block 2660, if a timer that checks for the maximum acceptable sweep time times out, that maximum acceptable sweep time is invalidated at block 2662. In either case, at block 2664, the controller 110 begins processing to determine how to handle the fact that power is not being generated since the door 82 is not moving. As long as there is sufficient power to operate the control unit, processing continues via the connector designated "M" to FIG. 49A where sweep time is monitored. Once there is not enough power to run the controller beyond a single move of the COS 164, the controller invalidates the current sweep time measurement at block 2666 and moves the valve to a safe close position at block 2668 to ensure the door closes with a small enough force so as not to cause injury or damage, regardless of current conditions. If the door begins to move again a determination is made at block 2670 as to whether it is opening or closing. If the door is opening, processing returns via the connector designated "D" to FIG. 49A, where the controller determines whether the door reaches the back check region. If the door is closing, a determination is again made at block 2671 as to whether there is enough power to begin to move the motor controlling the valve again. If not, the door safely closes at block 2672. Otherwise, processing returns to FIG. 49A at the connector designated "E" where the controller monitors the sweep and determines when/if the door reaches the latch position.

Figure 49D:
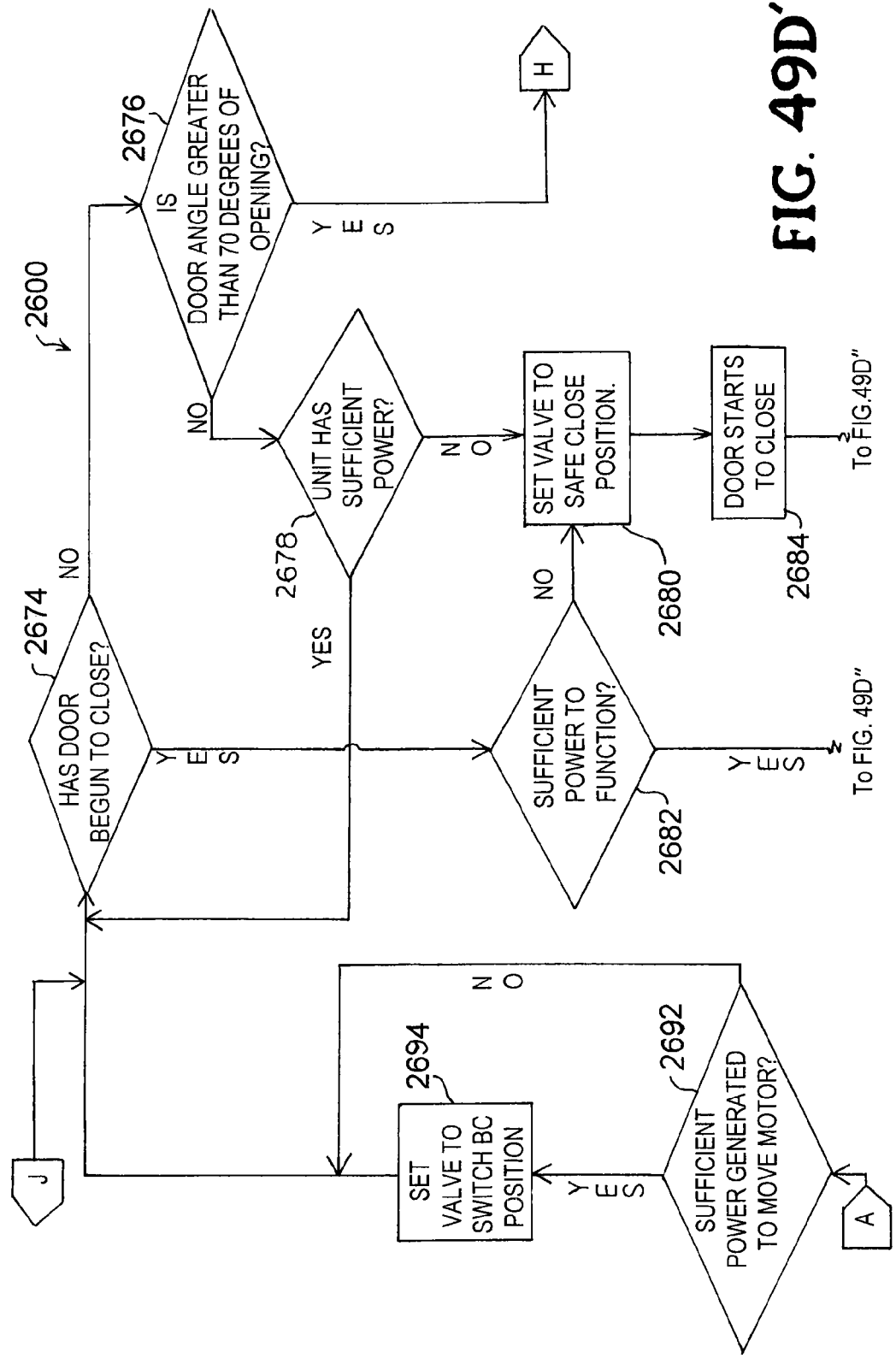

Process 2600 in FIG. 49D picks up with the connector designated "J" which leads from FIG. 49E, described in more detail below. FIG. 49D shows the part of the process that takes place when a closing door begins to open again, AND when the door closer is installed in a parallel mount configuration. As is known in the door closer art, door closers can be installed in different configurations. The configuration known as the "parallel mount" configuration refers to the configuration where the door closer is installed on the push side of a door. In this case, the door closer arm 94 rests parallel to the door when the door is closed.

Still referring to FIG. 49D, at block 2674, a determination is made as to whether the door has begun to close. If not, a determination is made at block 2676 as to whether the door angle is greater than seventy degrees. If so, processing proceeds back to FIG. 49E via the connector designated "H". Otherwise, a determination is again made at block 2678 as to whether there is sufficient power to continue to operate the control unit 110. If so, the control unit 110 continues to programmatically monitor for the door 82 beginning to close. If there is insufficient power, as before, the valve is moved to a safe close position at block 2680. If the door actually begins to close at block 2674, a determination is also made as to whether there is sufficient power to run the control unit at block 2682, and if not, again, the valve is moved to the safe close position at block 2680. If the valve in the door closer 90 is in the safe close position and the door starts to close at block 2684, the power status of the control unit 110 continues to be monitored at block 2686. In either case, if there is sufficient power to run the control unit 110, the temperature and input switch positions are checked at block 2688, and the valve is set to the close position indicated by the input switches and the temperature at block 2690, and processing returns to FIG. 49A via the connector designated "G".

Staying with FIG. 49D, processing can pick up at the connector designated "A" from FIG. 49A, where the door reaches the back check region, such as at an angle of 65 degrees. If there is sufficient power to move the valve at block 2692, the valve is set for the back check region at block 2694 as indicated by the appropriate input switch. Otherwise, processing proceeds to block 2674. It cannot be overemphasized that the positions of input switches, as well as the temperature, can change in the field, while the door closer 90 is installed, and the control unit 110 can adapt to set the single rotary valve to an appropriate position for the various operating regions of the door with a door closer 90 according to an embodiment of the invention. Thus, multiple, manually adjusted valves need not be used. Various door closer parameters can be taken into account, and changes in those parameters made in the field can be taken into account. As an example, door closer parameters include where the back check region begins, whether delayed action is selected and the time period for delayed action desired, and installation configuration. While not user configurable in the field in the exemplary embodiments described herein, latch times and regions, forces, sweep times, and the like may also be considered door closer parameters.

Figure 49E:
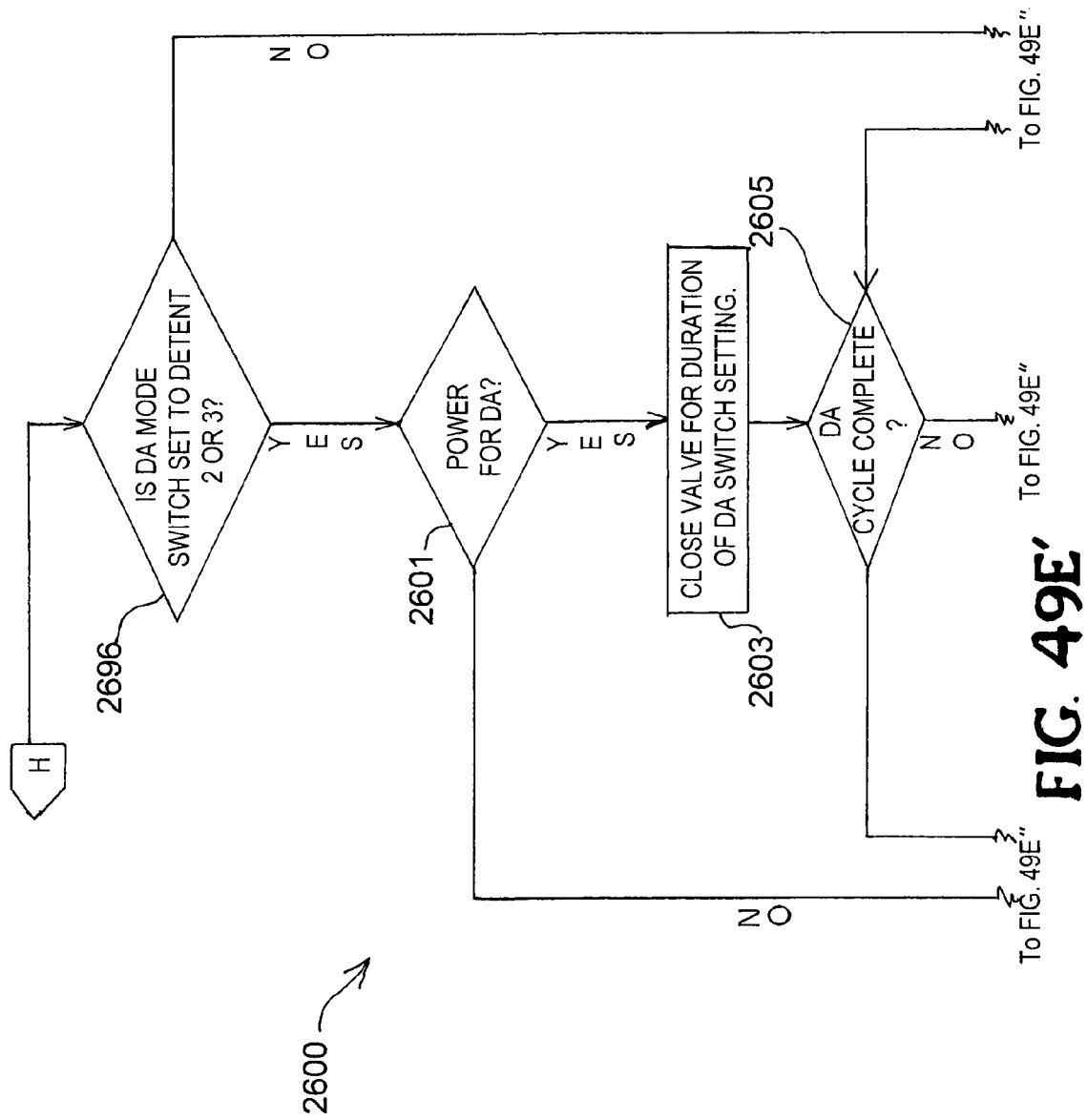

FIG. 49E describes the portion of process 2600 that deals with so-called "delayed action" (DA) of the door closer 90. DA can be turned on for the door closer of the present embodiment by setting one of the input switches. With DA, the door pauses in an open position for a set amount of time prior to closing. The door closer of the present embodiment does not need any additional valves to implement this feature. The control unit 110 simply determines if the feature is turned on and closes the valve accordingly at, and for, the appropriate time. The control unit can also sense if the door is being pushed during the delay by sensing a voltage spike and reacting accordingly, adjusting the valve to allow the door to close without damaging any of the hydraulic components of the door closer.

Processing picks up in FIG. 49E at the connector designated "H" from FIG. 49D. At block 2696 a determination is made as to whether the input switch for DA is set to indicate that DA is desired. In this example embodiment, the switch has three positions (detents) one for DA off, and two for DA on, each one specifying a different hold time. If DA is not selected, processing proceeds to block 2698 where the valve is set to the appropriate close position. If so, however, a determination is made at block 2601 as to whether there is enough power for DA. If not, processing again moves to block 2698. If there is enough power, the valve is closed to stop movement of hydraulic fluid in the door closer at block 2603. At block 2605, a determination is made as to whether the door has been holding for the amount of time dictated by the input switch. If not, the available power is monitored at block 2607. If either the time has run, or there is insufficient power, processing immediately proceeds to block 2698. Otherwise, the door is monitored as mentioned above for a voltage spike at block 2609, and if a spike is detected, processing again proceeds to block 2698. If the door closes without changing direction at block 2611, processing returns to FIG. 49A at the connector designated "I". Otherwise, if the door closer is in a parallel mount application at block 2615, as determined by reading the appropriate input switch during set-up in teaching mode, processing returns to FIG. 49D via the connector designated "J". If the door closer is not installed in a parallel mount application, processing returns to FIG. 49A via the connector designated "K".

Figure 49F:
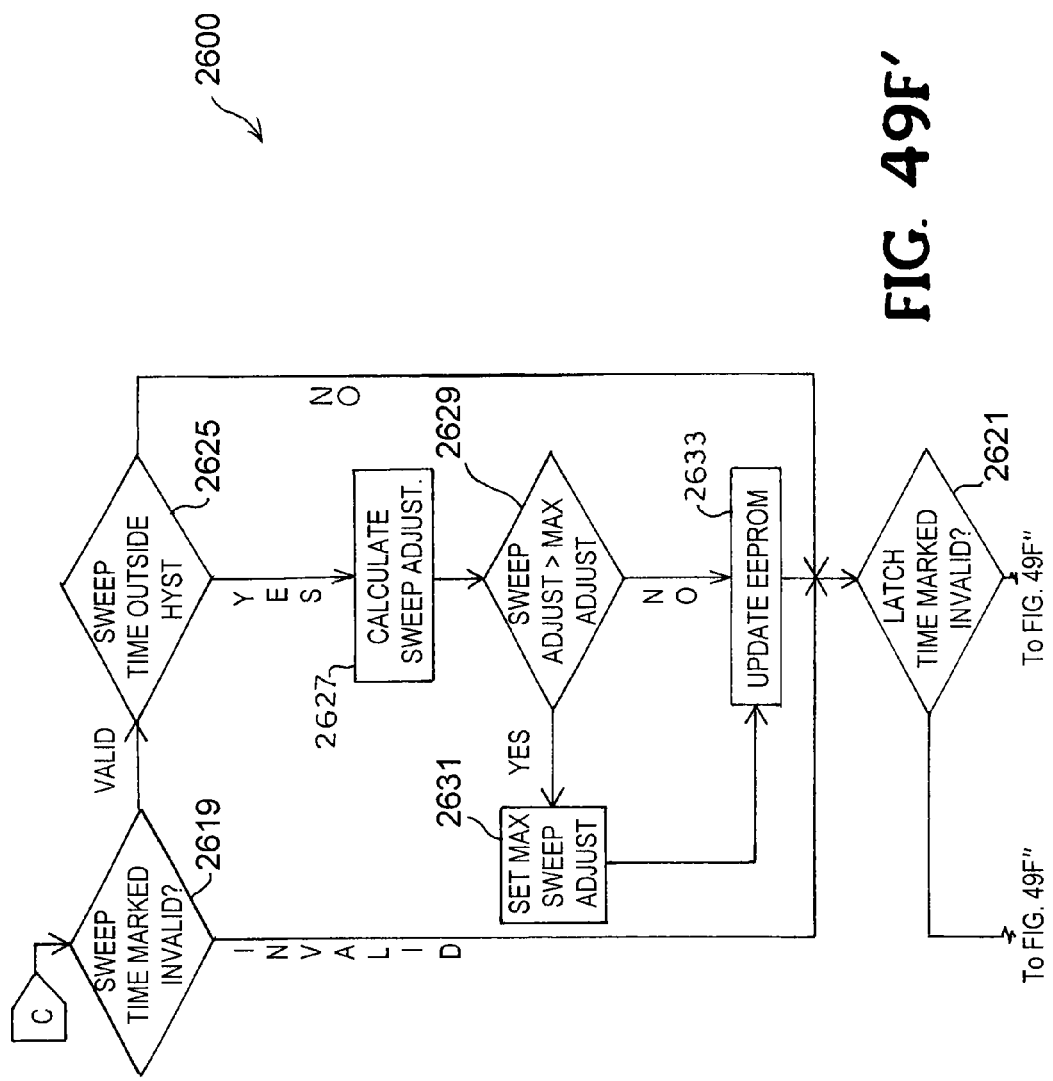

FIG. 49F continues the process 2600, illustrating another aspect of the previously discussed "latch boost" feature. In this case, latch parameters are adjusted to maintain the appropriate latch time rather than ensure the door closes to the jamb with the proper force. FIG. 49F also covers adjusting the sweep time based on recorded times so that the door closer 90 is always operating as expected, despite current conditions and wear. Processing picks up in FIG. 49F either from FIG. 49C at the connector designated "F" or from FIG. 49E with the connector designated "C". In the case of the connector designated "F" the control unit 110 simply proceeds to the end of the process 2600, block 2617. At block 2619, if the sweep time previously recorded is invalid, processing proceeds to block 2621, where a determination is made as to whether the previously recorded latch time was marked in memory as invalid. Otherwise, at block 2619 a determination is made at block 2625 as to whether the last recorded sweep time is outside of a hysteresis range. The hysteresis range is a sweep time slightly in excess of the maximum allowable sweep time that would be permitted for a single door operation from time to time, since an excess sweep time might result from human interference with the door, or some other completely temporary situation. If the sweep time is not outside the hysteresis range, processing again proceeds to block 2621. If the sweep time is outside of the hysteresis range, a valve adjustment to bring the sweep time back into range is calculated by the control unit 110 at block 2627. If the calculated time is outside an absolute, allowable maximum at block 2629, the sweep time is set to the absolute maximum at block 2631. Otherwise, the calculated time is used. In either case, the new sweep time is stored in the EEPROM within the control unit 110 at block 2633.

Still referring to FIG. 49F, the latch time is dealt with in a manner similar to the sweep time above. At block 2621, if the latch time previously recorded is invalid, processing proceeds to block 2635, where all the latch and sweep timers are reset for the next time the door 82 is opened. Otherwise at block 2637, a determination is made as to whether the last recorded latch time is outside of a hysteresis range. The hysteresis range for the latch time is again simply a latch time slightly in excess of the maximum allowable latch time that would be permitted for a single door operation from time to time, since an excess latch time might result from human interference with the door, or some other completely temporary situation. If the latch time is not outside the hysteresis range, processing again proceeds to block 2635. If the latch time is outside of the hysteresis range, a valve adjustment to bring the latch time back into range is calculated by the control unit at block 2639. If the calculated time is outside an absolute, allowable maximum at block 2641, the latch time is set to the absolute maximum at block 2641. Otherwise, the calculated latch time is used to set the valve. In either case, the new latch time is stored in the EEPROM within the control unit at block 2645.

Staying with FIG. 49F, a determination is again made at block 2647 as to whether the control unit 110 has sufficient power to maintain normal operation. If not, the valve is moved to the safe close position at block 2649. Otherwise the, the control unit 110 goes into a controlled sleep mode at block 2651, prior to process 2600 ending at block 2617.

Figure 50:
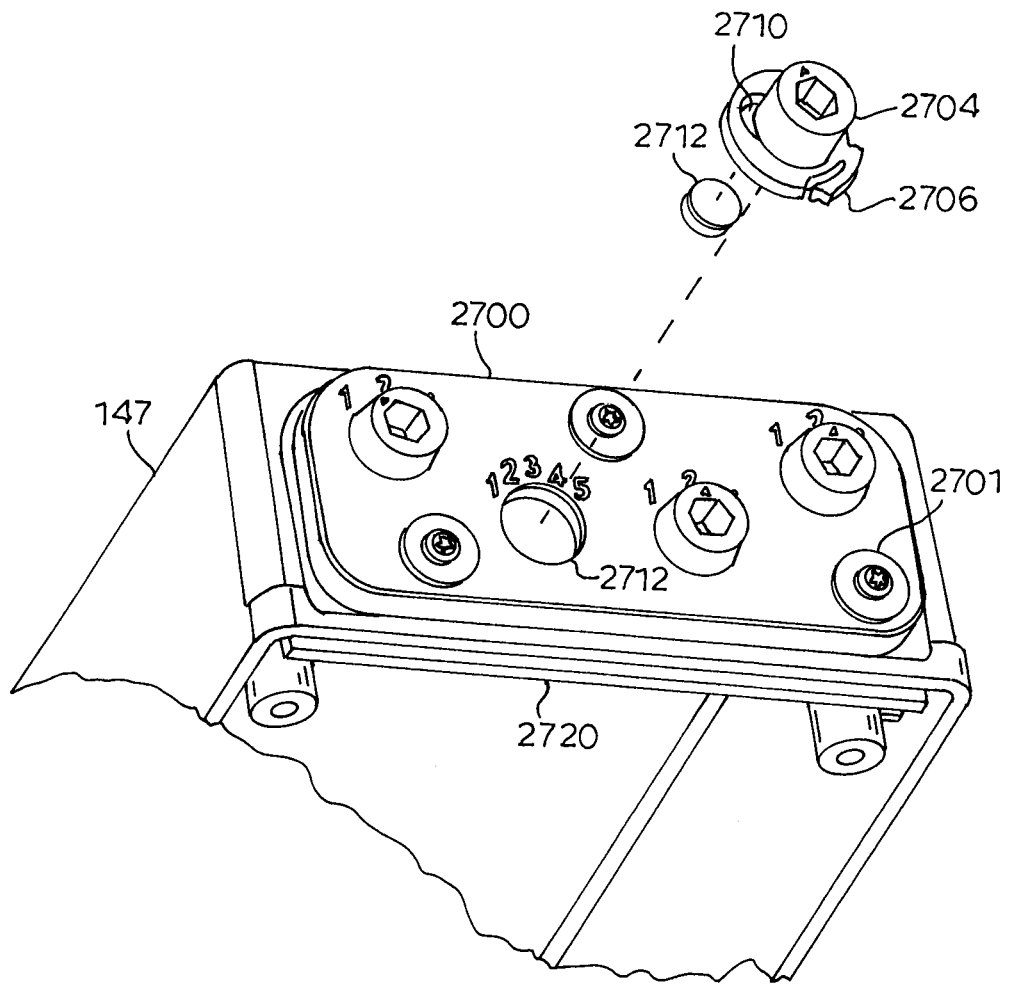
FIG. 50 is a perspective end view of a portion of a control unit including an embodiment of user input switches.

The foregoing description refers to input switches being read in order to determine parameters for the door closer 90 operation set by a user. FIG. 50 illustrates an arrangement of user input switches that can be used with embodiments of the present invention. FIG. 50 shows a portion of the previously described control unit cover onto which a panel 2700 is fixed by screws 2701. The panel 2700 includes a plurality of holes 2702 through which actuators 2704 protrude. Each actuator includes a detent arm 2706 which engages with teeth (not shown) behind the panel to create a plurality of possible rotary positions for the actuators 2704 as indicated by numerical indicators that may be printed or scribed onto the panel 2700. Each actuator defines a mounting hole, into which a magnet 2712 is secured.

Still referring to FIG. 50, a circuit board 2720 is mounted inside the cover behind the panel 2700. The circuit board 2720 includes magnetic sensors, such as Hall effect sensors (not shown), for each actuator. The hall effect sensors sense the magnetic field of the magnet through the cover to determine the position of actuators 2704, and communicate this information to the other components of the controller via the control unit cable 292 (not shown). In this way, switches can be provided for actuation by a user, without additional openings in the cover of the control unit 110 for cables or connectors.

Although the present invention has been shown and described in considerable detail with respect to only a few exemplary embodiments thereof, it should be understood by those skilled in the art that we do not intend to limit the invention to the embodiments since various modifications, omissions and additions may be made to the disclosed embodiments without materially departing from the novel teachings and advantages of the invention, particularly in light of the foregoing teachings. For example, some of the novel features of the present invention could be used with any type of hydraulic door closer. Accordingly, we intend to cover all such modifications, omission, additions and equivalents as may be included within the spirit and scope of the invention as defined by the following claims. In the claims, means-plus-function clauses are intended to cover the structures described herein as performing the recited function and not only structural equivalents but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. A method of operating a controller for a door closer in a teach mode, the method comprising:
   determining that the teach mode has been entered;
   reading a user interface to determine an installation configuration for the door closer;
   monitoring a position of a door as the door moves in order to determine a swing for the door;
   monitoring the position and movement of the door in order to determine when the door is at a jamb position;
   storing arm gear values separated by a specified time interval in the controller as the door moves;
   determining by the controller whether the door is mounted for left handed or right handed opening based on the stored arm gear values;
   storing values regarding at least the installation configuration, the swing, whether the door is mounted for left handed or right handed opening, and the jamb position in the controller to be accessed by control circuitry in the controller;
   comparing the stored values to stored calibration curves, wherein the stored calibration curves independently profile opening motion and closing motion of the door; and
   skewing at least one of the stored values for use in controlling the door closer in response to the comparing of the stored values to the stored calibration curves.

2. The method of claim 1 wherein the determining that the teach mode has been entered further comprises sensing a change in a magnetic field using a hall effect sensor.

3. The method of claim 1 wherein the stored calibration curves further comprise a value at or near a virtual jamb position.

4. The method of claim 3 wherein the determining that the teach mode has been entered further comprises sensing a change in a magnetic field using a hall effect sensor.

5. Apparatus for teaching control circuitry for a door closer values for a door to be used in controlling the door closer, the apparatus comprising:
   means for determining that a teach mode has been entered;
   means for reading a user interface to determine an installation configuration for the door closer;
   means for monitoring a position of the door as the door moves in order to determine a swing for the door;
   means for monitoring the position and movement of the door in order to determine when the door is at a jamb position;
   means for storing arm gear values separated by a specified time interval in the controller as the door moves;
   means for determining by the controller whether the door is mounted for left handed or right handed opening based on the stored arm gear values;
   means for storing values regarding at least the installation configuration, the swing, whether the door is mounted for left handed or right handed opening, and the jamb position in the control circuitry to be accessed by a controller;
   means for comparing the stored values to stored calibration curves, wherein the stored calibration curves independently profile opening motion and closing motion of the door; and
   means for skewing at least one of the stored values for use in controlling the door closer.

6. The apparatus of claim 5 wherein the means for sensing that a teach mode has been entered further comprises a hall effect sensor.

7. The apparatus of claim 6 wherein the stored calibration curves further comprise a value at or near a virtual jamb position.

8. A controller for a door closer comprising:
   a position sensor to determine a position of a door;
   a user interface to provide information regarding an installation configuration of the door closer;
   a memory to store values regarding at least the installation configuration, a swing, whether the door is mounted for left handed or right handed opening, and a jamb position for the door; and
   control circuitry having a teach mode, the control circuitry functionally connected to the position sensor, the memory, and the user interface, the control circuitry operable in the teach mode to read the user interface to determine the installation configuration, to monitor position and movement of the door in order to determine the swing for the door and when the door is at the jamb position, to store arm gear values separated by a specified time interval as the door moves and determine whether the door is mounted for left handed or right handed opening based on the stored arm gear values, to compare the stored values in the memory to stored calibration curves that independently profile opening and closing motion of the door and to skew at least one of the stored values for use in controlling the door closer.

9. The controller of claim 8 wherein the stored calibration curves further comprise a value at or near a virtual jamb position.

10. The controller of claim 8 further comprising a hall effect device connected to the control circuitry to initiate the teach mode.

11. The controller of claim 8 further comprising a generator responsive to motion of the door to generate electricity to operate the controller.

12. The controller of claim 9 further comprising a generator responsive to motion of the door to generate electricity to operate the controller.

13. The controller of claim 10 further comprising a generator responsive to motion of the door to generate electricity to operate the controller.

14. A door closer having a teach mode, the door closer comprising:
   a spring;
   a movable element configured to move in response to movement of a door, the movable element loading the spring;
   a valve configured to control movement of hydraulic fluid around the movable element;
   a position sensor to determine a position of the door;
   a user interface to provide information regarding an installation configuration of the door closer;
   a memory to store values regarding at least the installation configuration, a swing, whether the door is mounted for left handed or right handed opening, and a jamb position for the door; and
   control circuitry having a teach mode, the control circuitry functionally connected to the position sensor, the memory, and the user interface, the control circuitry operable in the teach mode to read the user interface to determine the installation configuration, to monitor position and movement of the door in order to determine the swing for the door and when the door is at the jamb position, to store arm gear values separated by a specified time interval as the door moves and determine whether the door is mounted for left handed or right handed opening based on the stored arm gear values, to compare the stored values in the memory to stored calibration curves that independently profile opening and closing motion of the door and to skew at least one of the stored values for use in controlling the valve.

15. The door closer of claim 14 further comprising a device responsive to motion of the door to generate electricity to operate the controller.

16. The door closer of claim 15 wherein the device is a generator.

17. The door closer of claim 15 wherein the stored calibration curves further comprise a value at or near a virtual jamb position.

18. The door closer of claim 17 further comprising a hall effect device connected to the control circuitry to initiate the teach mode.

* * * * *